(12) United States Patent
Nick et al.

(10) Patent No.: US 9,217,524 B2
(45) Date of Patent: *Dec. 22, 2015

(54) COUPLING LOCK MECHANISM

(75) Inventors: Leonard J. Nick, Lucinda, PA (US); Dennis Zeiber, Erie, PA (US)

(73) Assignee: Parker-Hannifin Corporation, Cleveland, OH (US)

( * ) Notice: Subject to any disclaimer, the term of this patent is extended or adjusted under 35 U.S.C. 154(b) by 629 days.

This patent is subject to a terminal disclaimer.

(21) Appl. No.: 13/528,516

(22) Filed: Jun. 20, 2012

(65) Prior Publication Data

US 2013/0127155 A1  May 23, 2013

Related U.S. Application Data

(63) Continuation-in-part of application No. 13/304,013, filed on Nov. 23, 2011.

(51) Int. Cl.
*F16L 19/00* (2006.01)
*F16L 29/04* (2006.01)

(52) U.S. Cl.
CPC ............ *F16L 19/005* (2013.01); *F16L 29/04* (2013.01); *Y10T 29/49826* (2015.01)

(58) Field of Classification Search
CPC .......................... F16L 19/005; B21D 39/046
USPC .......................................... 285/84, 87, 88, 92
See application file for complete search history.

(56) References Cited

U.S. PATENT DOCUMENTS

| | | | |
|---|---|---|---|
| 69,706 A | 10/1867 | Roberts | |
| 455,249 A | 6/1891 | Fricker | |
| 545,066 A | 8/1895 | Fregeau | |
| 641,846 A | 1/1900 | Davenport et al. | |
| 774,362 A * | 11/1904 | MCarthy | 285/87 |
| 813,792 A * | 2/1906 | Gooch et al. | 285/88 |
| 832,757 A | 10/1906 | Stirzaker | |
| 1,033,187 A | 7/1912 | Metger | |
| 1,080,675 A | 12/1913 | Berg | |
| 1,325,468 A * | 12/1919 | Foster | 285/88 |
| 1,483,028 A * | 2/1924 | Walsh | 285/84 |
| 1,615,595 A * | 1/1927 | O'Connor | 285/88 |
| 1,785,990 A | 1/1928 | Welsh | |
| 2,158,131 A | 5/1939 | Laurent | |

(Continued)

OTHER PUBLICATIONS

United States Patent Application Entitled Coupling Lock Mechanism, U.S. Appl. No. 13/304,013, filed Nov. 23, 2011, Inventors Leonard J. Nick and Dennis Zeiber.

*Primary Examiner* — David E Bochna

(74) *Attorney, Agent, or Firm* — Renner, Otto, Boisselle & Sklar, LLP

(57) ABSTRACT

A threaded coupling wherein external threads of the male body of the male coupling half are in mating engagement with internal threads of the female sleeve of the female coupling half. The female sleeve includes an interior hook and the male body includes a locking lever receptacle recessed therein. The locking lever pivotally resides in the receptacle and interlocks circumferentially spaced recesses in the generally cylindrically-shaped hook of the female sleeve uniting the male and female. A tensioning O-ring secures the locking lever to the male body. A locking sleeve extends circumferentially about the male body and prohibits the release of the hook of the female sleeve from a recess in the locking lever unless a window is aligned with the locking lever. A process for locking the threaded coupling is also disclosed.

18 Claims, 43 Drawing Sheets

(56) References Cited

U.S. PATENT DOCUMENTS

| | | | |
|---|---|---|---|
| 2,183,895 A | 12/1939 | Reed | |
| 3,455,580 A | 7/1969 | Howard | |
| 3,520,563 A | 7/1970 | Decker, Jr. | |
| 3,669,472 A | 6/1972 | Nadsady | |
| 3,930,674 A | 1/1976 | Jonsson | |
| 4,268,103 A * | 5/1981 | Schildkraut et al. | 285/88 |
| 4,552,427 A | 11/1985 | Landgreen | |
| 4,624,483 A | 11/1986 | Stromberg | |
| 4,648,630 A | 3/1987 | Bruch | |
| 4,648,670 A | 3/1987 | Punako et al. | |
| 4,671,540 A | 6/1987 | Medvick et al. | |
| 4,776,614 A * | 10/1988 | Marrison et al. | 285/87 |
| 4,802,694 A | 2/1989 | Vargo | |
| 4,875,715 A | 10/1989 | Dennany et al. | |
| 5,026,099 A | 6/1991 | Hendrix | |
| 5,099,883 A | 3/1992 | Maiville | |
| 5,131,689 A | 7/1992 | Bates | |
| 5,139,289 A | 8/1992 | Koss | |
| 5,195,785 A | 3/1993 | Jellison | |
| 5,199,844 A | 4/1993 | Gilmore, Jr. et al. | |
| 5,209,529 A | 5/1993 | Yan et al. | |
| 5,215,336 A | 6/1993 | Worthing | |
| 5,251,939 A | 10/1993 | Jordan | |
| 5,251,940 A | 10/1993 | DeMoss et al. | |
| 5,301,985 A | 4/1994 | Terzini | |
| 5,362,110 A | 11/1994 | Bynum | |
| 5,401,062 A | 3/1995 | Vowles | |
| 5,568,946 A | 10/1996 | Jackowski | |
| 5,628,531 A | 5/1997 | Rosenberg et al. | |
| 5,782,502 A | 7/1998 | Lewis | |
| 5,797,626 A | 8/1998 | Ruggero | |
| 5,823,702 A | 10/1998 | Bynum | |
| 5,931,508 A | 8/1999 | Spriegel | |
| 5,944,362 A | 8/1999 | Harle | |
| 5,971,442 A | 10/1999 | Kozinski et al. | |
| 5,988,693 A | 11/1999 | Street | |
| 5,988,694 A | 11/1999 | Brushaber | |
| 6,053,540 A | 4/2000 | Meyer | |
| 6,070,913 A | 6/2000 | Hopper et al. | |
| 6,108,865 A | 8/2000 | Veser et al. | |
| 6,206,431 B1 | 3/2001 | Street | |
| 6,206,433 B1 | 3/2001 | Bloomer | |
| 6,224,113 B1 | 5/2001 | Chien | |
| 6,290,264 B1 | 9/2001 | Inoue | |
| 6,318,762 B2 | 11/2001 | Inoue | |
| 6,364,369 B2 | 4/2002 | Bailey | |
| 6,382,680 B1 | 5/2002 | Horimoto | |
| 6,447,016 B2 | 9/2002 | Collier | |
| 6,511,098 B1 | 1/2003 | Luterstein | |
| 6,543,812 B1 | 4/2003 | Chang | |
| 6,588,790 B2 | 7/2003 | Hall | |
| 6,629,707 B1 | 10/2003 | Yamaguchi | |
| 6,669,237 B1 | 12/2003 | Burch et al. | |
| 6,863,314 B2 | 3/2005 | Guest | |
| 6,913,294 B2 | 7/2005 | Treverton et al. | |
| 6,926,311 B2 | 8/2005 | Chang et al. | |
| 7,159,826 B1 | 1/2007 | Bruce | |
| 7,240,930 B2 | 7/2007 | Stravitz | |
| 7,243,953 B2 | 7/2007 | Nakamura et al. | |
| 7,316,428 B2 | 1/2008 | Takayanagi et al. | |
| 7,377,553 B2 | 5/2008 | Takayanagi | |
| 7,390,008 B1 | 6/2008 | Hall | |
| 7,523,963 B2 | 4/2009 | Draper et al. | |
| 7,604,263 B2 | 10/2009 | Mori et al. | |
| 7,722,086 B2 | 5/2010 | Ishiki et al. | |
| 7,754,953 B2 | 7/2010 | Takegawa | |

\* cited by examiner

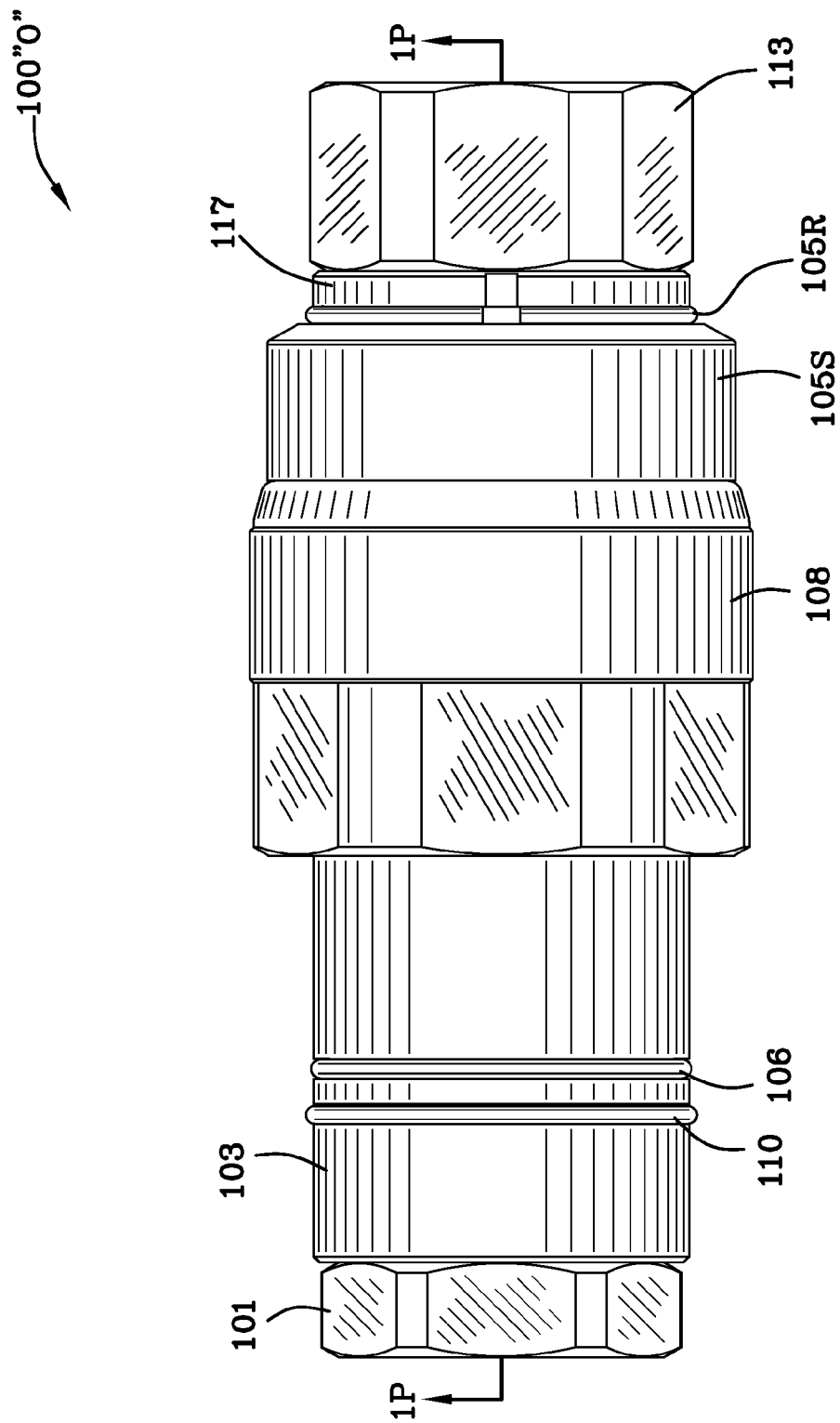
FIG. 1"O"

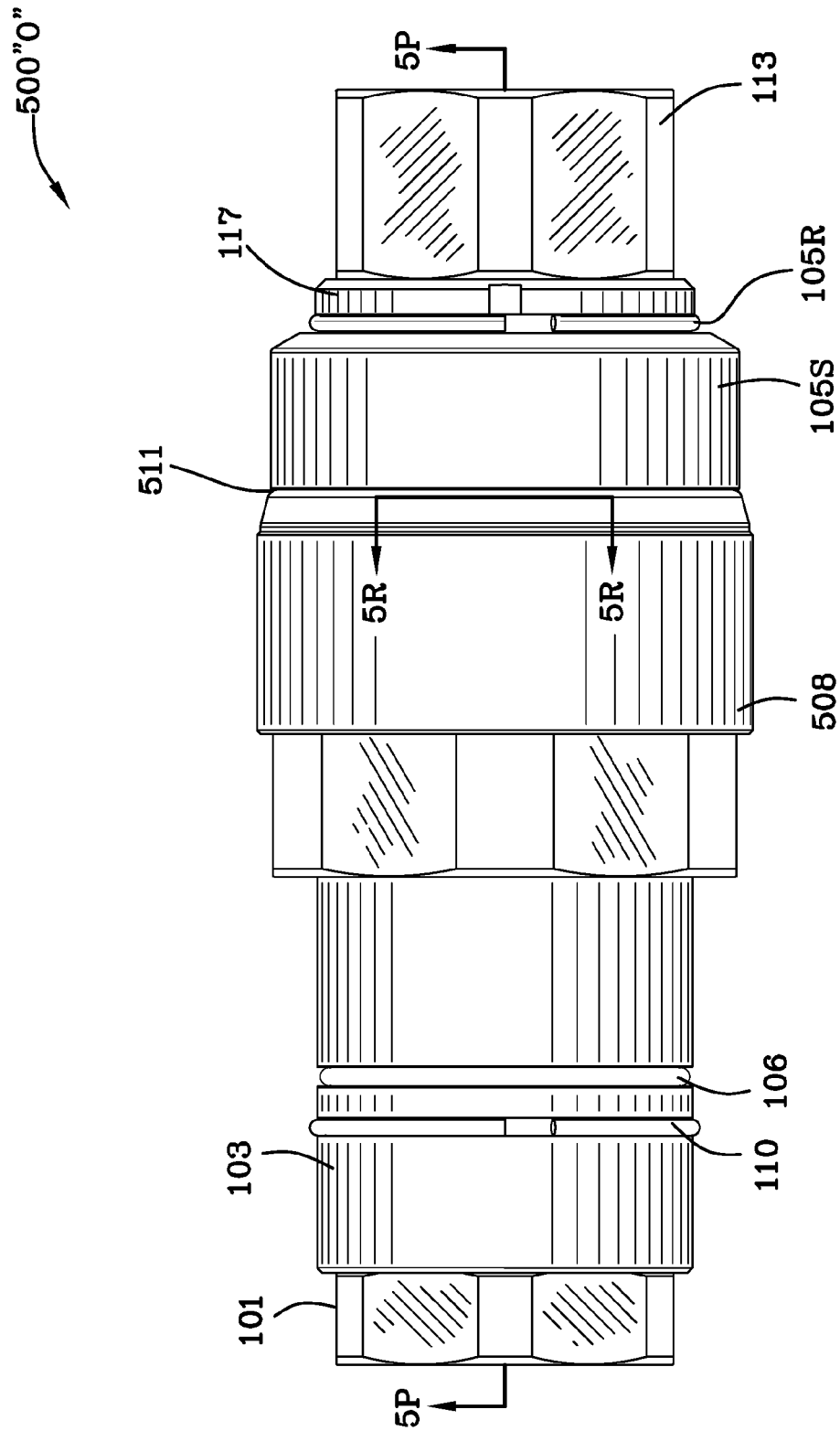
FIG. 5"O"

COUPLING LOCK MECHANISM

This application is a continuation-in-part of copending application Ser. No. 13/304,013, filed Nov. 23, 2011. This application claims the benefit of, and priority to, copending application Ser. No. 13/304,013 filed Nov. 23, 2011. This application has the same inventors as copending application Ser. No. 13/304,013, filed Nov. 23, 2011.

FIELD OF THE INVENTION

The invention is in the field of threaded couplings having locking means to prevent unthreading due to vibration or other unwanted disconnection.

BACKGROUND OF THE INVENTION

Disconnection of threaded couplings is a known problem. Unwanted disconnection of threaded couplings can cause injury to personnel and damage to equipment which depends on the proper connection of the threaded coupling.

SUMMARY OF THE INVENTION

A first example of a threaded coupling includes a generally cylindrically shaped male coupling half and a generally cylindrically shaped female coupling half. The male coupling half includes a male body and the male body includes an exterior, and the exterior of the male body includes external threads thereon. The female coupling half includes a female body and a female sleeve. The female sleeve and the male body are threaded together. The female sleeve further includes an interior and the interior of the female sleeve includes internal threads. The external threads of the male body are in mating engagement with the internal threads of the female sleeve. The female sleeve further includes an end portion and the end portion of the female sleeve includes an interior hook formed therein. The male body includes a locking lever receptacle recessed in the exterior of the male body, and the locking lever receptacle of the male body further includes first and second slots therein. A locking lever includes coaxial first and second pivot pins, a latching end and a sloped end. The latching end of the latching lever includes a recess and a latching surface. The first and second pivot pins of the locking lever reside in the first and second slots of the locking lever receptacle of the male body. The locking lever pivots about the pivot pins and the locking lever includes an O-ring slot therein. All of the components are preferably made of metal. However, it is specifically contemplated that other materials such as plastics may be used for some of the components.

The male body includes an O-ring slot therein which extends circumferentially around the generally cylindrically shaped male body and is aligned with the O-ring slot in the locking lever. A tensioning O-ring extends circumferentially in the O-ring slot in the male body and in the O-ring slot in the locking lever biasing the latching end of the locking lever to a raised position for engagement with the interior hook formed on the end of the female sleeve. The tensioning O-ring secures the locking lever in the receptacle and prevents it from being extracted therefrom. The latched end of the locking lever is raised for engagement with the interior hook of the female sleeve prior to engagement. During engagement, the hook of the end of the female sleeve engages the recess of the latching end of the locking lever and the latching end of the locking lever pivots about the first and second pivot pins to a position proximate the receptacle of the male body.

Once the hook and the recess of the locking lever are fully engaged, the latching end of the locking lever is returned to the raised position under the force of the tensioning O-ring. When the latching end of the locking lever is forced downwardly under the force of the interior or inner hook of the female, the tensioning O-ring is under additional tension. The tensioning O-ring is under some tension even when the locking lever is not being rotated.

A locking sleeve is employed to ensure that the inner hook of the female sleeve remains engaged with the locking lever which is inserted into the male body. When the locking lever is inserted in the receptacle of the male body, the pins, the tensioning O-ring and the locking sleeve secure the locking lever in place against the force of the female sleeve in the event that someone attempts to unthread the female sleeve from the male body inappropriately/improperly or that vibration attempts to loosen the coupling halves and unthread them.

The locking sleeve is generally cylindrically shaped and engages the exterior of the male body and extends circumferentially thereabout. The locking sleeve resides in proximity with the female sleeve when the male and female halves are fully coupled, and, the locking sleeve prevents the coupling halves from being unthreaded. The locking sleeve includes an appropriately sized access window or port therethrough which enables latching and unlatching the interior hook of the female sleeve from the male body. The appropriately sized access window or port when aligned with the locking lever permits the locking lever to rotate to accomplish either the latching or unlatching of the hook and the recess of the locking lever and, hence, coupling or uncoupling of the female sleeve and the male body.

The locking lever includes a sloped end and the interior of the locking sleeve includes a reciprocally shaped sloped end which blocks rotation of the locking lever unless the access window or port is aligned with the locking lever. The locking sleeve may include a shape which is not the reciprocal of the sloped end of the locking lever. Another shape may be used which obstructs the rotation of the locking lever. The locking sleeve is rotatable from an unlocked position to a locked position where it is not possible to lock or unlock the male body and the female sleeve. A second O-ring is interposed in compression between the locking sleeve and the male body. The second O-ring resides in compression in an O-ring groove of the locking sleeve. The second O-ring is in engagement with the exterior of the male coupling and grips the exterior inhibiting unwanted rotation of the sleeve with respect to the exterior of the male body thus preventing inadvertent alignment of the access window with the locking lever.

A process for locking a threaded coupling wherein the coupling includes: a male body having external threads and a female sleeve having internal threads; the male body includes an O-ring slot therein, a locking lever receptacle, and, a raised portion, and the raised portion includes first and second slots; the female coupling further includes an end portion, and, the end portion includes a hook; a locking lever, the locking lever includes a latching end having a recess therein, first and second pins, an O-ring slot and a sloped end. The process includes the steps of: inserting the locking lever into the receptacle of the male body and inserting the first and second pins of the locking lever into the first and second slots of the raised portion of the male member, the first and second pins of the locking lever permitting rotation of the lever about the pins; positioning an O-ring in the O-ring slot of the male body and in the O-ring slot of the locking lever securing the locking lever with respect to the male body, the O-ring permitting rotation of the locking lever about the pins with resistance to the rotation; and, progressively threading the female coupling having internal threads onto the male body having external threads moving the hook longitudinally toward the locking lever; engaging the hook and the latching end of the locking lever, and as the progressive threading continues, the hook moving and forcing the locking lever to rotate the latching end thereof radially downwardly toward the male body; extending the hook of the female sleeve longitudinally further until the hook proceeds into the recess of the locking lever or thereabout and the locking lever rotates the latching end thereof upwardly; and, interengaging the hook of the female sleeve and the recess of the locking member securing the male body and the female sleeve together; locking the interengaged hook of the female member and the recess of the latching end of the locking lever together using a locking sleeve; positioning the locking sleeve between the hook of the female sleeve and a snap ring affixed in the male body; inhibiting rotation of the locking sleeve against unwanted rotation of the locking sleeve by vibration by interposing a second O-ring between the male body and the sleeve such that force is required to rotate the locking sleeve with respect to the male portion.

The locking lever includes a bottom surface and the lever receptacle includes a flat surface. The bottom surface of the locking lever is spaced apart from the flat surface of the receptacle thus enabling the locking lever to pivot without engagement with the flat surface of the receptacle. The locking lever pivots about the coaxial pins during engagement of the lever with the interior hook of the female sleeve.

A second example of the female sleeve may be employed with a second example of the locking lever to form a threaded coupling. The threaded coupling of the second example comprises many of the same components of the first example. In the second example a generally cylindrically shaped male coupling half and a generally cylindrically shaped female coupling half are employed. The male coupling half includes a male body and the male body includes an exterior. The exterior of the male body includes external threads thereon. The female coupling half includes a second example of a female sleeve and a female body. The interior of the second example of the female sleeve includes internal threads. The second example of the female sleeve includes an end portion which includes a hook portion. The hook portion of the second example of the female sleeve is generally cylindrically shaped. The generally cylindrically-shaped hook portion includes circumferentially spaced raised portions and circumferentially spaced recesses therein.

The circumferentially spaced raised portions are separated by the circumferentially spaced recesses. As the female sleeve is threaded onto the male body, the hook portion engages the blocking end portion of the locking lever. Specifically, the circumferentially spaced raised portions and the circumferentially spaced recesses alternately engage the blocking end portion of the locking lever.

The male body includes a locking lever receptacle recessed in the exterior of the male body, and the locking lever receptacle of the male body further includes first and second slots therein. The second example of the locking lever includes first and second pivot pins and a blocking end portion. The blocking end portion of the second example of the locking lever engages one of the recesses of the hook portion of the second example of the female sleeve when the coupling is locked together.

In the second example, the first and second pivot pins of the second example of the locking lever reside in the first and second slots of the locking lever receptacle of the male body enabling the second example of the locking lever to pivot about the pivot pins. The locking lever includes an O-ring slot therein and the male body includes an O-ring slot therein which extends circumferentially around the generally cylindrically shaped male body and is aligned with the O-ring slot in the second example of the locking lever.

In the second example, the tensioning O-ring extends circumferentially in the O-ring slot in the male body and in the O-ring slot in the second example of the locking lever biases the blocking end portion of the locking lever to a raised position for engagement with the cylindrically-shaped hook portion of the second example of the female sleeve including the circumferentially spaced raised portions and the circumferentially spaced recesses in the cylindrically-shaped hook portion of the female sleeve.

As in the first example of the invention, the tensioning O-ring secures the second example of the locking lever in the locking lever receptacle. During engagement of the male coupling half and the female coupling half, the external threads of the male body engage the internal threads of the second example of the female sleeve. The second example of the female sleeve of the female coupling half is rotated with respect to the male coupling half and the cylindrically-shaped hook portion of the female sleeve. The generally cylindrically-shaped hook portion of the second example of the female sleeve includes circumferentially raised portions and circumferentially spaced recesses which engage the blocking end portion of the second example of the locking lever alternately pivoting the blocking end portion of the locking lever about the first and second pivot pins between a position proximate the receptacle of the male body when one of the circumferentially spaced raised portions of the generally cylindrically-shaped hook portion engages the blocking end portion of the locking lever and a position relatively distal with respect to the receptacle of the male body when one of the circumferentially spaced recesses of the cylindrically-shaped hook portion engage the blocking end portion of the second example of the locking lever.

As rotation of the second example of the female sleeve continues the female sleeve moves the female body toward the male body until threaded engagement of the female coupling half and the male coupling half is complete.

The blocking end portion of the second example of the locking lever is in the raised position when the cylindrically-shaped hook portion and one of the circumferentially spaced recesses thereof is fully engaged with the blocking end portion of the second example of the locking lever. When the raised blocking end portion of the locking lever is engaged with the recess of the hook portion, and with the locking sleeve blocking rotation of the locking lever, the coupling may not be unthreaded despite substantial load on the female sleeve.

The locking sleeve is generally cylindrically shaped and engages the exterior of the male body extending circumferentially thereabout. The locking sleeve includes an access window which, when rotated, prevents the female sleeve and the male body from being unthreaded as the access window is not aligned with the locking lever.

A process for locking a threaded coupling using the second example of the female sleeve and the second example of the lever is also disclosed and claimed. The coupling includes a male coupling half and a female coupling half. The male coupling half includes a male body having external threads. The male body includes a locking sleeve having an access window. The male body further includes an O-ring slot therein. The male body further includes a locking lever receptacle and a raised portion having first and second slots. A second example of the locking lever includes a blocking end portion, first and second pins, an O-ring slot and a sloped end.

The female coupling half includes a female body and a female sleeve having internal threads. The female sleeve further includes an end portion which has a generally cylindrically-shaped hook. The generally-cylindrically-shaped hook includes circumferentially spaced raised portions and circumferentially spaced recesses therein.

The steps of the process include: inserting the second example of the locking lever into the receptacle of the male body and inserting the first and second pins of the second example of the locking lever into the first and second slots of the raised portion of the male member, the first and second pins of the second example of the locking lever permitting rotation of the lever about the pins; positioning the access window of the locking sleeve in alignment with the locking lever; positioning an O-ring in the O-ring slot of the male body and in the O-ring slot of the locking lever securing the locking lever with respect to the male body, the O-ring permitting rotation of the locking lever about the pins with resistance to the rotation; progressively threading the second example of the female sleeve having internal threads onto the male body having external threads moving the generally cylindrically-shaped hook toward the locking lever; engaging the generally cylindrically-shaped hook of the second example of the female sleeve with the blocking end portion of the locking lever, and as the progressive threading continues, the hook including the raised portions and the circumferentially spaced recesses are rotated with respect to the external threads of the male body moving and forcing the blocking end of the locking lever to rotate the blocking end portion radially downwardly toward the male body when one of the raised portions of the cylindrically-shaped hook engages the blocking end portion and then the blocking end portion of the second example of the locking lever rotates radially upwardly away from the male body when one of the circumferentially spaced recesses of the generally cylindrically-shaped hook engages the blocking end portion of the second example of the locking lever; continuing the rotation of the generally cylindrically-shaped hook portion of the second example of the female sleeve until the female sleeve engages the locking sleeve of the male body; adjusting the rotational position of the second example of the female sleeve to ensure that one of the circumferentially spaced recesses of the generally cylindrically-shaped hook engages the blocking end portion of the second example of the locking lever; rotating the access window of the locking sleeve to a position not aligned with the second example of the locking lever locking the male coupling half and the female coupling half together.

BRIEF DESCRIPTION OF THE DRAWINGS

FIG. 1O is a top schematic view of the coupling fully threaded together with the locking sleeve rotated such that the access window is not visible.

FIG. 5"O" is a top schematic view of the coupling fully threaded together with the locking sleeve rotated such that the access window is not visible (and not aligned with the locking lever) thus preventing the second example of the locking lever from pivoting.

Figure 1:
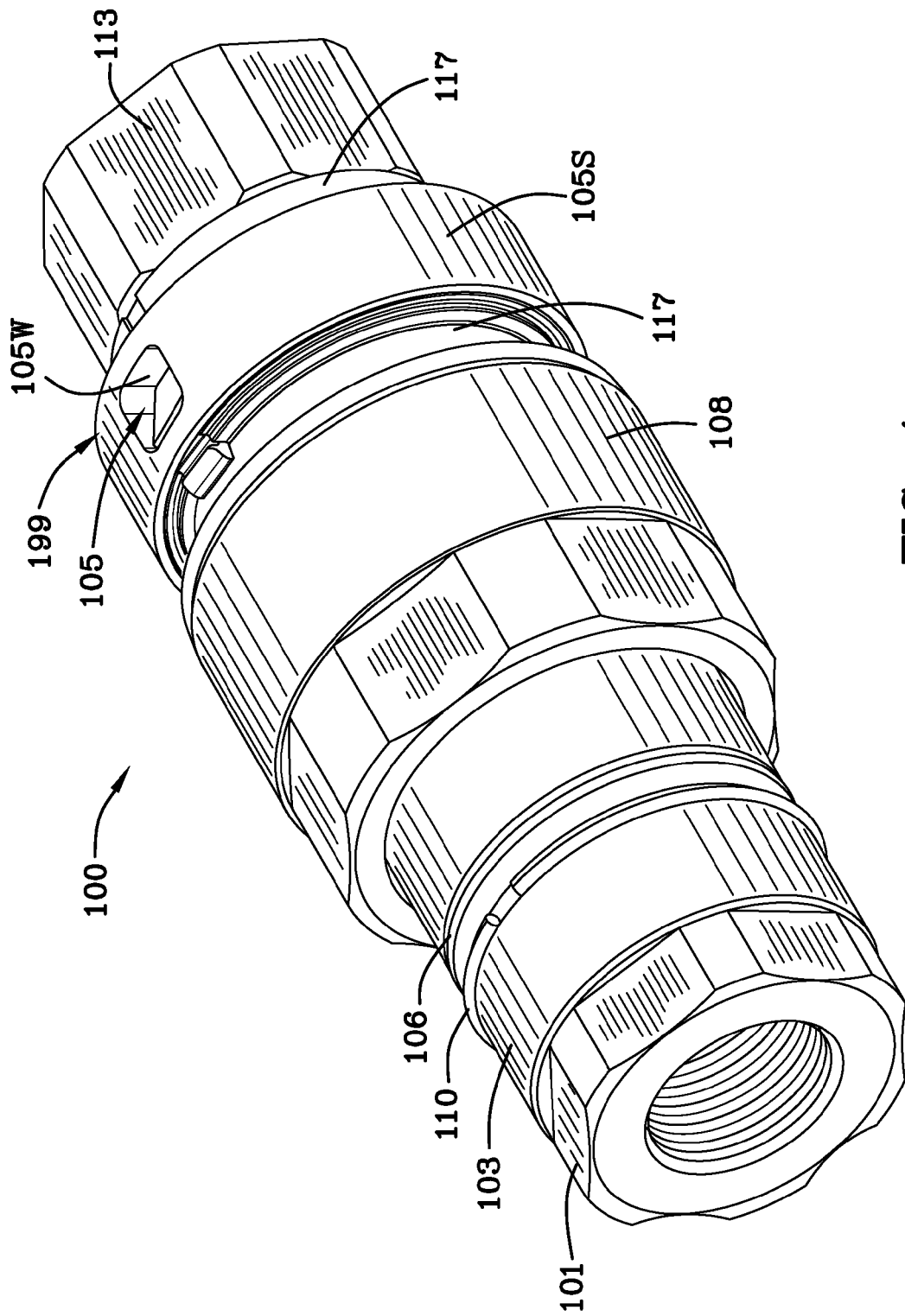
FIG. 1 is a perspective schematic view of the coupling partially threaded together.

The invention will be better understood when reference is made to the description, the reference numerals and claims set forth below.

DESCRIPTION OF THE INVENTION

FIG. 1 is a perspective view 100 of the substantially cylindrically shaped metal coupling partially threaded together. Female sleeve 108 is illustrated in partial engagement with the male body 117. Arrow 105 points/indicates the locking lever. Locking sleeve 105S surrounds male body 117. An access window or port is formed by a wall 105W in the locking sleeve 105S. Access window 199 is large enough to enable operation of locking lever 105 as explained in detail herein.

Figure 1A:
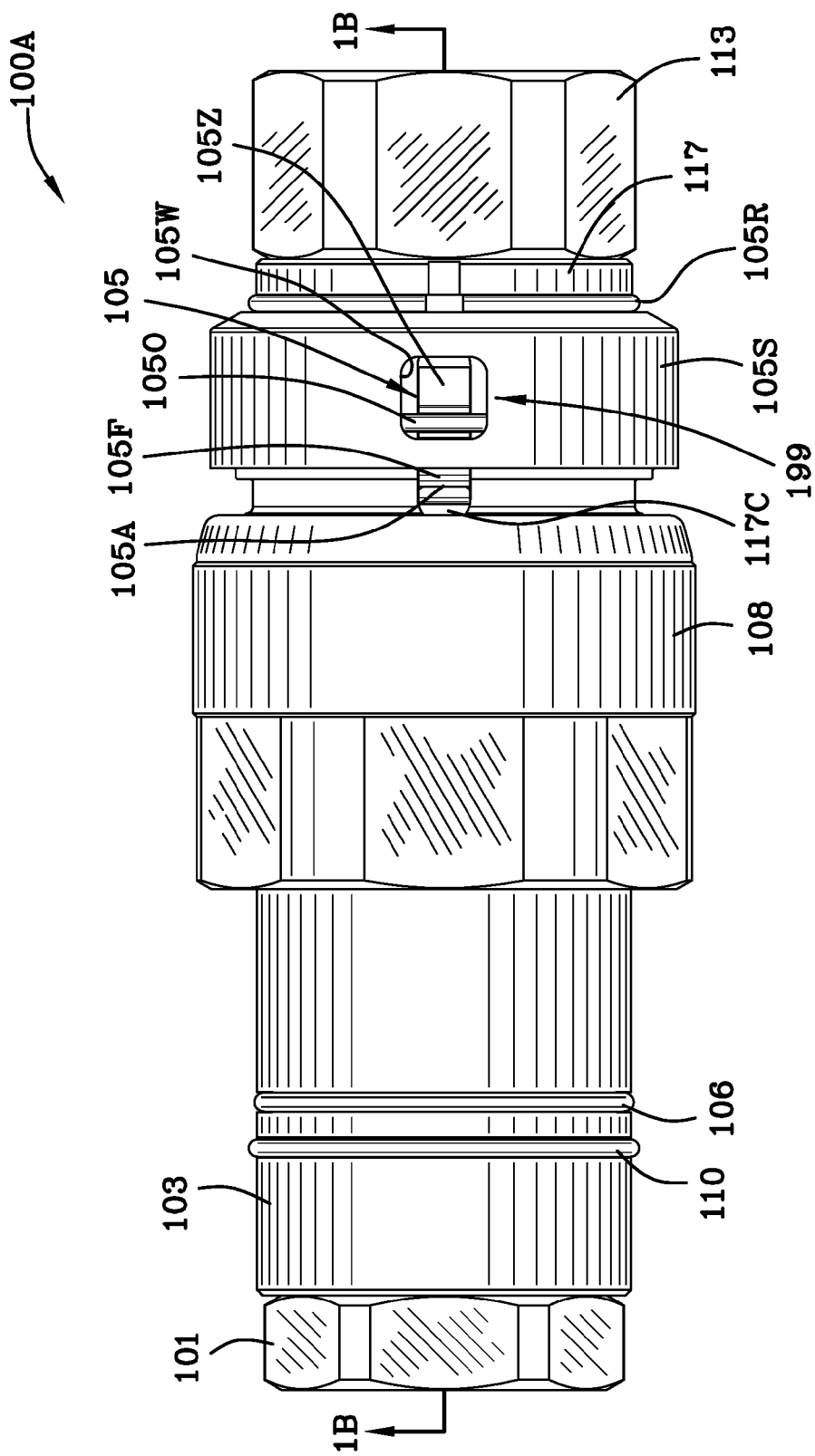
FIG. 1A is a top schematic view of the coupling partially threaded together.
Figure 1B:
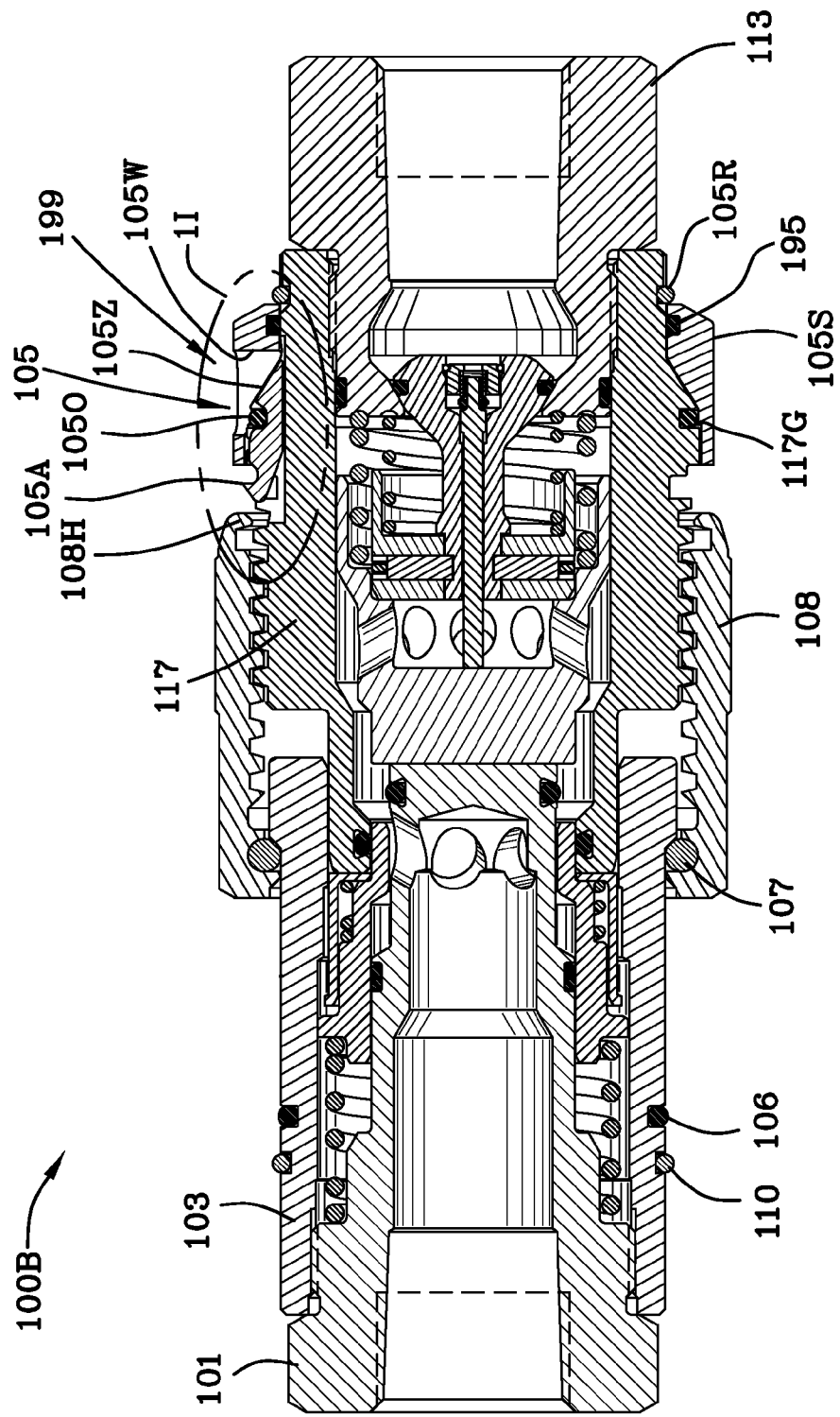
FIG. 1B is a cross-sectional schematic view of the coupling partially threaded together taken along the lines 1B-1B of FIG. 1A.
Figure 1C:
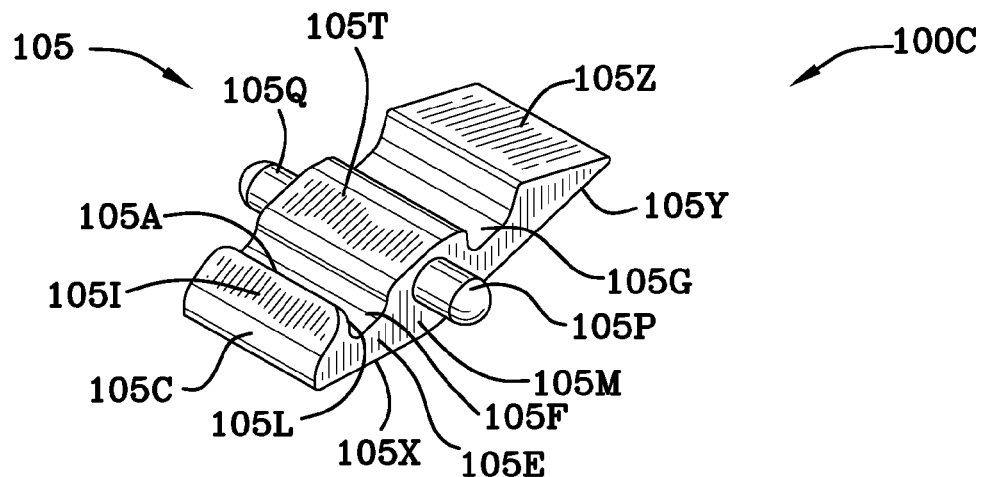
FIG. 1C is a perspective schematic view of the locking lever.
Figure 1D:
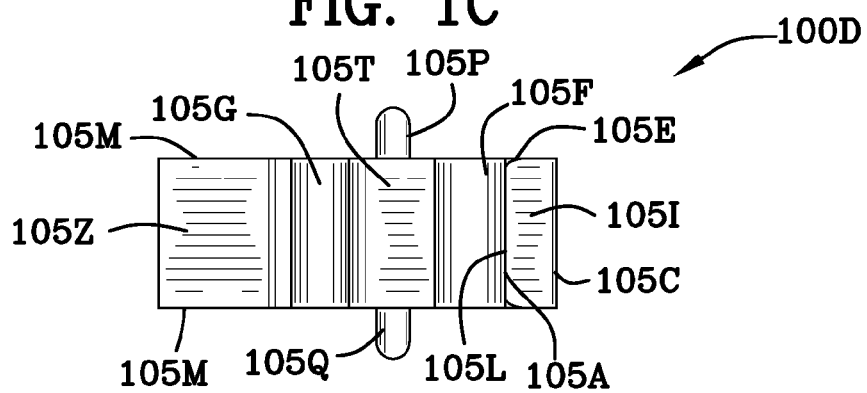
FIG. 1D is a top schematic view of the locking lever.
Figure 1E:
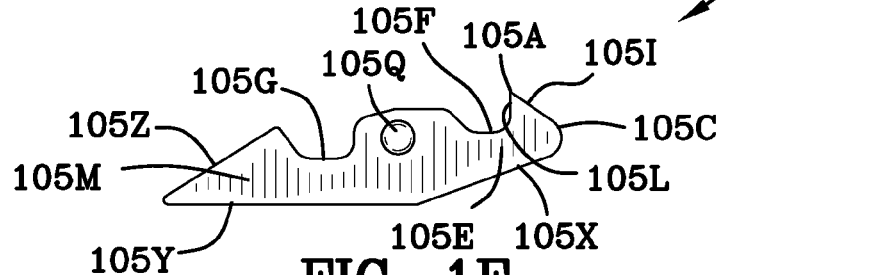
FIG. 1E is a left side schematic view of the locking lever.
Figure 1F:
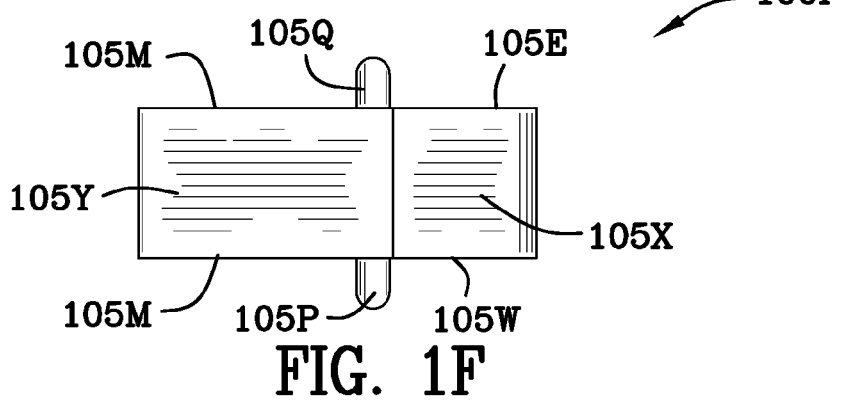
FIG. 1F is a bottom side schematic view of the locking lever.
Figure 1H:
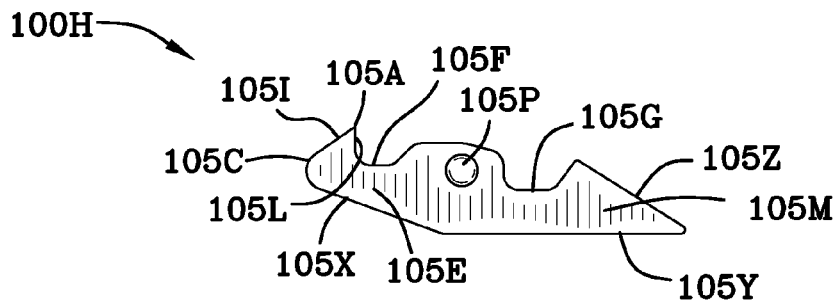
FIG. 1H is a right side schematic view of the locking lever.
Figure 1G:
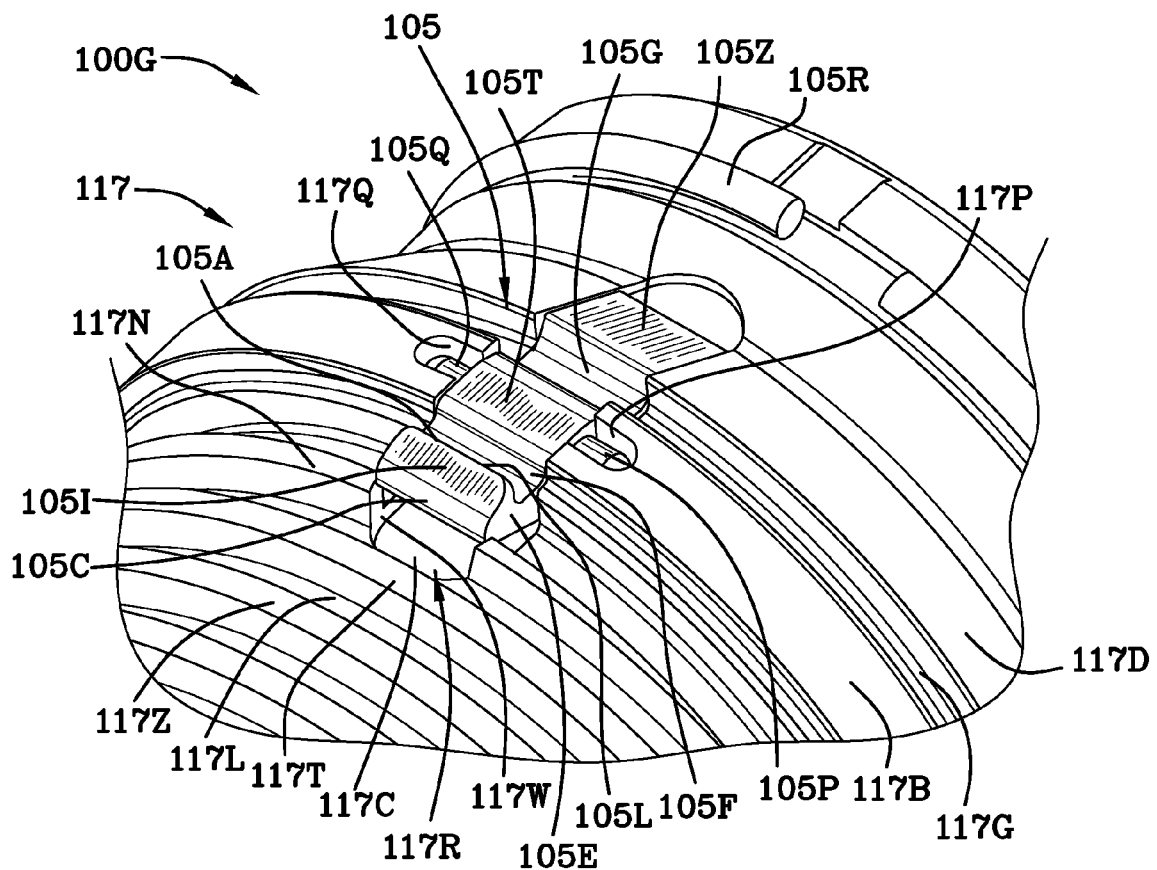
FIG. 1G is a perspective schematic view of the male body having external threads and a receptacle for the locking lever and the locking lever positioned in the receptacle.

Referring to FIG. 1A, male adaptor 113 and snap ring 105R are illustrated. Snap ring 105R secures locking sleeve 105S on the male body. See FIG. 1L. FIG. 1L is a top view 100L of the coupling fully threaded together illustrating the locking sleeve 105S and access window 199 in the locking sleeve 105S.

Still referring to FIG. 1, the female body 103 is threaded to the female adaptor 101. Reference numeral 106 is a seal and reference numeral 110 is a snap ring which limits how far the female sleeve 108 can be unthreaded. Reference numeral 106 is a seal on the outside of the female body 103.

FIG. 1A is a top view 100A of the coupling partially threaded together. Flat bottom 117C of the locking lever receptacle can be seen in FIG. 1A along with the locking lever 105. Recess 105 F, apex 105A, tensioning O-ring 105O, and the sloped end 105Z are illustrated in FIG. 1A. Wall 105W forms the access window or port 199 which enables the male coupling half and the female coupling half to couple and which enables female sleeve 108 to latch to male body 117. More specifically, access window 199 enables the hook of the female sleeve to engage with recess 105F, for example, locking the female sleeve 108 to the male body 117. FIG. 1B is a cross-sectional view 100B of the coupling partially threaded together taken along the lines 1B-1B with female sleeve 108 and hook 108H approaching locking lever 105. Access window 199 is illustrated in cross section and sleeve 105S is illustrated in cross section at the bottom of the view as having a shape, in cross section, which approximates very closely the reciprocal of the shape of the locking lever positioned in locking lever receptacle 117R. See FIGS. 1I, 1J, and 3 for a view of locking lever receptacle 117R. Second O-ring 195 is illustrated in compression between locking sleeve 105S and male body 117. Snap ring 105R blocks locking sleeve 105S from extraction off of male body 117. Circumferential O-ring groove 117G houses O-ring 105O. O-ring 105O retains locking lever 105 from extraction and also serves to position apex 105A of the latching end in a raised position for engagement with hook 108H. FIG. 1B illustrates detents or balls 107 which facilitate rotation of female sleeve 108 and also serve as bearing for pulling female body 103 therewith.

Figure 1I:
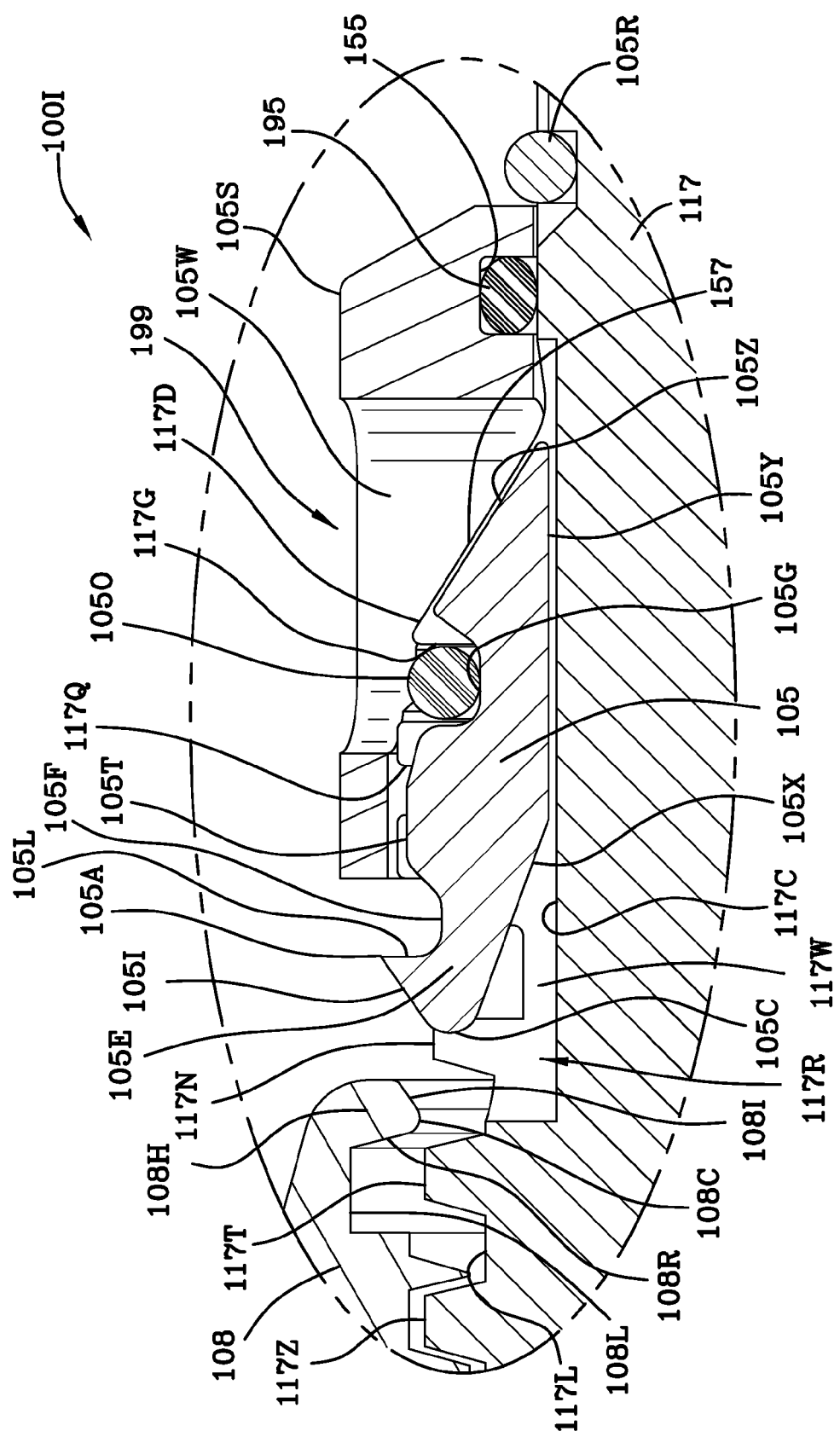
FIG. 1I is an enlargement of a portion of FIG. 1B.

FIG. 1I is an enlargement of a portion 100I of FIG. 1B where considerable more detail is visible. Referring to female sleeve 108, hook portion 108H, inclined portion 108I, radially inwardly surface 108R, curved tip 108C and recess 108L are illustrated well in FIG. 1I. Inclined portion 108I of the hook is at approximately the same angle as inclined portion 105I of the locking lever and this facilitates pushing the hook 108H into engagement with and over the inclined surface 108I as the female sleeve interlocks with the locking lever. See FIGS. 1J and 1K.

Figure 1J:
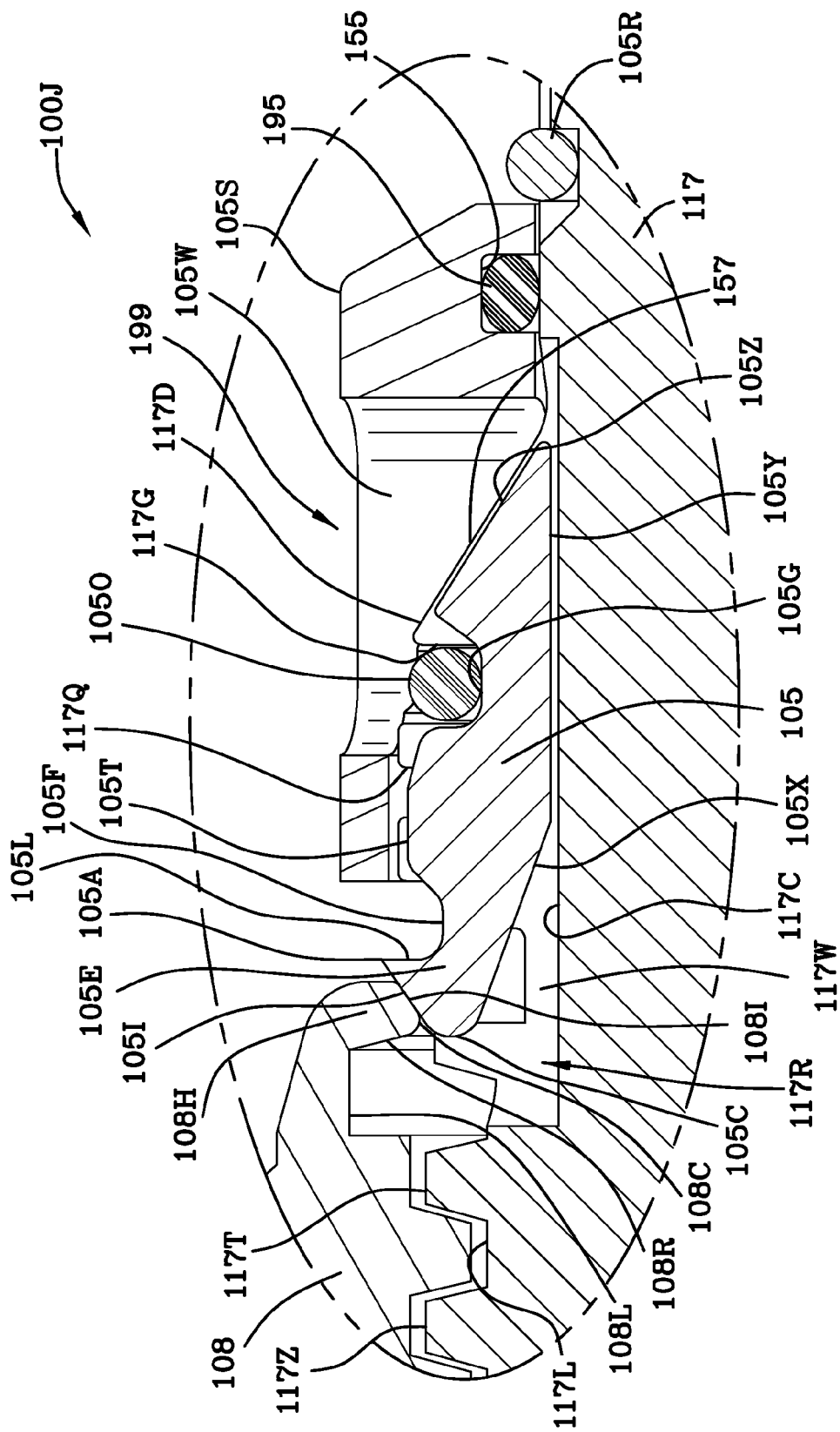
FIG. 1J is a cross-sectional schematic view of the interior hook of the female sleeve engaging the locking lever.
Figure 1K:
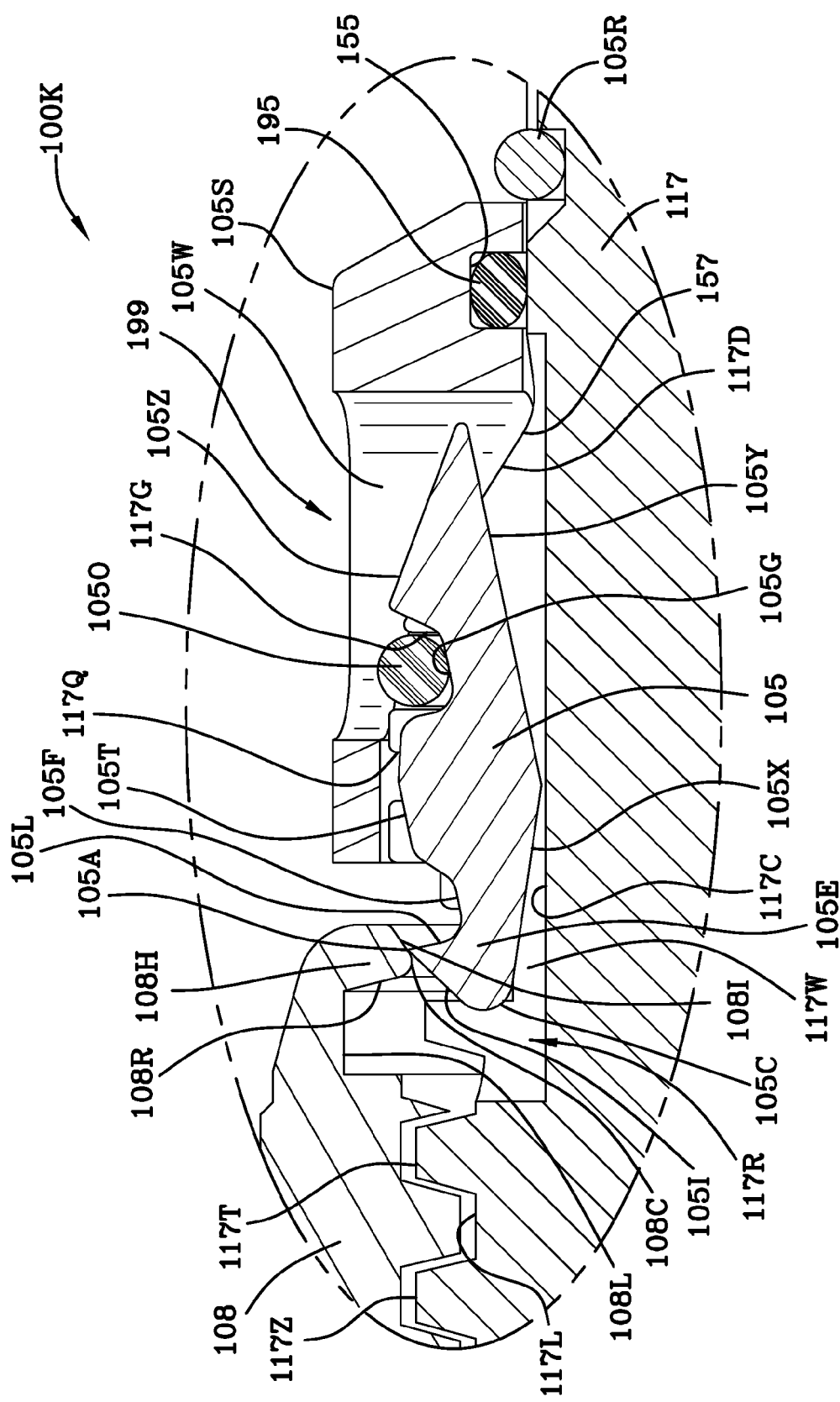
FIG. 1K is a cross-sectional schematic view of the interior hook of the female sleeve engaging the apex of the locking lever.
Figure 1L:
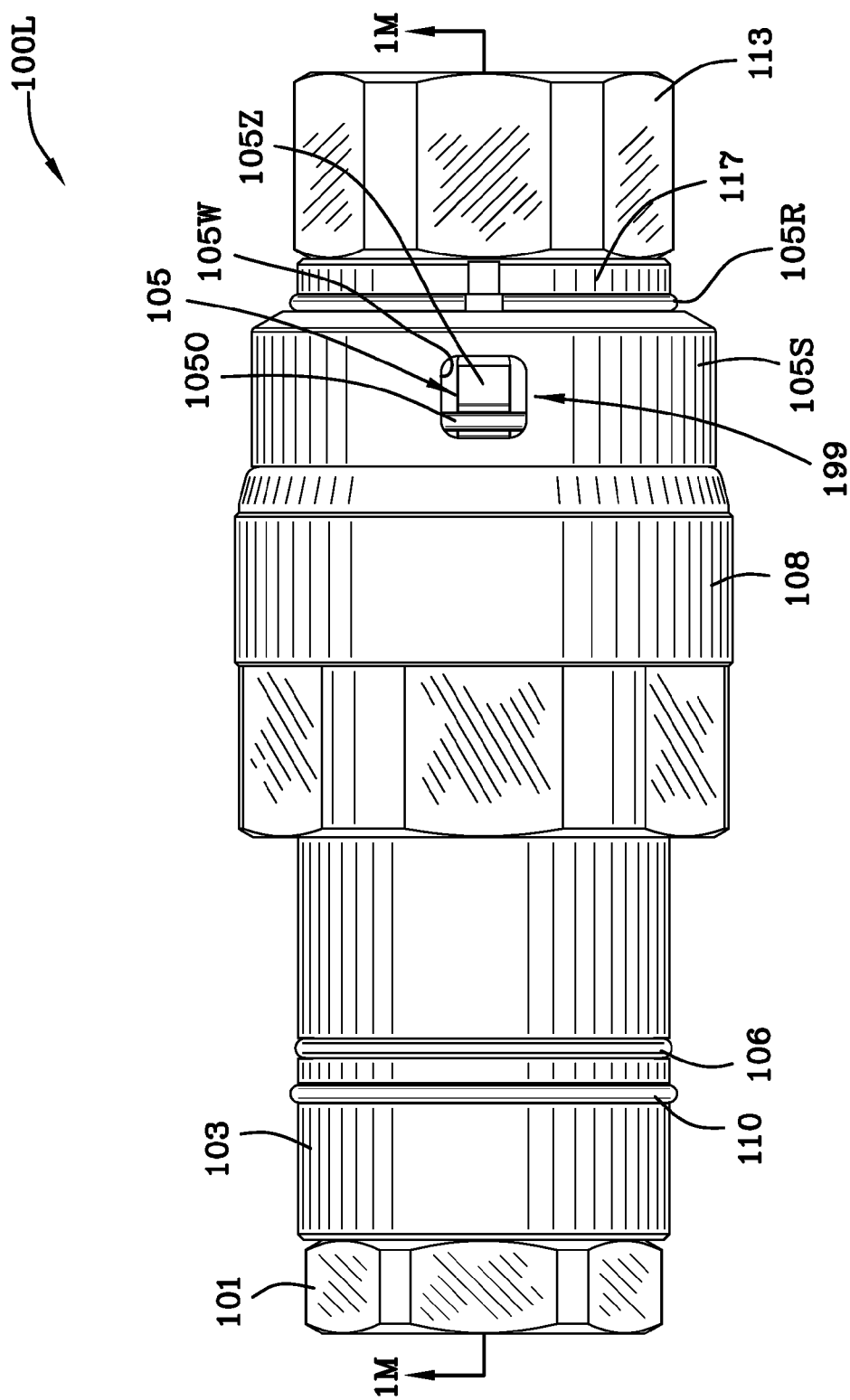
FIG. 1L is a top schematic view of the coupling fully threaded together illustrating the locking sleeve and access window in the locking sleeve.

FIG. 1J is a cross-sectional view 100J of the interior hook 108H of the female sleeve 108 engaging the locking lever 105, specifically, inclined surface 108I of hook 108H is illustrated in sliding engagement with inclined surface 105I but has not progressed longitudinally far enough rightwardly to cause rotation of the latching end 105E of locking lever 105 downwardly. FIG. 1K is a cross-sectional view 100K of the interior hook 108H of the female sleeve 108 engaging the apex 105A of the locking lever 105 causing rotation of the latching end 105E downwardly toward the flat bottom 117C of receptacle 117R. As apex 105A on the latching end 105E is pushed downwardly rotating the sloped end 105Z upwardly into access window 199, neither bottom surface 105X on the latching end 105E of the locking lever 105 nor bottom surface 105Y on the sloped end 105Z of the locking lever 105 engage the flat surface 117C of the locking lever receptacle 117R of the male body 117. Before engagement of the female sleeve 108 with the locking lever 105, the bottom surface 105Y of the locking lever is spaced apart from the flat surface 117C of the locking lever receptacle 117R of the male body 117 as illustrated in FIG. 1I.

Locking lever 105 includes a bottom surface and the bottom surface includes a latching end portion 105X and a sloped end portion 105Y. The latching end portion bottom surface 105X inclined with respect to the locking lever receptacle 117R in the male body when the tensioning O-ring 105O resides in the O-ring slot 105G of the locking lever and in the O-ring slot 117G of the male body 117. Under these conditions the sloped end portion of the bottom surface 105Y is parallel to and in proximity to the locking lever receptacle. See, for example FIG. 1I.

Figure 1M:
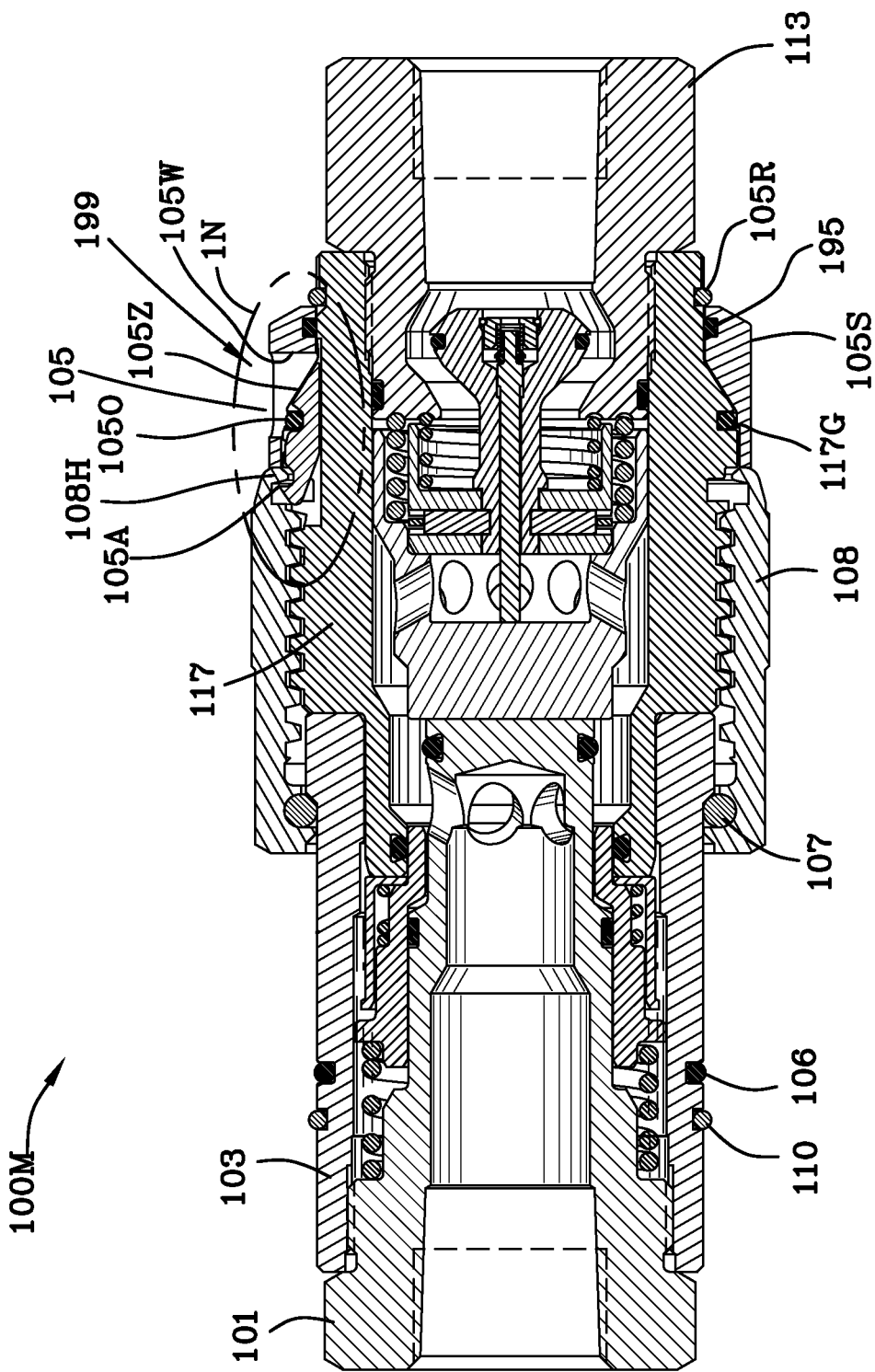
FIG. 1M is a cross-section schematic view of the coupling fully threaded together taken along the lines 1M-1M of FIG. 1L.
Figure 1N:
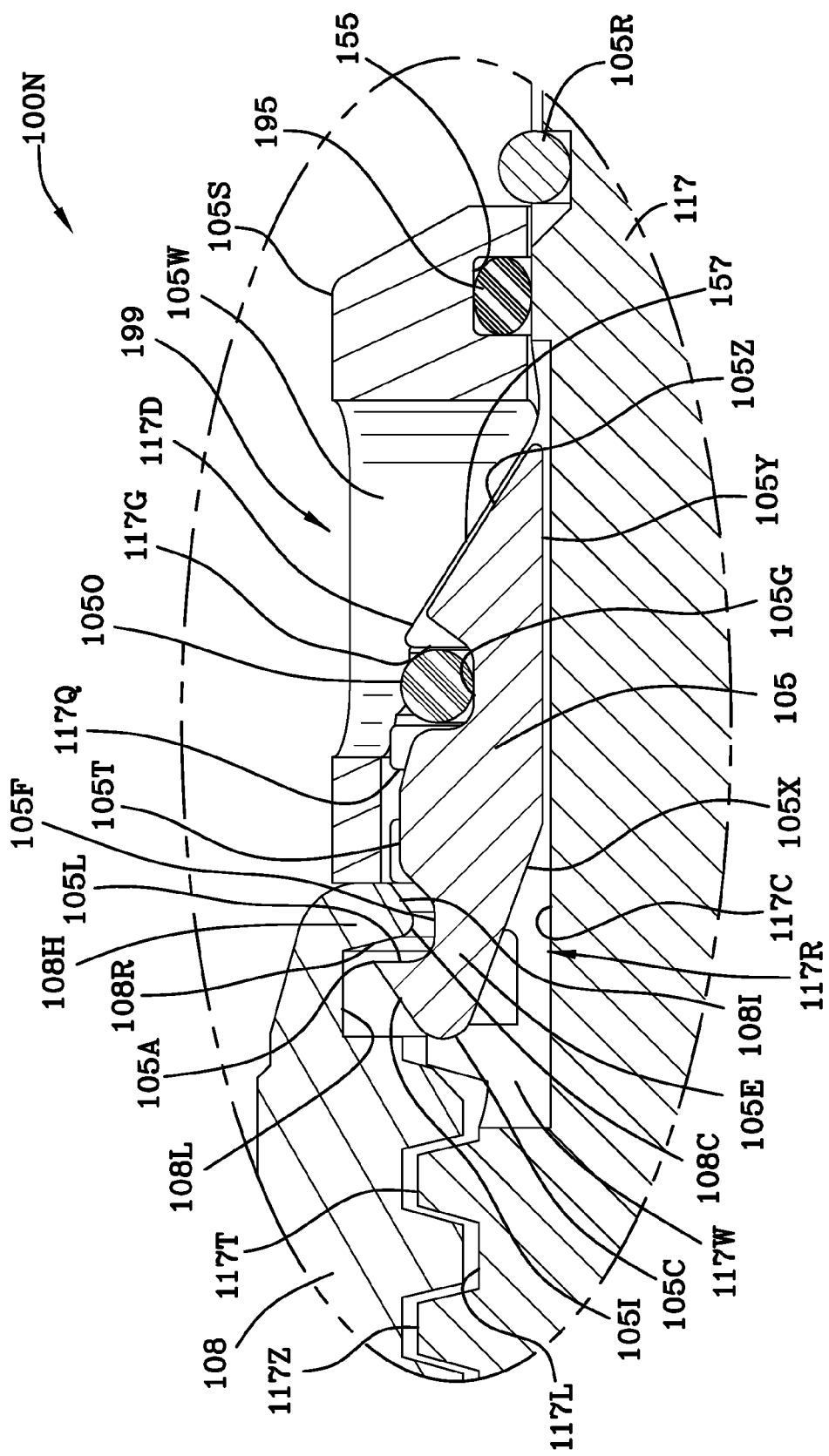
FIG. 1N is an enlargement of a portion of FIG. 1M.
Figure 1P:
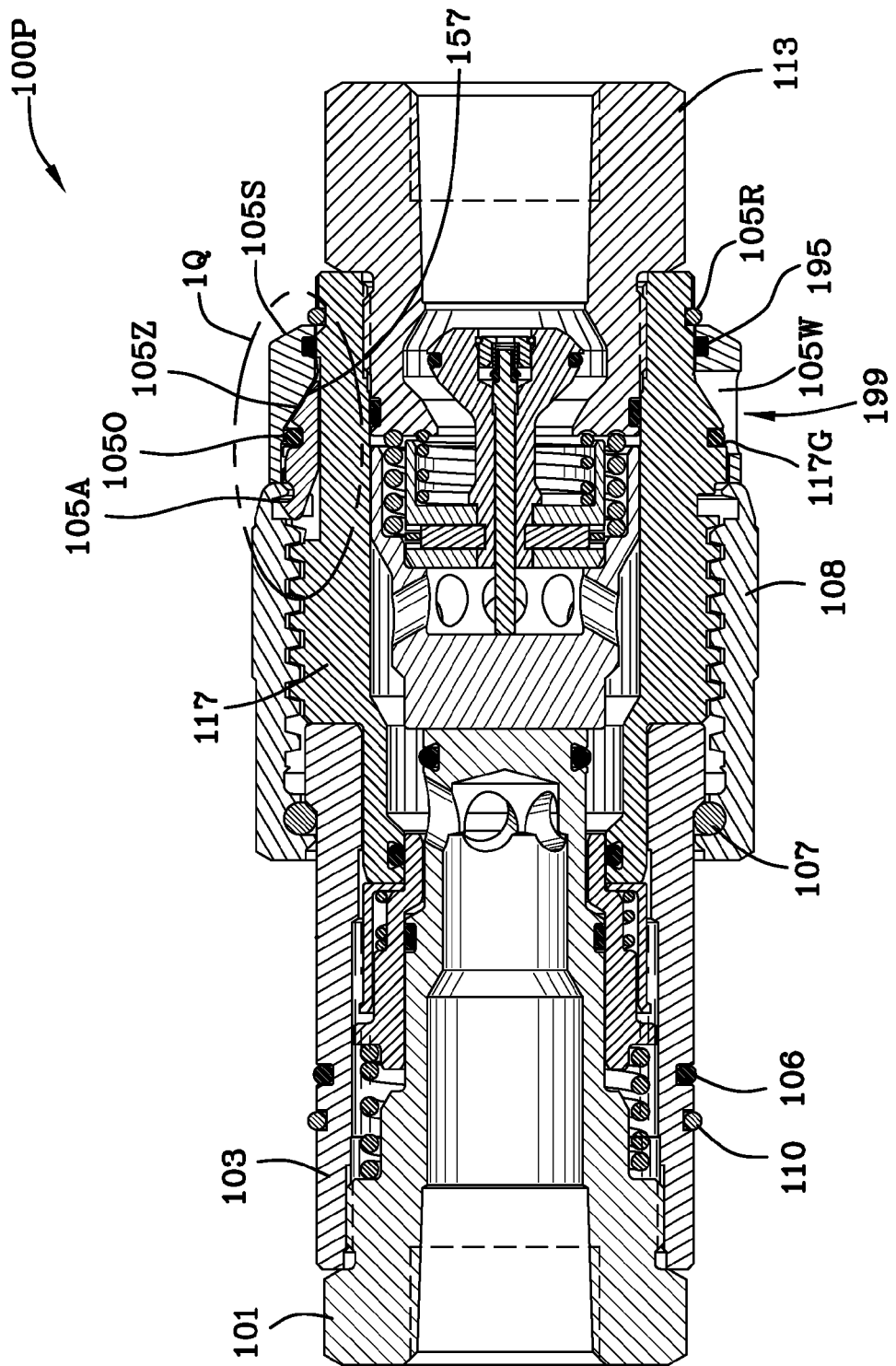
FIG. 1P is a cross-sectional schematic view of the coupling taken along the lines 1P-1P of FIG. 1O.
Figure 1Q:
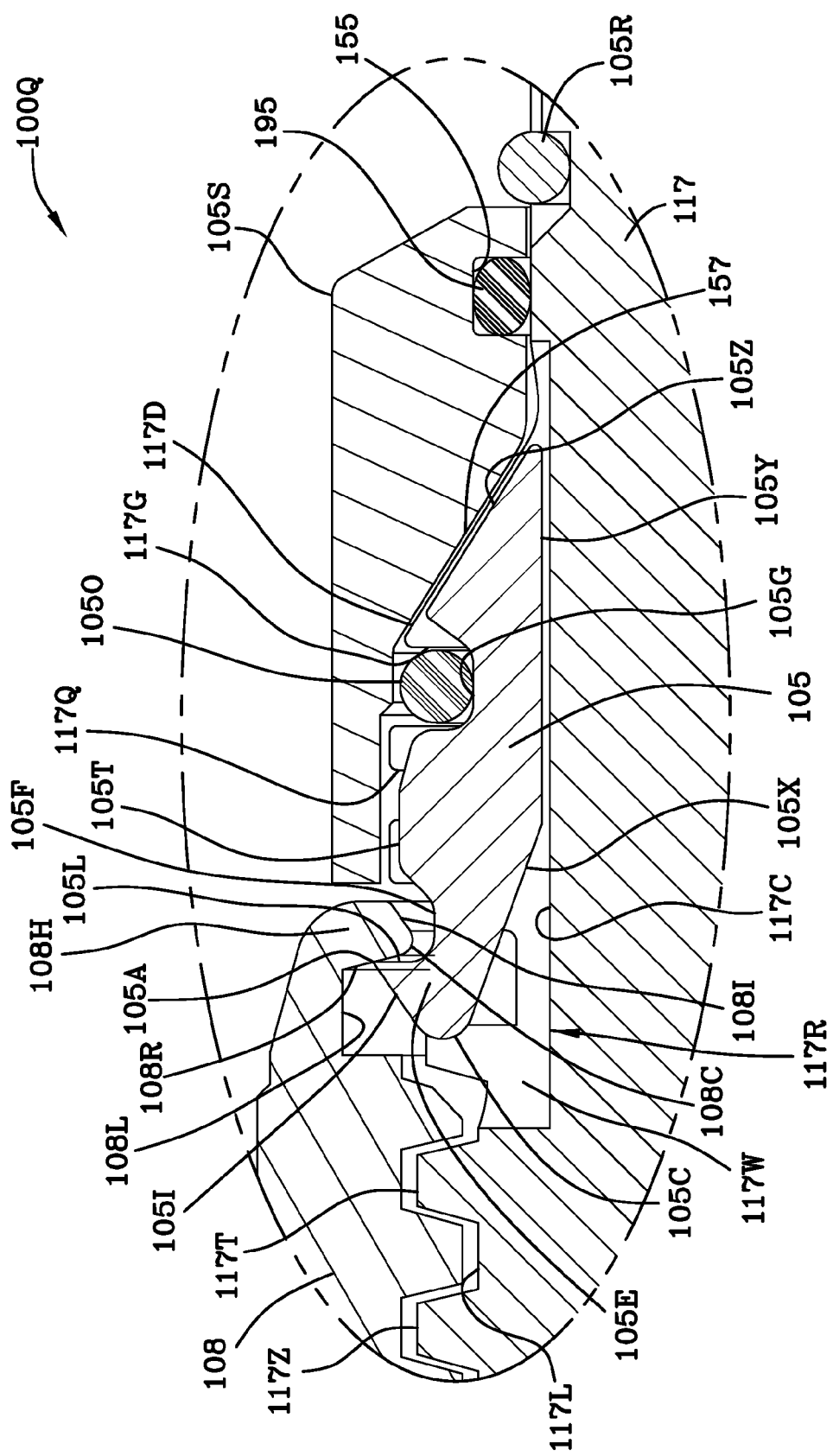
FIG. 1Q is an enlarged portion of FIG. 1P.
Figure 3:
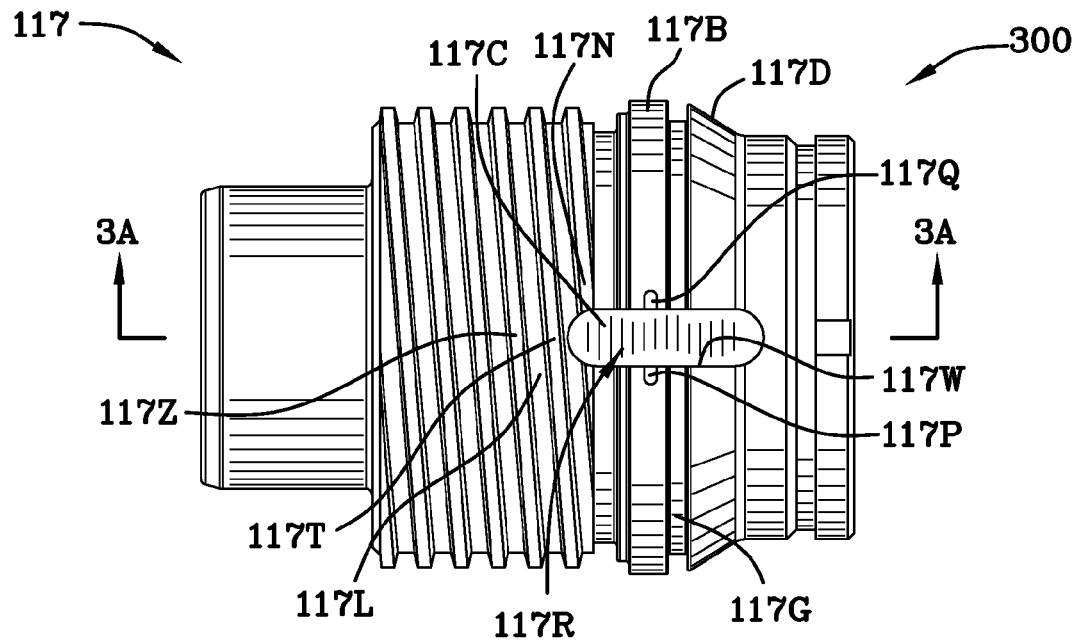
FIG. 3 illustrates a schematic top view of the male body.
Figure 3A:
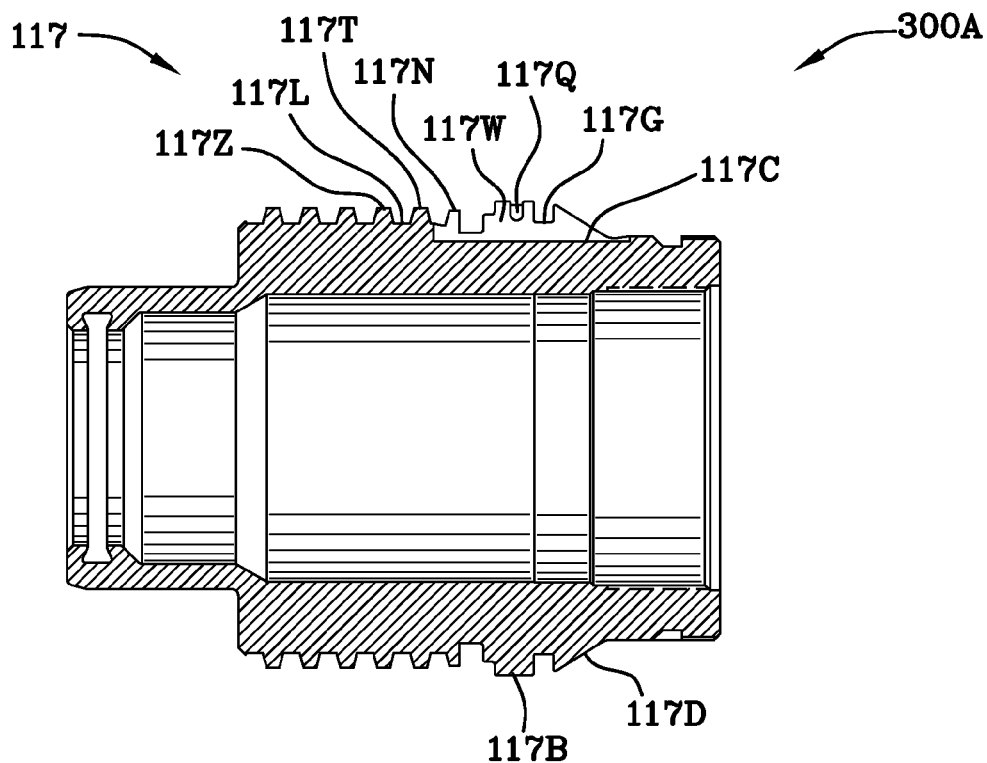
FIG. 3A illustrates a cross-section schematic view of the male body taken along the lines 3A-3A of FIG. 3.

Referring to FIGS. 1C, 1D, 1E, and 1F, different views of the locking lever are illustrated. FIG. 1C is a perspective view 100C of the locking lever 105 illustrating coaxial pins 105Q, 105P which reside in slots 117Q, 117P of the male body 117 as illustrated in FIGS. 1G and 3. FIG. 3 illustrates a top view 300 of the male body 117 and FIG. 3A illustrates a cross-section view 300A of the male body 117 taken along the lines 3A-3A of FIG. 3. FIG. 3 illustrates locking lever receptacle 117R as having a rectangular section closed by two semicircles, one at each end of the rectangle. It is specifically contemplated that the locking lever receptacle may assume different shapes without departing from the spirit and scope of the invention. Reference numeral 117W represents the walls of the receptacle 117R. FIG. 3A illustrates a portion the wall 117W. First and second pin slots 117Q, 117P are illustrated in FIGS. 3 and 3A and the slots reside in a relatively wide band 117B which extends circumferentially around the male body 117. Slot 117Q, 117P are vertically spaced apart from flat surface 117C of the receptacle 117R to ensure that locking lever 105 pivots on an axis sufficiently high so that the bottom surfaces 105X, 105Y do not engage the flat surface 117C of the receptacle 117R in male body 117. FIGS. 3, 3A, 1I, 1J, 1K illustrate ACME threads 117Z, 117T and 117N well. In FIGS. 1I, 1J, and 1K, threads 117Z, 117T and 117N are illustrated with corresponding ACME threads of the female sleeve shown interengaging the aforementioned threads of the male body 117. Groove 117L between 117T and 11Z is also illustrated. Any type of threads may be used without departing from the spirit and the scope of the invention. Further, the threaded interconnection is illustrated with gaps between engaging threads. These gaps are shown to illustrate the interengagement of the threads and in actual practice there will be metal to metal engagement of the threads. Similarly in FIG. 1N, which illustrates hook 108H not engaging the latching surface 105L of the latching end occurs in certain circumstances due to the stack up of tolerances and the state of the threading process, and, further it will be understood that these illustrations are diagrammatic and schematic. Actual metal to metal contact between hook 108H and the latching surface 105L occurs due to the stack up of tolerances and other factors such as vibration of the coupling and is shown, for instance, in FIG. 1Q. For instance, reference is made to FIG. 1O. FIG. 1O is a top schematic view 100O of the coupling fully threaded together with the locking sleeve 105S rotated such that the access window is not visible. FIG. 1P is a cross-sectional schematic view 100P of the coupling taken along the lines 1P-1P of FIG. 1O. FIG. 1Q is an enlarged portion 100Q of FIG. 1P. FIG. 1Q is similar to FIG. 1N except that the female sleeve 108 and hook are illustrated as engaging the apex 105A and surface 105L of the locking lever 105.

Referring again to FIG. 1C, the flat top 105T of the locking lever 105 is illustrated between the tensioning O-ring groove 105G and the recess 105F. The latching end 105E includes a rounded portion 105C of the inclined surface 105I. Inclined surface 105I terminates in apex 105A. Latching surface 105L drops sharply down to recess 105F. Sloped end 105Z matches the profile of the slope 117D of the male body as illustrated in FIGS. 1G, 3 and 3A. Planar bottom surfaces 105X, 105Y intersect each other at a line of intersection as illustrated in FIG. 1F. FIG. 1F is a bottom side view 100F of the locking lever, FIG. 1D is a top view 100D of the locking lever, and FIG. 1E is a left side view 100E of the locking lever. FIG. 1H is a right side view 100H of the locking lever. Reference numeral 105M denotes the side walls of the locking lever.

First and second pins 105Q, 105P are coaxial with respect to one another and, hence, the coaxial pins share an axis. There is a radius from the axis of the coaxial pins to the line of intersection of the planes formed by bottom surface 105X, 105Y. The radius is smaller than the distance from the axis of the pins to the locking lever receptacle when the first and second pins reside in the first and second slots of the receptacle.

Figure 4:
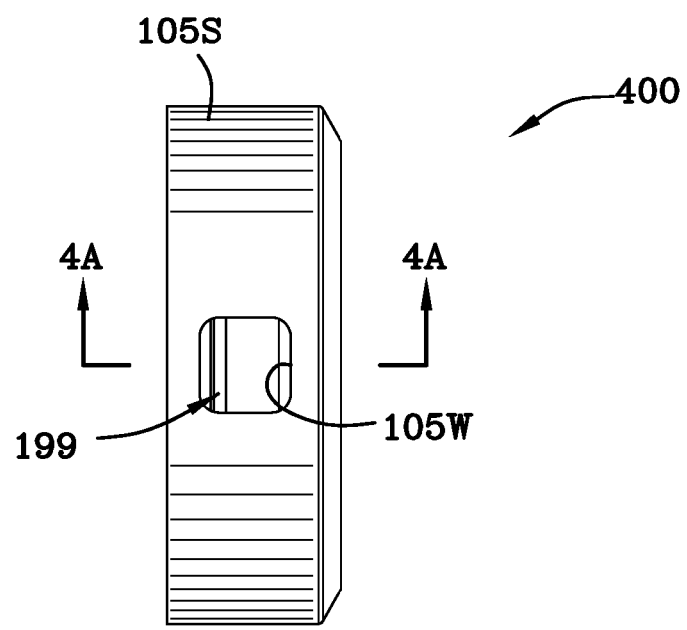
FIG. 4 is a top schematic view of the locking sleeve illustrating the access window.
Figure 4A:
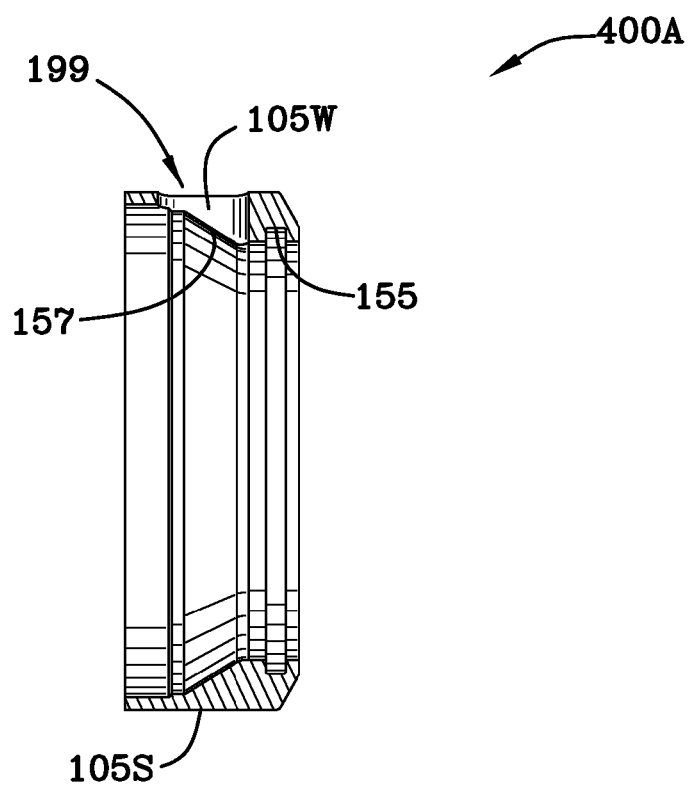
FIG. 4A is a cross-sectional schematic view taken along the lines 4A-4A of FIG. 4.

Referring again to FIGS. 1I, 3 and 3A, partial male thread 117N is illustrated in the background. Wall 117W of receptacle 117R is illustrated as well. Second O-ring 195 is illustrated in 1I as being in compression which causes friction when locking sleeve 105S is rotated with respect to the male body 117. Referring to FIG. 1I, sloped end 105Z of the locking lever is illustrated as having the same slope as the internal surface 157 of the locking sleeve. The internal surface of the locking sleeve may employ a different shape. FIG. 4 is a top view 400 of the locking sleeve 105S illustrating the access window 199 and FIG. 4A is a cross-sectional view 400A taken along the lines 4A-4A of FIG. 4 illustrating the O-ring groove 155 therein in which the second O-ring 195 resides in compression. Still referring to FIG. 1I, sloped surface 117D of the male body 117 is illustrated. FIG. 1I depicts that locking sleeve 105S has a reciprocally sloped surface to surface 117D of the male body and to sloped end 105Z of the locking lever.

Referring to FIG. 1I, the O-ring groove 105G is illustrated as being in alignment with O-ring groove 117G of the male body 117. FIG. 1G is a perspective view 100G of the male body 117 having external threads 117Z, 117T, 117N, a receptacle 117R for the locking lever 105, an O-ring groove 117G for an O-ring 105O (not shown in FIG. 1G) which biases the latching end portion 105E of the locking lever upwardly. FIG. 1G illustrates the sloped end 105Z residing at the same angle downward as circumferential surface 117D. FIG. 1G also illustrates the circumferentially extending relatively broad surface 117B. Tensioning O-ring 105O not shown in this view is necessary to secure the locking lever 105 seated in locking lever receptacle 117R. Snap ring 105R is illustrated in FIG. 1G and it is this snap-ring which retains the locking sleeve longitudinally. By longitudinal it is meant along the axis of the coupling or in the direction along which flow through the coupling would occur. Referring to FIG. 1G, tensioning O-ring groove 117G is illustrated in alignment with locking lever O-ring groove 105G.

FIGS. 1I, 1J, 1K illustrate the progression of continuous threading of the female sleeve 108 onto the threads of the male body. In FIG. 1I, no engagement of the female sleeve and the locking lever has taken place. In FIG. 1J the female sleeve has been threaded far enough onto the male body that the hook surface 108I of the female sleeve is engaging the inclined surface 105I of the latching end 105E of the lever but no rotation of the locking lever has taken place. In FIG. 1K, surface 108I is illustrated engaging the apex 105A of the latching end of the locking lever pushing the latching end downwardly and rotating the locking lever against the force of the tensioning O-ring 105O. O-ring 105O is illustrated in FIG. 1K as being under tension and slightly raised as O-ring groove 105G of the lever has been raised by the pivoting action.

FIG. 1L is a schematic top view 100L of the coupling fully threaded together with the locking sleeve 105S and access window 199 in the locking sleeve 105S. FIG. 1M is a cross-section schematic view 100M of the coupling fully threaded together taken along the lines 1M-1M of FIG. 1L. FIG. 1N is an enlargement 100N of a portion of FIG. 1M. In FIG. 1N the female sleeve 108 has fully threaded onto the locking lever 105. Female sleeve 108 resides in proximity with locking sleeve 105S and snap ring 105R restrains against longitudinal movement of locking sleeve 105S. Hook 108H resides in proximity with locking sleeve 105S. FIG. 1N illustrates that the tensioning O-ring 105O has returned to its normal position and latching end 105E has returned to its normal raised position. In FIG. 1N, the locking sleeve has not yet been rotated about the male body so as to put the coupling in a condition where it cannot be unthreaded.

FIG. 1O is a top schematic view 100O of the coupling fully threaded together with the locking sleeve 105S rotated such that the access window is not visible. FIG. 1P is a cross-sectional view 100P of the coupling taken along the lines 1P-1P of FIG. 1O. FIG. 1P illustrates that the access window has been rotated 180° from the position illustrated in FIGS. L, M and N. FIG. 1Q is an enlarged portion 100Q of FIG. 1P illustrating that the coupling is now in the safe position and cannot be unthreaded as the unthreading is blocked by the locking sleeve 105S and no rotation of the locking lever can occur and, therefore, the coupling is locked together until, and if, someone rotates the locking sleeve against the resistance provided by second O-ring 195 which is under compression. Further, FIG. 1Q illustrates hook 108H engaging lever 105. Hook 108H when fully locked may be in the position shown in FIG. 1N or the position shown in FIG. 1Q depending on the tolerance stack up of the components and also depending on vibration and the like which may move the female sleeve 108 to the position illustrated in FIG. 1Q. Additionally, hook 108H may reside anywhere between the positions shown in FIGS. 1N and 1Q.

Figure 1R:
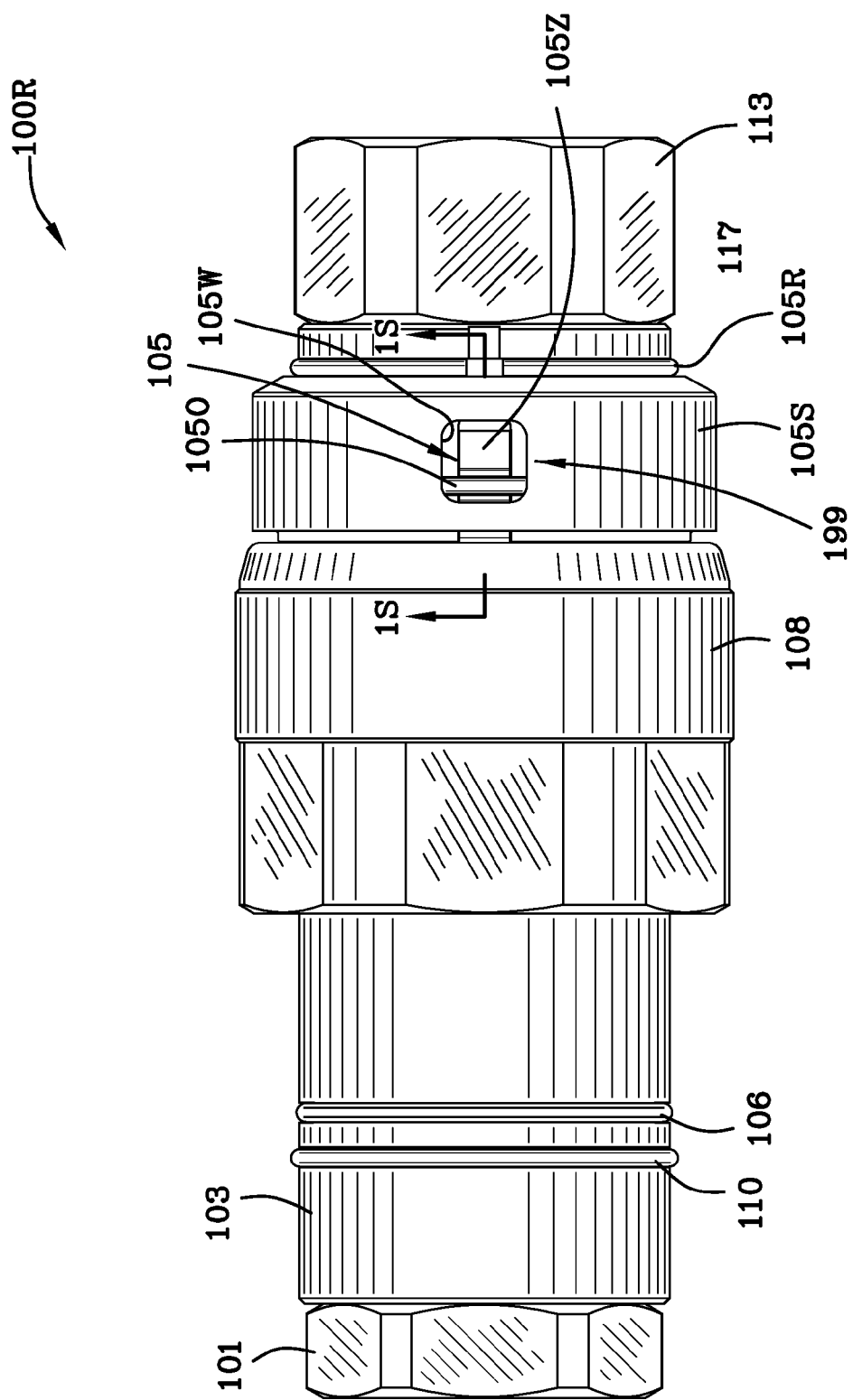
FIG. 1R is a top schematic view of the coupling in the early stage of being unthreaded.
Figure 1S:
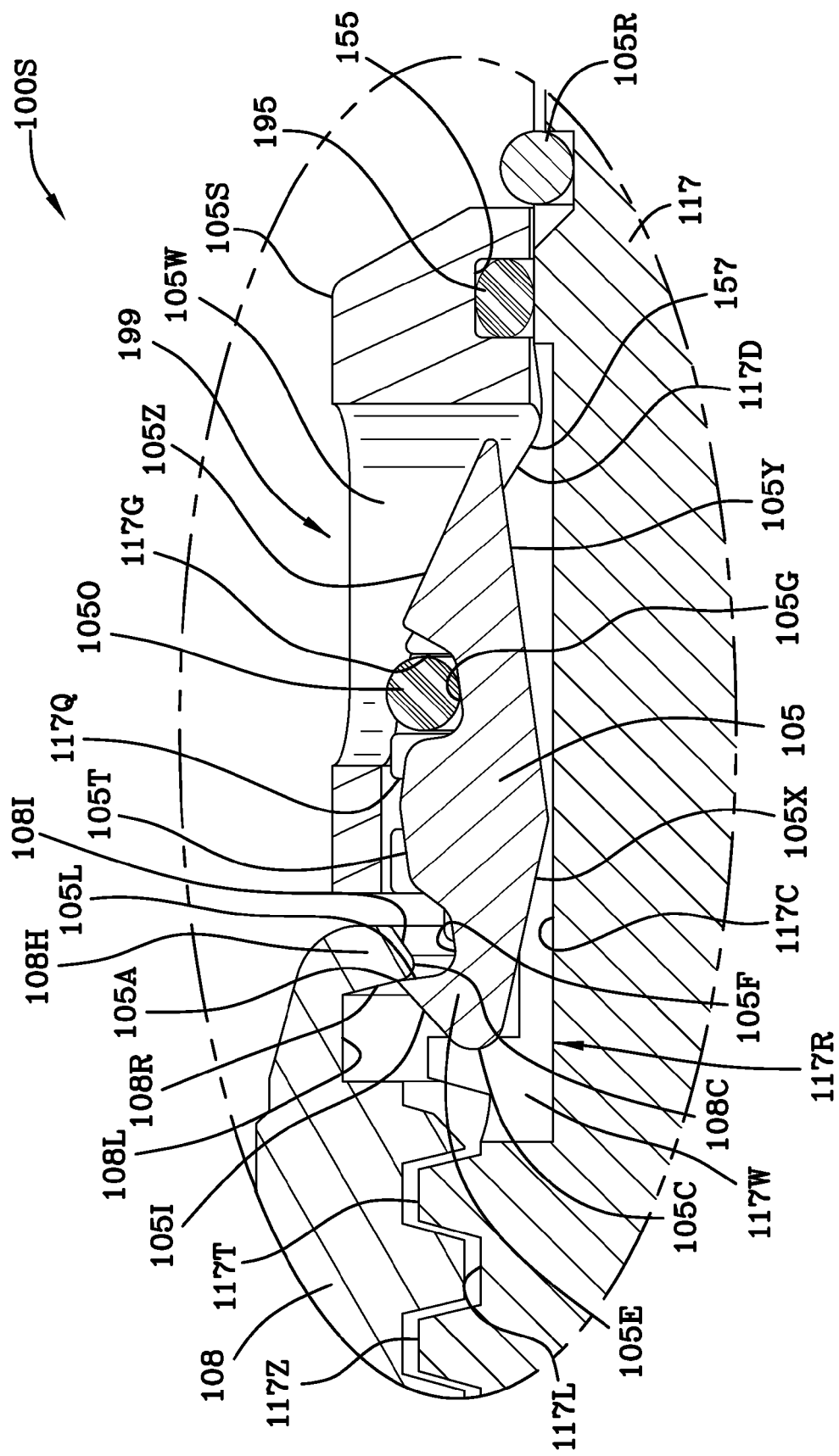
FIG. 1S is a cross-sectional schematic view of a portion of FIG. 1R illustrating the latch end of locking lever partially rotated downwardly and the hook portion of the female sleeve.
Figure 1T:
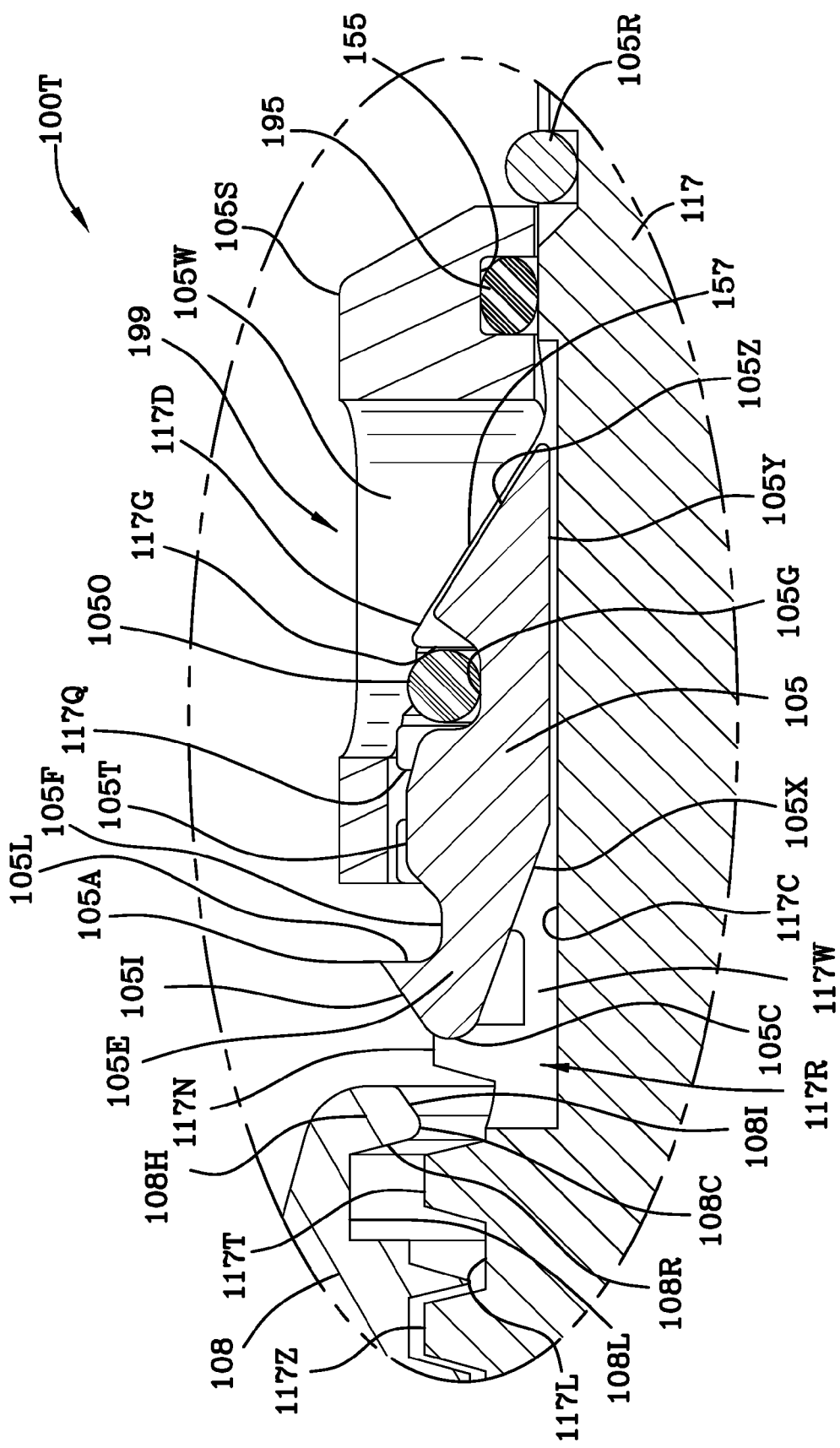
FIG. 1T is a cross-sectional schematic view illustrating the coupling being further along in the unthreading process with the locking lever and the hook portion of the female sleeve disengaged.

FIG. 1R is a top schematic view 100R of the coupling in the early stage of being unthreaded, that is, the female sleeve is in the process of being unthreaded with respect to the threads of the male body. In FIG. 1R, the access window has been rotated to a position in alignment with the locking lever. FIG. 1S is a cross-sectional schematic view 100S of a portion of FIG. 1R illustrating the latch end 105E of locking lever partially rotated downwardly with the inwardly radially extending portion 108R of the hook portion 108H of the female sleeve engaging the surface 105L of the latch end 105E. Surface 105L is a flat surface that extends from the recess of the locking end to the apex 105A of the latch end 105E. FIG. 1T is a cross-sectional view 100T illustrating the female sleeve 108 being further along in the unthreading process with the locking lever 105 and the hook portion 108H of the female sleeve disengaged.

Figure 2:
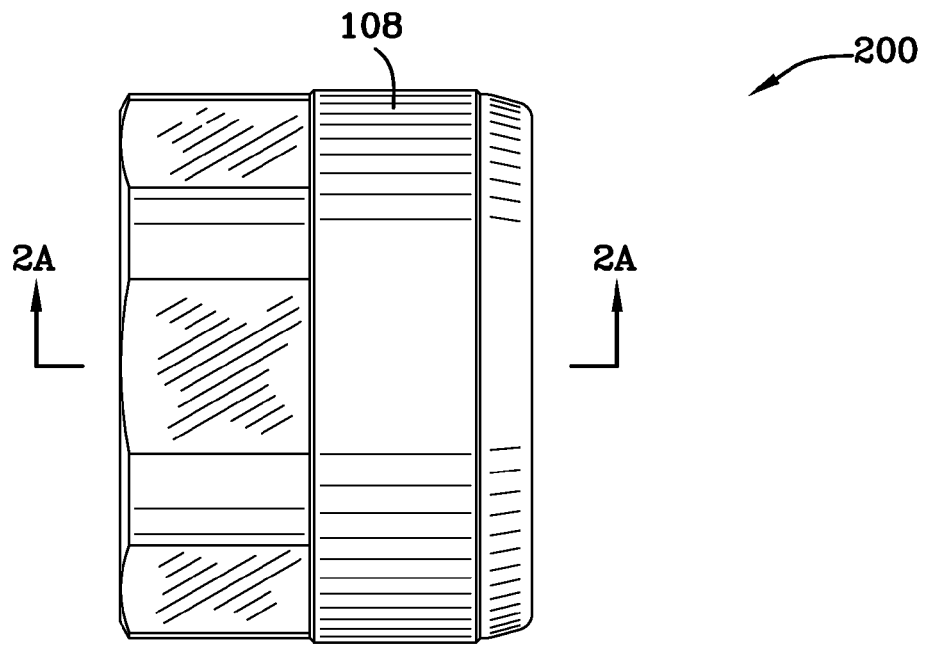
FIG. 2 illustrates a front schematic view of the female sleeve.
Figure 2A:
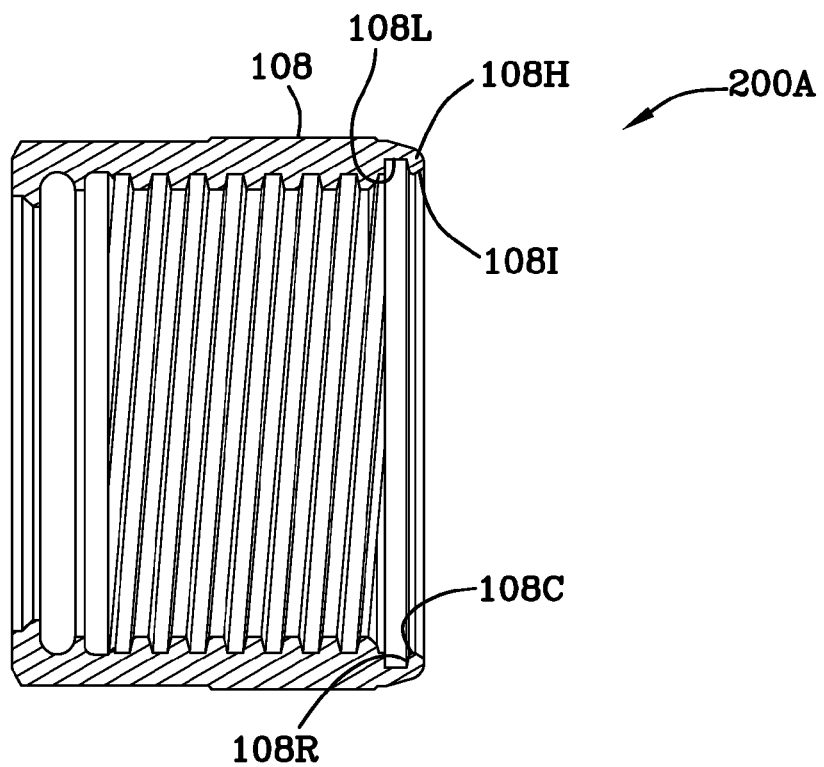
FIG. 2A illustrates a cross-section schematic view of the female sleeve taken along the lines 2A-2A of FIG. 2.

FIG. 2 illustrates a front schematic view 200 of the female sleeve 108 and FIG. 2A illustrates a cross-section schematic view 200A of the female sleeve 108 taken along the lines 2A-2A of FIG. 2. Hook 108H is illustrated in FIG. 2A.

Referring to FIG. 1L, a threaded coupling includes a generally cylindrically shaped male coupling half and a generally cylindrically shaped female coupling half. The male coupling half includes a male body 117 and the male body includes an exterior, and the exterior of the male body includes external threads 117Z, 117T, and 117N thereon. See FIG. 3. The female coupling half includes a body 103 and a female sleeve 108. See FIGS. 2 and 2A. The female sleeve 108 and the male body 117 are threaded together. The female sleeve further includes an interior and interior of the female sleeve includes internal threads. The external threads of the male body 117Z, 117T are in mating engagement with the internal threads of the female sleeve 108. See FIGS. 1I, 1J, 1K and others. Female sleeve 108 further includes an end portion and the end portion of the female sleeve includes an interior hook 108H formed therein. The male body 117 includes a locking lever receptacle 117R recessed in the exterior of the male body 117, and the locking lever receptacle 117R of the male body further includes first and second slots 117Q, 117P therein. A locking lever 105 includes coaxial first and second pivot pins 105Q, 105P, a latching end 105E and a sloped end 105Z. The latching end 105E of the latching lever includes a recess 105F and a latching surface 105L. The first and second pivot pins 105Q, 105P of the locking lever reside in the first and second slots 117Q, 117P of the locking lever receptacle 117R of the male body. The locking lever pivots about the pivot pins as illustrated in FIG. 1K and the locking lever includes an O-ring slot therein.

The male body 117 includes an O-ring 117G slot therein which extends circumferentially around the generally cylindrically shaped male body 117 and is aligned with the O-ring slot 105G in the locking lever. See FIG. 1G. A tensioning O-ring 105O extends circumferentially in the O-ring slot 117G in the male body and in the O-ring slot 105G in the locking lever biasing the latching end 105E of the locking lever to a raised position for engagement with the interior hook 108H formed on the end of the female sleeve 108. The tensioning O-ring 105O secures the locking lever 105 in the receptacle 117R. The latched end 105E of the locking lever 105 is raised for engagement with the interior hook 108H of the female sleeve prior to engagement. See FIG. 1I. During engagement of the female sleeve and the locking lever, the hook 108H of the end of the female sleeve engages the apex 105A of the latching end 105E of the locking lever and the latching end 105E of the locking lever pivots about the first and second pivot pins to a position proximate the receptacle 117R of the male body. See FIG. 1K.

Once the hook 108H, recess 105F of the latching end 105E, and/or the latching end 105E of the locking lever, are fully engaged, the latching end 105E of the locking lever is returned to the raised position under the force of the tensioning O-ring. See FIG. 1N. When the latching end of the locking lever is forced downwardly under the force of the interior or inner hook of the female, the tensioning O-ring is under additional tension and is slightly raised. The tensioning O-ring 105O is under some tension even when the locking lever is not being rotated.

A locking sleeve 105S is employed to ensure that the inner hook 108H of the female sleeve 108 remains engaged with the locking lever 105 which is inserted into the male body. When the locking lever 105 is inserted in the receptacle 117R of the male body 117, the pins 105Q, 105P, the tensioning O-ring 105O, and the locking sleeve 105S secure the locking lever 105 in place against the force of the female sleeve 108 in the event that someone attempts to unthread the female sleeve 108 from the male body inappropriately/improperly or that vibration is attempts to loosen the coupling halves and unthread them.

The locking sleeve 108 is generally cylindrically shaped and engages the exterior of the male body 117 and extends circumferentially thereabout. The locking sleeve resides in proximity with the female sleeve when the male and female halves are fully coupled and when the female sleeve and the male body are fully threaded together, and, the locking sleeve prevents the coupling halves from being unthreaded. The locking sleeve 105S includes an appropriately sized access window 199 or port therethrough which enables latching and unlatching the interior hook 108H of the female sleeve 108 from the male body 117. The appropriately sized access window or port when aligned with the locking lever permits the locking lever to rotate to accomplish either the latching or unlatching of the hook and the recess of the locking lever and, hence, coupling or uncoupling of the female sleeve and the male body. See FIGS. 1I, 1J, 1S and 1T, for example.

The locking lever includes a sloped end 105Z and the interior of the locking sleeve includes reciprocally shaped sloped end 157 which blocks rotation of the locking lever 105 unless the access window 199 or port is aligned with the locking lever 105. The locking sleeve 105S is rotatable from an unlocked position to a locked position where it is not possible to lock or unlock the male body and the female sleeve. See FIGS. 1O and 1P. A second O-ring 195 resides in an O-ring groove 155 in the locking sleeve 105S and is interposed in compression between the locking sleeve and the male body 117. The second O-ring 195 resides in compression in an O-ring groove 155 of the locking sleeve. The second O-ring is in engagement with the exterior of the male coupling and grips the exterior of the male coupling inhibiting unwanted rotation of the sleeve with respect to the exterior of the male body thus preventing inadvertent alignment of the access window with the locking lever.

A process for locking a threaded coupling wherein the coupling includes: a male body having external threads 117Z, 117T and a female sleeve 108 having internal threads; the male body 117 includes an O-ring slot 117G therein, a locking lever receptacle 117R, and, a raised portion 117B, the raised portion 117B includes first and second slots 117Q. 117P; the female coupling further includes an end portion, and, the end portion includes a hook 108H; a locking lever 105, the locking lever includes a latching end 105E having a recess therein 105F, first and second pins 105Q, 105P, an O-ring slot 105G and a sloped end 105Z. The process includes the steps of: inserting the locking lever 105 into the receptacle 117R of the male body 117 and inserting the first and second pins 105Q, 105P of the locking lever 105 into the first and second slots 117Q, 117P of the raised portion 117B of the male body, the first and second pins of the locking lever permitting rotation of the lever about the pins; positioning an O-ring 105O in the O-ring slot 117G of the male body 117 and in the O-ring slot 105G of the locking lever securing the locking lever with respect to the male body, the O-ring permitting rotation of the locking lever about the pins with resistance to the rotation; and, progressively threading the female coupling having internal threads onto the male body having external threads moving the hook longitudinally toward the locking lever; engaging the hook 108H and the latching end 105E of the locking lever, and as the progressive threading continues, the hook 108H moving and forcing the locking lever 105 to rotate the latching end thereof radially downwardly toward the male body; extending the hook 108H of the female sleeve 108 longitudinally further until the hook 108H proceeds into the recess 105F of the locking lever and the locking lever rotates the latching end thereof upwardly; and, interengaging the hook of the female sleeve and the recess of the locking lever securing the male body and the female sleeve together; locking the interengaged hook of the female member and the recess of the latching end of the locking lever together using a locking sleeve; positioning the locking sleeve between the hook of the female member and a snap ring affixed in the male member; inhibiting rotation of the locking sleeve against unwanted rotation of the locking sleeve by vibration by interposing a second O-ring between the male body and the sleeve such that force is required to rotate the locking sleeve with respect to the male portion.

The locking lever 105 includes a bottom surface 105X, 105Y and the lever receptacle 117R includes a flat surface. The bottom surface 105X, 105Y of the locking lever is spaced apart from the flat surface 117C of the receptacle 117R thus enabling the locking lever to pivot without engagement with the flat surface 117C of the receptacle. The locking lever pivots about the coaxial pins 105Q, 105P during engagement of the lever with the interior hook 108H of the female sleeve 108.

Figure 5:
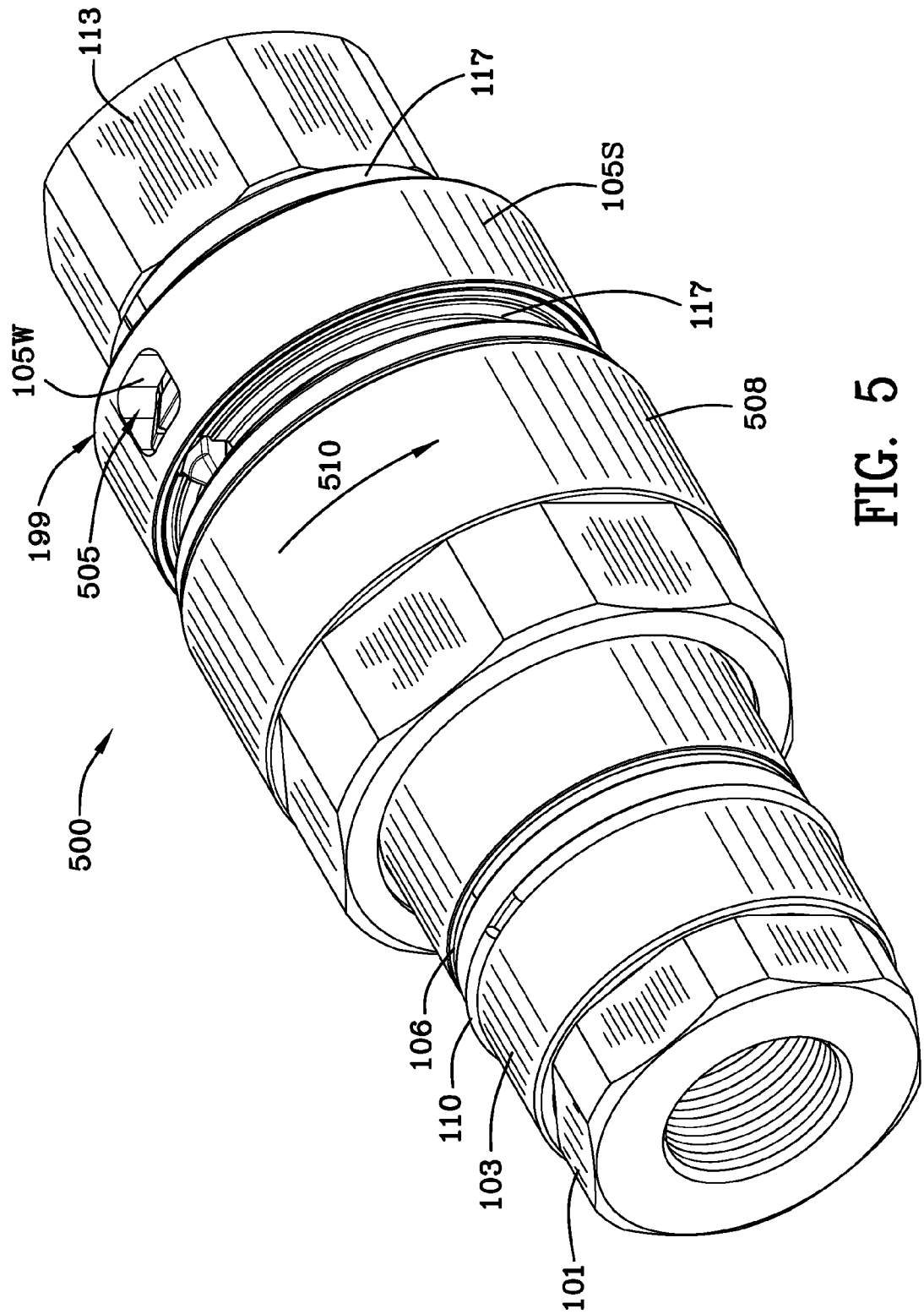
FIG. 5 is a perspective schematic view of the second example of the coupling partially threaded together.

FIG. 5 is a perspective schematic view 500 of the second example of the threaded coupling partially threaded together. Arrow 510 indicates the direction of rotation of the female sleeve 508 as the coupling progresses toward complete coupling. The second example of the locking lever 505 is indicated by arrow 505. The remaining reference numerals illustrated on FIG. 5 in the 100 series numerals, for instance reference numerals 101, 103, 106, 110, 113, 117, 105S, 199, 105W, have the same structure, meaning and function as previously described hereinabove and the description thereof will not be repeated or duplicated herein. Additionally, in regard to FIGS. 5A through 5V the 100 series numerals have the same structure, meaning and function as previously described hereinabove and the description thereof will not be repeated or duplicated herein.

Figure 5A:
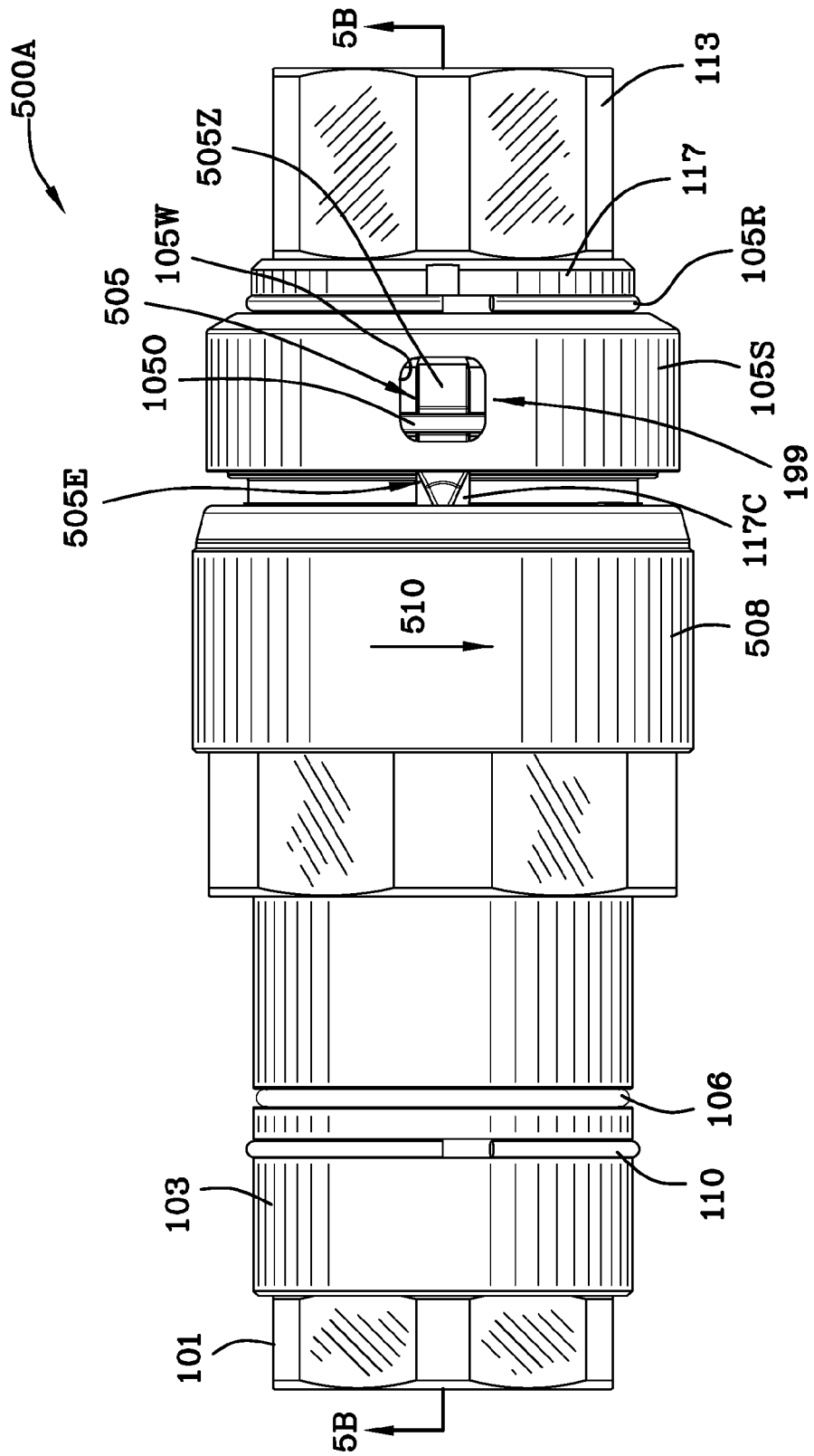
FIG. 5A is a top schematic view of the second example of the coupling partially threaded together.

FIG. 5A is a top schematic view 500A of the second example of the threaded coupling partially threaded together and in the process of being threaded together. The second example of the female sleeve 508 is illustrated as being rotated in the direction of arrow 510. Access window 199 enables viewing of the second example of the locking lever 505, the O-ring 105"O" securing the locking lever 505 in place, and the blocking end portion 505E engaging the second example of sleeve 508.

Figure 5B:
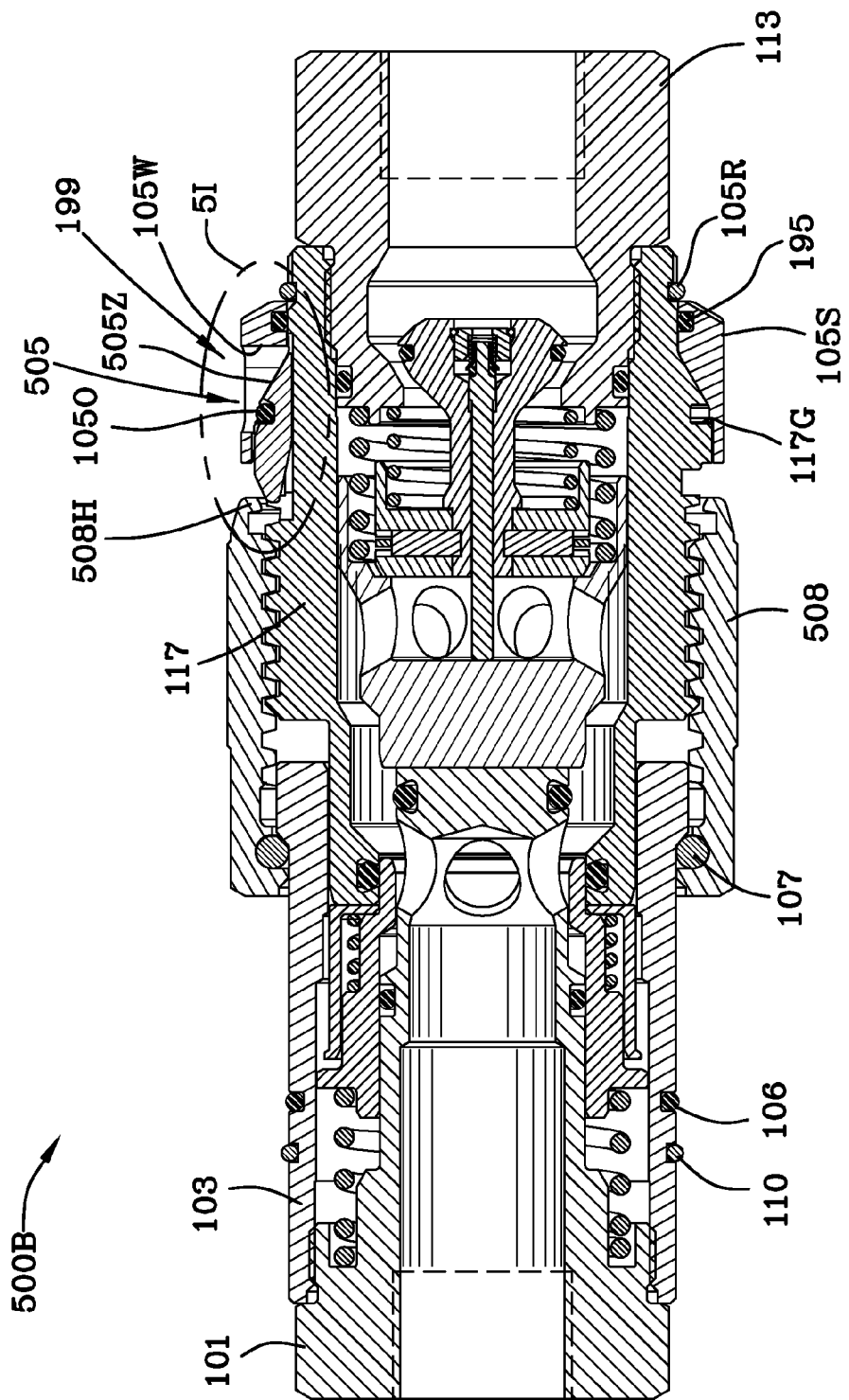
FIG. 5B is a cross-sectional schematic view of the second example of the coupling partially threaded together taken along the lines 5B-5B of FIG. 5A.

FIG. 5B is a cross-sectional schematic view 500B of the second example of the coupling partially threaded together taken along the lines 5B-5B of FIG. 5A. FIG. 5B illustrates the hook portion 508H of the second example of the female sleeve 508 approaching the second example of the locking lever 505. FIGS. 5, 5A and 5B all illustrate access window 199 of the locking sleeve 105S aligned with the locking lever 505.

Figure 5C:
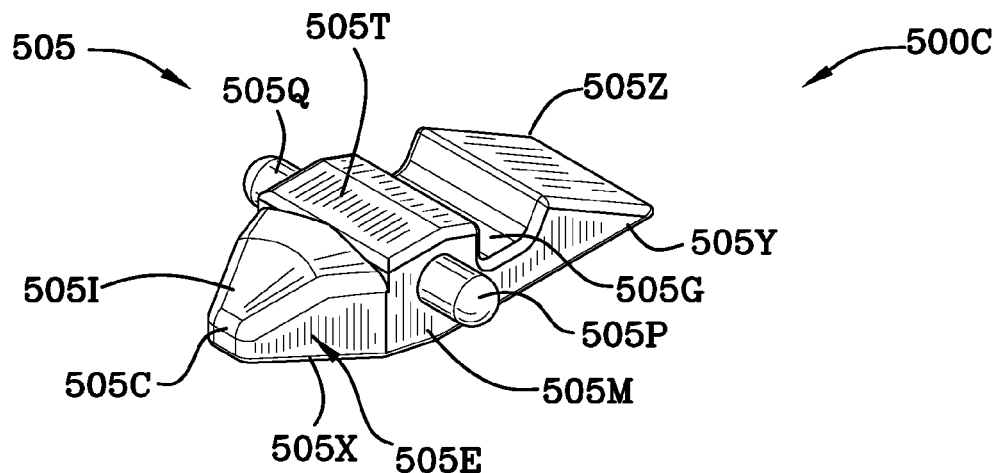
FIG. 5C is a perspective schematic view of the second example of the locking lever.
Figure 5D:
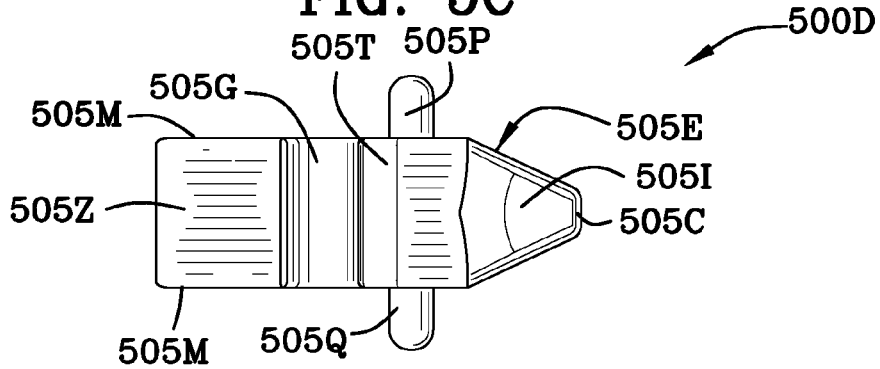
FIG. 5D is a top schematic view of the second example of the locking lever.

FIG. 5C is a perspective schematic view 500C of the second example of the locking lever 505. Rounded portion 505C of the inclined surface 505I of the blocking end portion 505E of the second example of the locking lever 505 is illustrated well in FIG. 5C. O-ring groove 505G for O-ring 105"O" is illustrated in FIGS. 5C, 5D and 5E.

Side wall 505M of locking lever 505 is illustrated in FIGS. 5C, 5D, 5E and 5F. Pins 505P, 505Q of the second example of the locking lever 505 are shown and these pins reside in corresponding slots 117P, 117Q in the male body.

Referring to FIG. 5C, the locking lever 505 includes the blocking end portion 505E and the sloped end portion 505Z. Top 505T of the second example of the locking lever 505 is illustrated in the central portion of the locking lever 505.

Figure 5E:
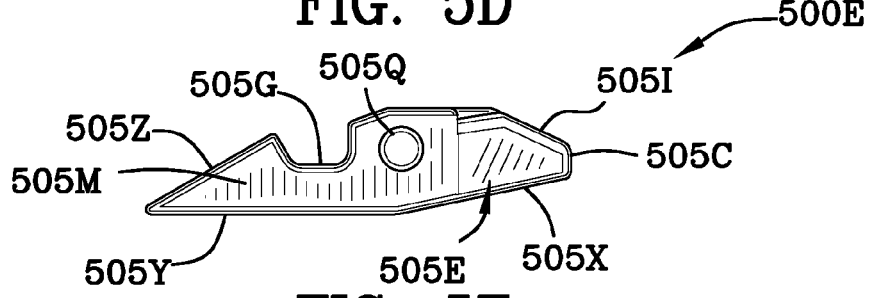
FIG. 5E is a left side schematic view of the second example of the locking lever.
Figure 5F:
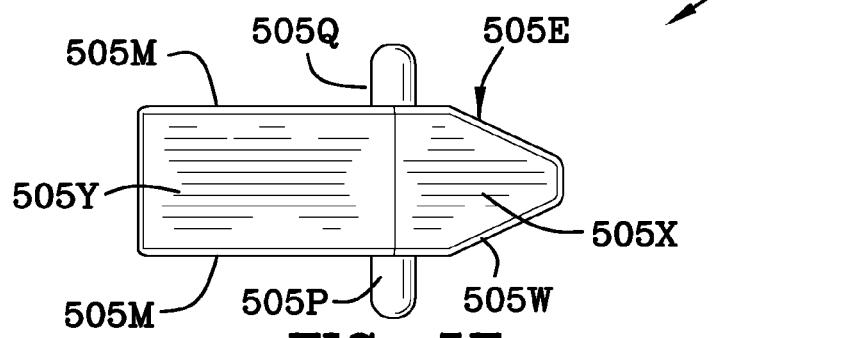
FIG. 5F is a bottom side schematic view of the second example of the locking lever.

Bottom surface 505X of the blocking end portion and bottom surface 505Y of the sloped end are illustrated in FIGS. 5C, 5E and 5F.

FIG. 5D is a top schematic view 500D of the second example of the locking lever 505 which illustrates the sloped end surface 505Z, O-ring groove 505G, and the blocking end portion 505E. As explained elsewhere herein, the blocking end portion 505E resides within one of the recesses 508Z of the hook portion 508H of the female sleeve 508 and prevents disengagement of the threaded coupling when the locking sleeve 105S blocks pivotal movement of the locking lever 505. FIG. 5E is a left side schematic view 500E of the second example of the locking lever 505. FIG. 5F is a bottom side schematic view 500F of the second example of the locking lever 505 illustrating the bottom surfaces 505Y and 505X.

Figure 5H:
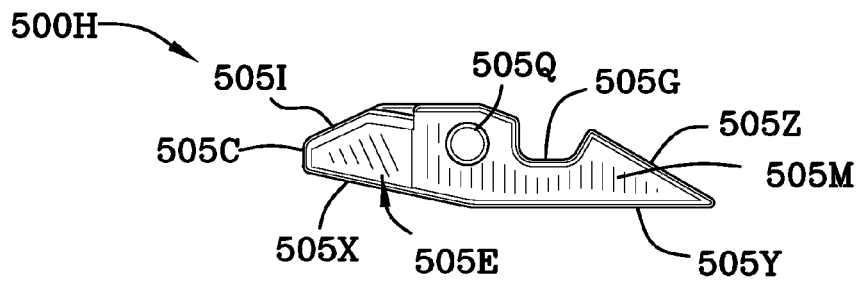
FIG. 5H is a right side schematic view of the second example of the locking lever.
Figure 5G:
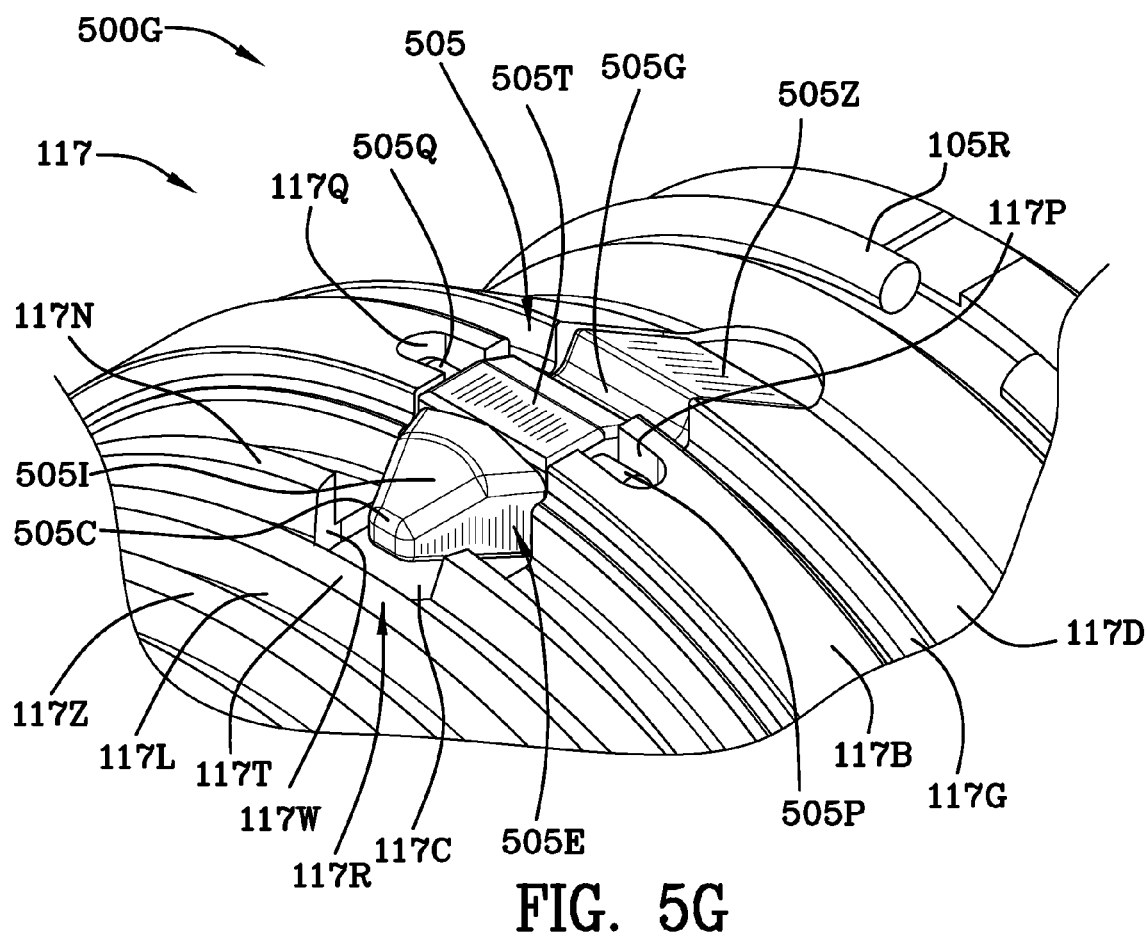
FIG. 5G is a perspective schematic view of the male body having external threads and a receptacle for the locking lever and the second example of the locking lever positioned in the receptacle.

FIG. 5G is a perspective schematic view 500G of the male body 117 having external threads and a receptacle 117R for the locking lever 505 and the locking lever 505 positioned in the receptacle 117R. Sloped end 505Z has a profile which matches the sloping surface 117D of the male body. Blocking end portion 505E is illustrated prominently in FIG. 5G. The blocking end portion of the locking lever is generally nose-shaped and includes a rounded portion 505C and an inclined portion 505I. other shapes may be used for the blocking portion. The blocking end portion may be made of any strong metal which resists deformation. The components of the coupling set forth in FIGS. 5-5V are metallic. FIG. 5H is a right side schematic view 500H of the second example of the locking lever 505.

Figure 5I:
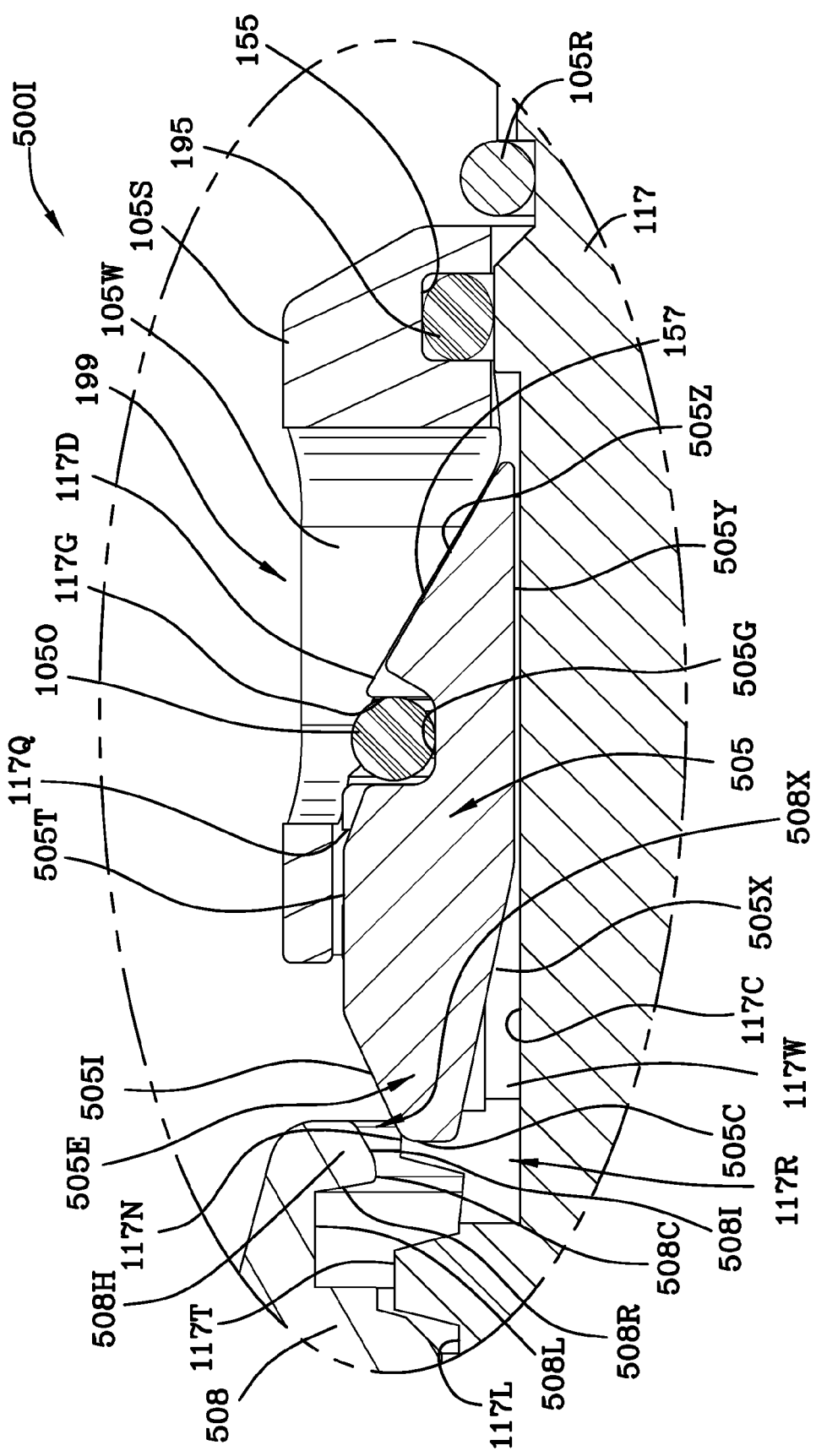
FIG. 5I is an enlarged portion of FIG. 5B.

FIG. 5I is an enlarged view 500I of a portion of FIG. 5B illustrating the end portion the female sleeve 508. Referring to female sleeve 508, generally cylindrically-shaped hook portion 508H is illustrated approaching the lever 505. As shown in FIG. 5I, lever 505 includes the blocking end portion 505E biased in the raised position. Rounded portion 505C of the inclined surface 505I is illustrated in proximity to the generally-cylindrically-shaped hook 508H. Hook 508H includes a curved portion 508C and an inclined surface 508I. Raised portion 508X of hook portion 508H is illustrated in FIG. 5I.

Still referring to female sleeve 508, radially extending surface 508R, curved portion 508C and recess 508L are illustrated well in FIG. 5I. Inclined portion 508I of the hook 508H is at approximately the same angle as inclined portion 505I of the locking lever 505 and this facilitates pushing the hook 508H into engagement with and over the inclined surface 505I as the female sleeve engages locking lever 505. See FIGS. 5J and 5K.

Figure 5J:
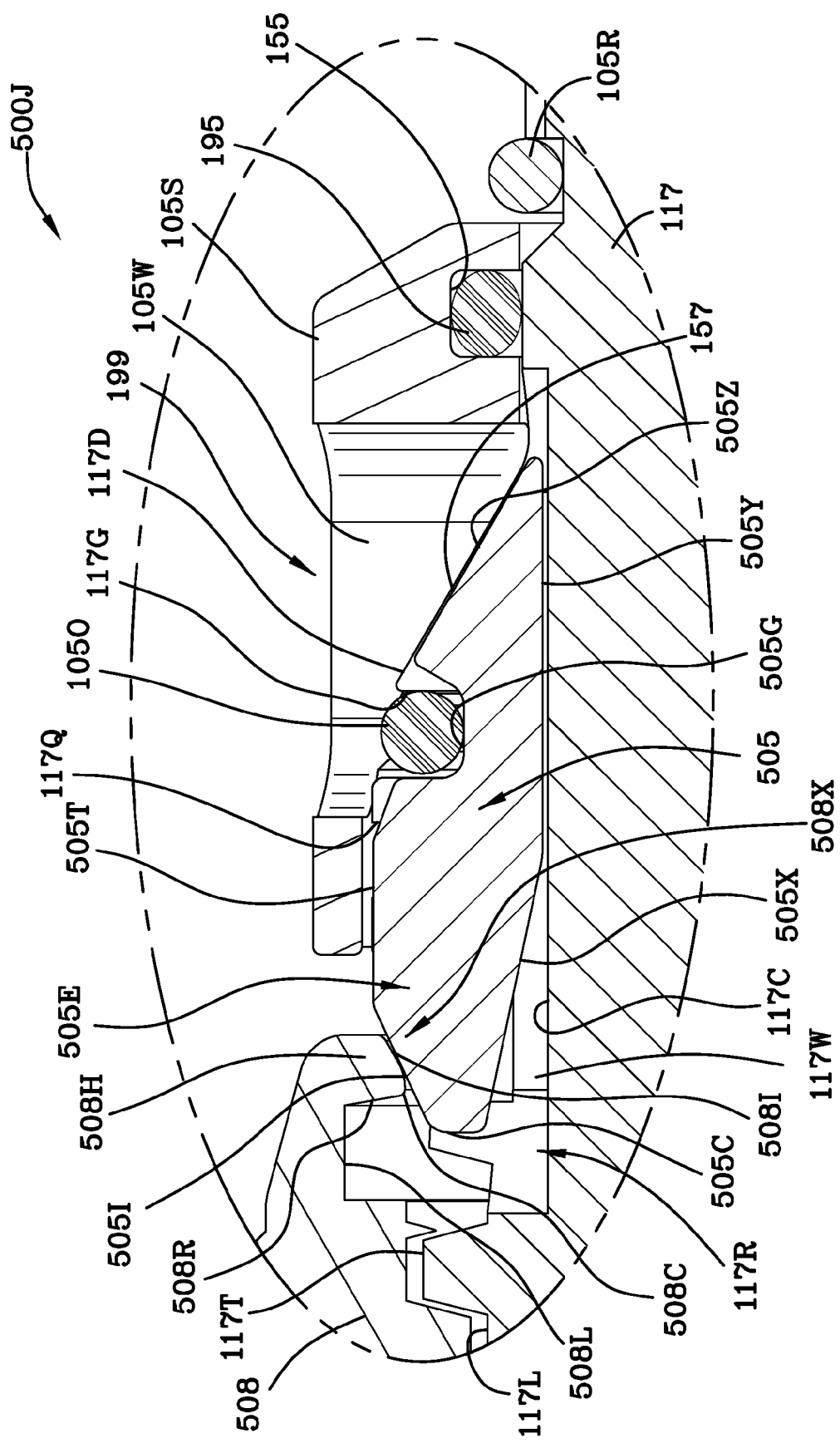
FIG. 5J is a cross-sectional schematic view of the interior hook of the second example of the female sleeve engaging the second example of the locking lever.
Figure 5K:
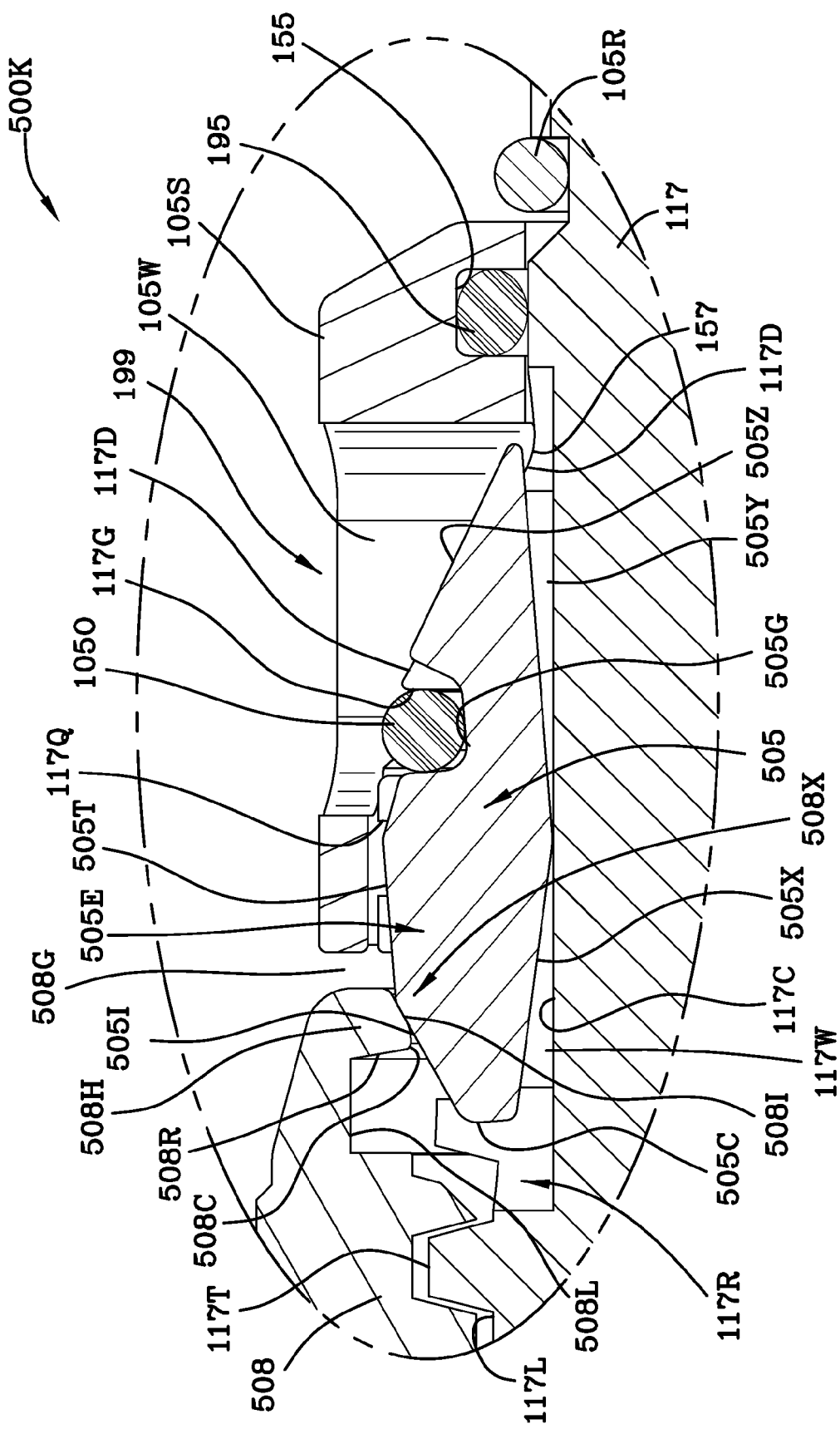
FIG. 5K is a cross-sectional schematic view of the interior hook of the second example of the female sleeve approaching the top portion of the second example of the locking lever.

FIG. 5J is a cross-sectional schematic view 500J of the interior hook 508H of the female sleeve 508 engaging the locking lever 505, specifically, inclined surface 508I of hook 508H is illustrated in sliding engagement with inclined surface 505I but has not progressed longitudinally far enough rightwardly to cause rotation of the blocking end 505E of locking lever 505 downwardly. In FIGS. 5I, 5J and 5K, the access window 199 is aligned with locking lever 505. To couple the male and female coupling halves, the access window 199 must be aligned with the locking lever 505.

FIG. 5K is a cross-sectional view 500K of the interior hook 508H of the second example of the female sleeve 508 approaching the top 505T of the locking lever 505 causing rotation of the blocking end portion 505E downwardly toward the flat bottom 117C of receptacle 117R. As blocking end portion 505E is pushed downwardly rotating the sloped end 505Z upwardly into access window 199, neither bottom surface 505X on the blocking end portion 505E of the locking lever 505 nor bottom surface 505Y on the sloped end 505Z of the locking lever 505 engage the flat surface 117C of the locking lever receptacle 117R of the male body 117.

Before engagement of the female sleeve 508 with the locking lever 505, the bottom surface 505Y of the locking lever is spaced apart from the flat surface 117C of the locking lever receptacle 117R of the male body 117 as illustrated in FIG. 5I.

Locking lever 505 includes a bottom surface and the bottom surface includes a blocking end portion 505X and a sloped end portion 505Y. The blocking end portion bottom surface 505X is inclined with respect to the locking lever receptacle 117R in the male body when the tensioning O-ring 105O resides in the O-ring slot 505G of the locking lever 505 and in the O-ring slot 117G of the male body 117 and, when none of the raised portions 508X of the hook 508H engage the blocking end portion 505E. Under these conditions the sloped end portion of the bottom surface 505Y is parallel to and in proximity to the locking lever receptacle. See, for example FIG. 5I.

FIGS. 5I, 5J, 5K illustrate the progression of continuous threading of the female sleeve 508 onto the threads of the male body 117. In FIG. 5I, no engagement of the female sleeve 508 and the locking lever 505 has taken place. In FIG. 5J the female sleeve 508 has been threaded far enough onto the male body 117 that one of the raised portions 505X of the generally cylindrically-shaped hook of the female sleeve 508 is engaging the inclined surface 505I of the blocking end 505E of the lever 505 but no rotation of the locking lever 505 has taken place even though rotation of the locking lever 505 is possible because the access window 199 of the locking sleeve is aligned with locking lever 505. In FIG. 5K, surface 508I of hook 508H is illustrated approaching the blocking end portion 505E of the locking lever 505 and pushing the blocking end portion 505E downwardly rotating the locking lever against the force of the tensioning O-ring 105O. O-ring 105O is illustrated in FIG. 5K as being under tension and slightly raised as O-ring groove 505G of the lever has been raised by the pivoting action.

Figure 5L:
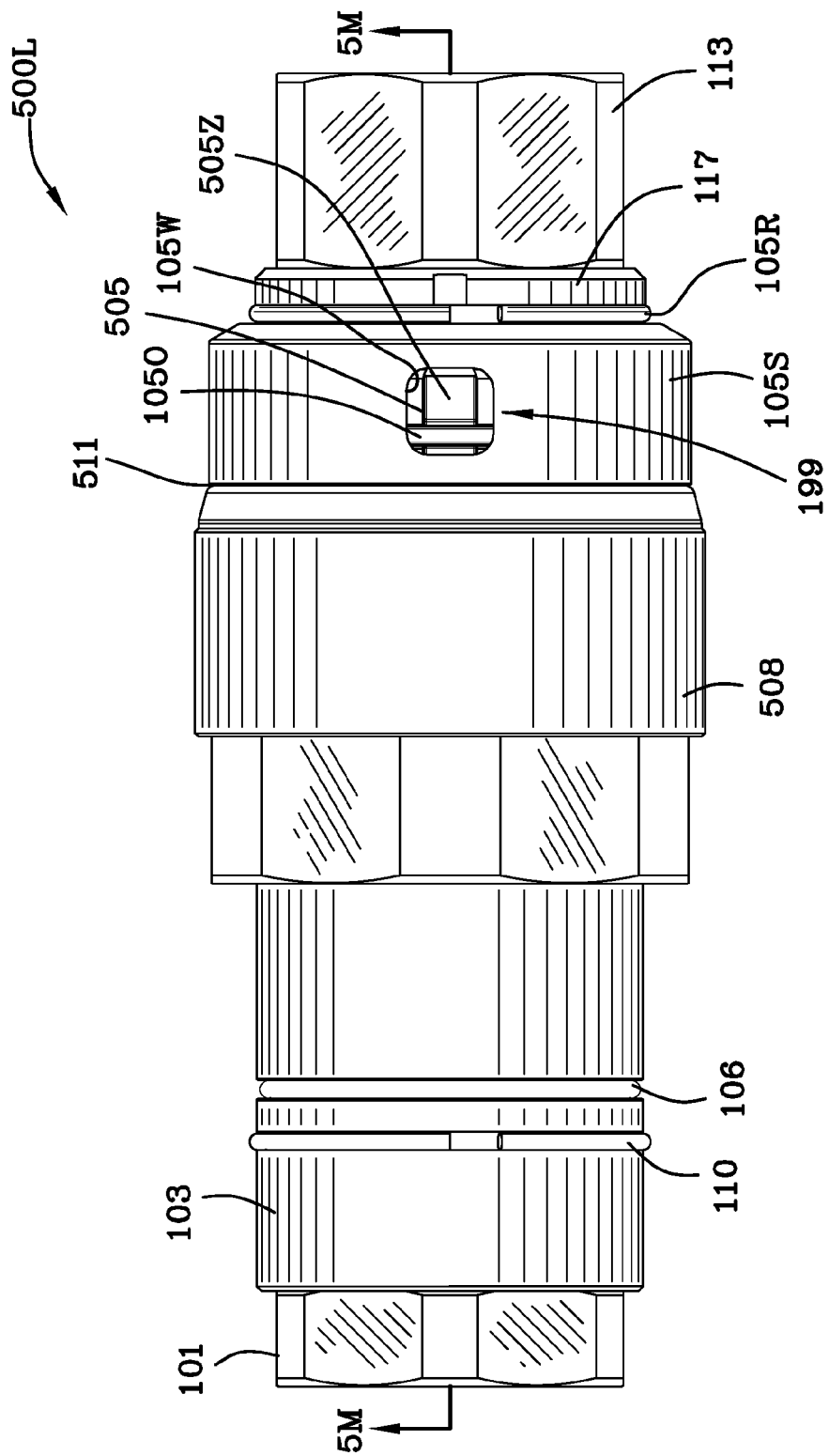
FIG. 5L is a top schematic view of the coupling fully threaded together illustrating the locking sleeve and access window in the locking sleeve exposing the second example of the locking lever.

FIG. 5L is a schematic top view 500L of the coupling fully threaded together and further illustrating locking sleeve 105S and access window 199 in the locking sleeve 105S. Reference numeral 511 indicates the engagement between the female sleeve 508 with the locking sleeve 105S. Since window 199 is aligned with the locking lever in FIG. 5L, the coupling is not locked.

Figure 5M:
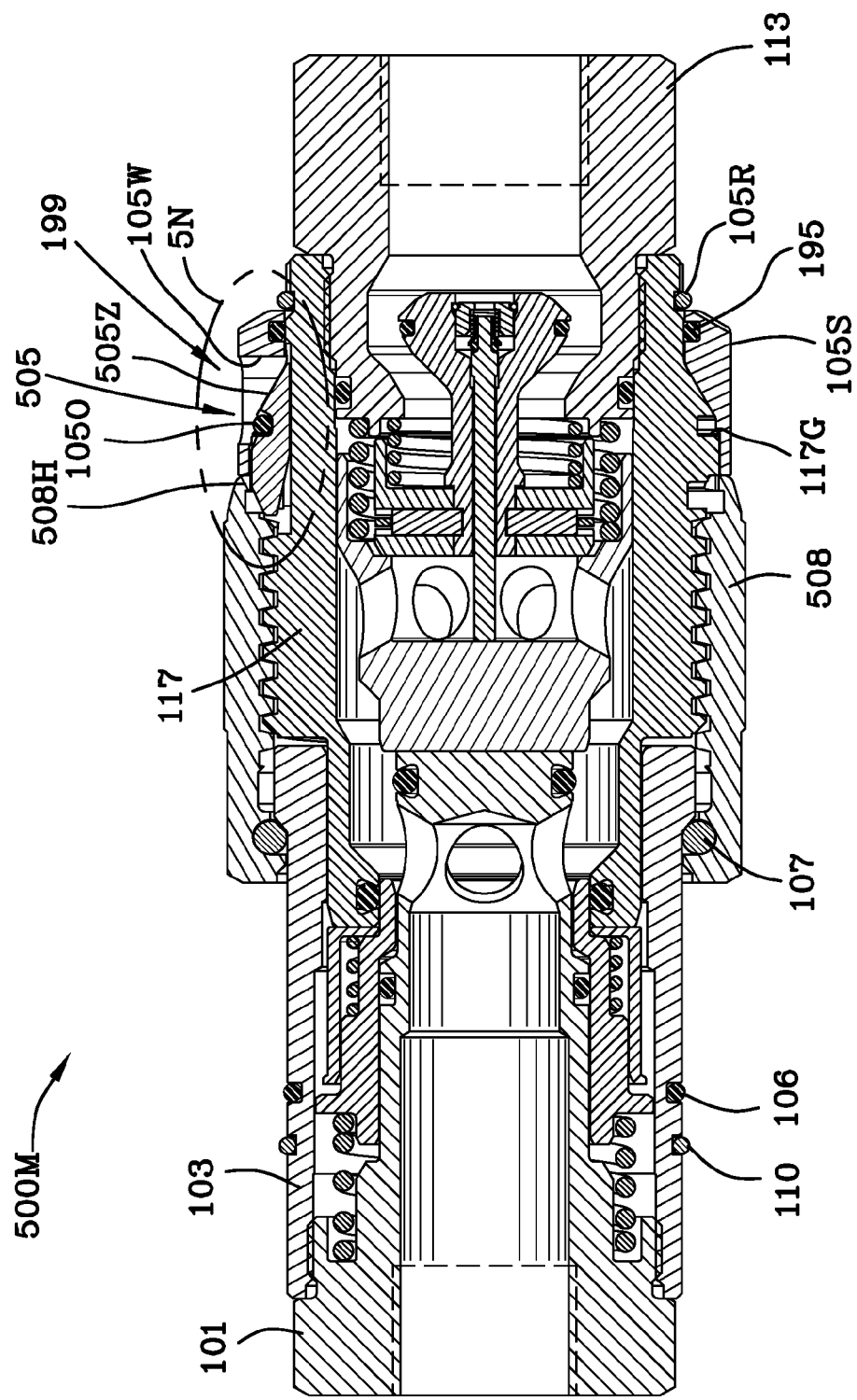
FIG. 5M is a cross-section schematic view of the coupling fully threaded together taken along the lines 5M-5M of FIG. 5L illustrating the second example of the locking lever.
Figure 5N:
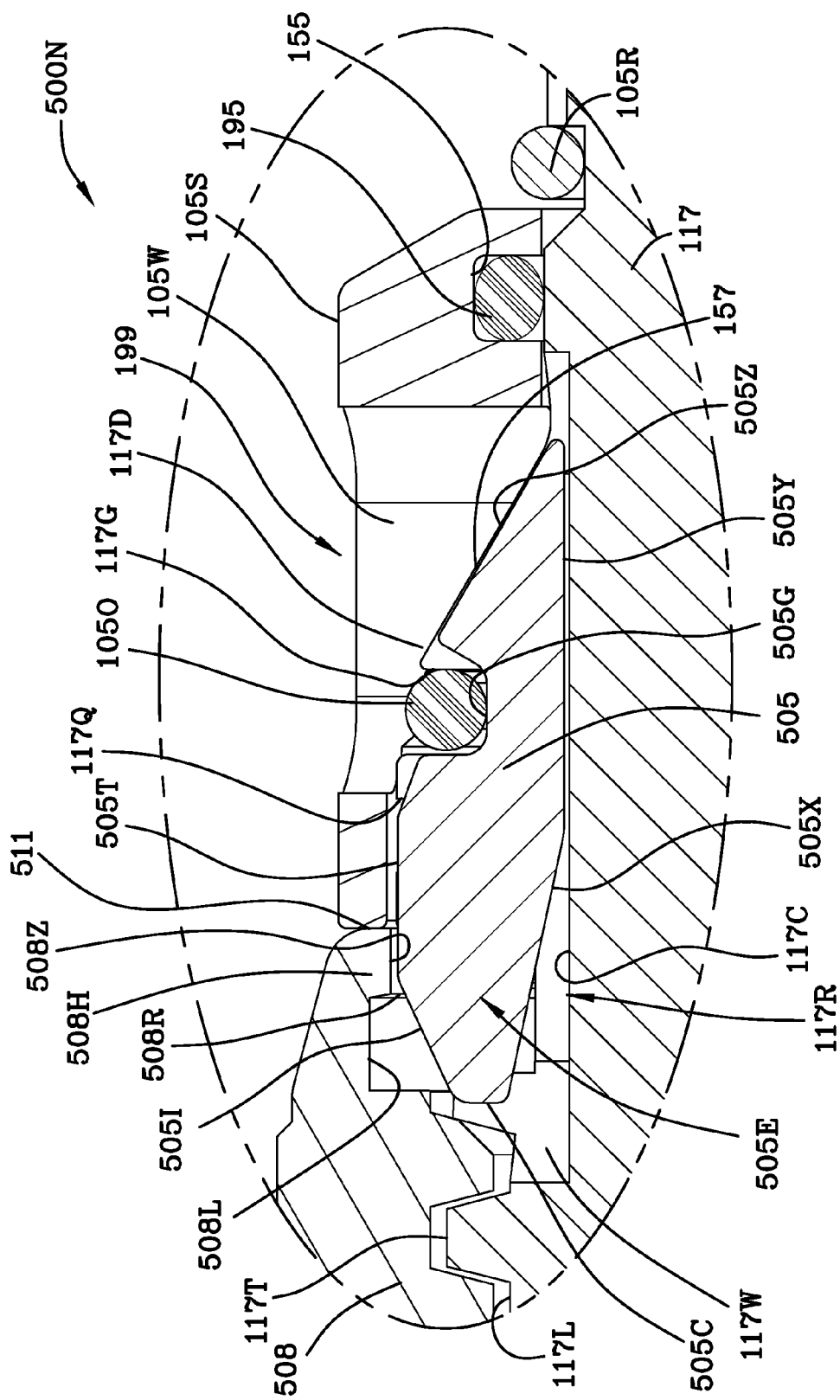
FIG. 5N is an enlargement of a portion of FIG. 5M.

FIG. 5M is a cross-section schematic view 500M of the coupling fully threaded together taken along the lines 5M-5M of FIG. 5L. FIG. 5N is an enlargement 500N of a portion of FIG. 5M. In FIGS. 5M and 5N female sleeve 508 has fully threaded onto the male body and the blocking end portion 505E resides within one of the recesses 508Z of the generally cylindrically-shaped hook 508H. Female sleeve 508 (hook portion 508H) engages locking sleeve 105S as indicated by reference numeral 511. Snap ring 105R restrains longitudinal movement of locking sleeve 105S in the rightward direction when viewing FIGS. 5M and 5N.

FIG. 5N illustrates that the tensioning O-ring 105O has returned to its normal position and blocking end portion 505E has returned to its raised position. By "returned" it is meant that blocking end portion 505E moves alternately up and down as the raised portions 508X and the recesses 508Z of the hook 508H are rotated thereover. In FIG. 5N, the locking sleeve 105S has not yet been rotated about the male body 117 so as to put the coupling in a condition where it cannot be unthreaded. In FIGS. 5M and 5N the coupling is fully threaded together but it can be uncoupled and unthreaded because the locking sleeve 105S has not been rotated such that the interior contours of the locking sleeve block rotation of the locking lever 505.

FIG. 5"O" is a top schematic view 500O of the coupling fully threaded together with the locking sleeve 105S rotated such that the access window 199 is not visible thus preventing the second example of the locking lever 505 from pivoting. Reference numeral 511 indicates the contact between the female sleeve 508 and the locking sleeve 105S when the coupling is fully threaded together. In FIG. 5O, the coupling is locked and cannot be uncoupled as the locking lever 505 cannot pivot as it is blocked against rotation as illustrated in FIGS. 5P and 5Q.

Figure 5P:
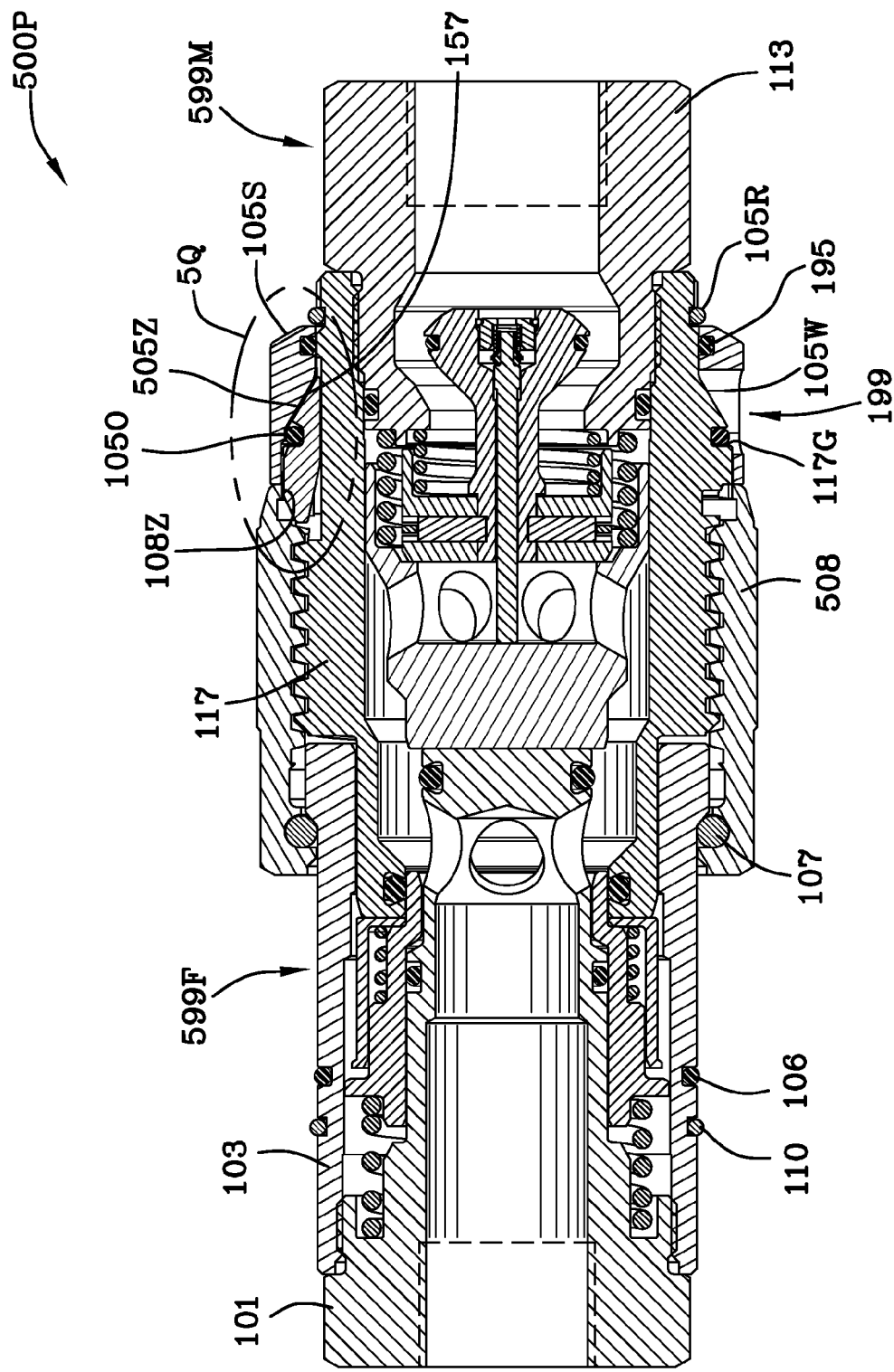
FIG. 5P is a cross-sectional schematic view of the coupling taken along the lines 5P-5P of FIG. 5"O."
Figure 5Q:
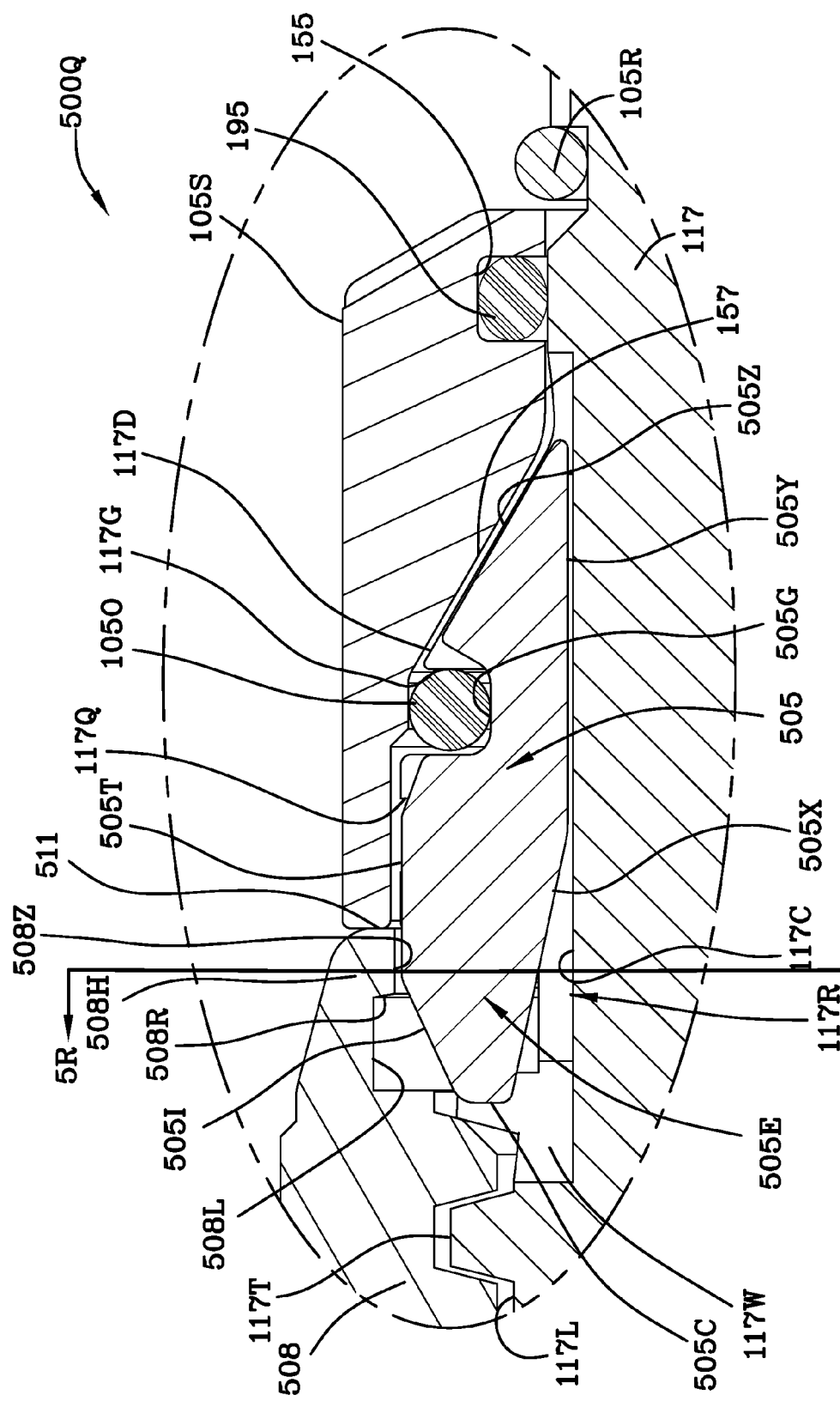
FIG. 5Q is an enlarged portion of FIG. 5P.

FIG. 5P is a cross-sectional schematic view 500P of the coupling taken along the lines 5P-5P of FIG. 5O. FIG. 5Q is an enlarged portion 500Q of FIG. 5P. FIG. 5Q is similar to FIG. 5N except that locking sleeve 105S is shown rotated into the blocking position. Sloped end portion 505Z of locking lever 505 has a contour which matches the slope 157 of the inner portion of the locking sleeve 105S.

Figure 5R:
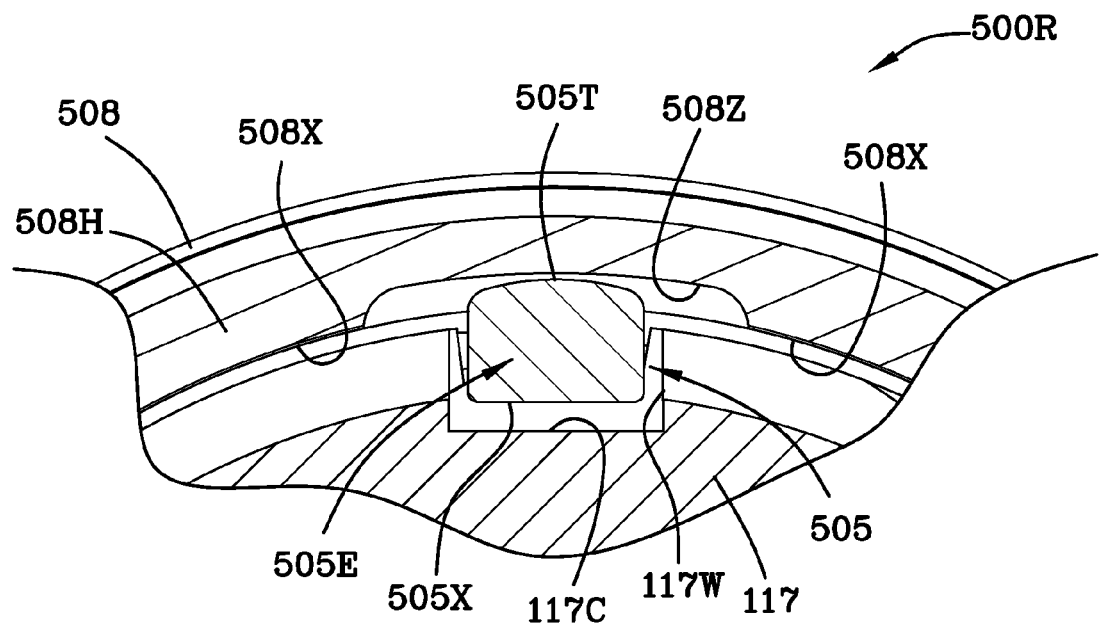
FIG. 5R is a cross-sectional view taken along the lines 5R-5R of FIG. 5"O" with the coupling locked and fully threaded together.

FIG. 5R is a cross-sectional view 500R taken along the lines 5R-5R of FIG. 5"O" with the coupling fully threaded together and locked. The lines 5R-5R are also illustrated in FIG. 5Q. FIG. 5R illustrates one of the circumferentially spaced recesses 508Z and a portion of two circumferentially spaced raised portions 508X on both sides of the recess 508Z. Blocking end 505E is illustrated in recess 508Z of hook 508H in its raised position biased by the O-ring. A small gap is illustrated between the top 505T of the blocking end portion 505E and the recess 508Z. Depending on the manufacturing tolerances this gap may not exist and the top 505T of the blocking end portion 505E may engage the recess 508Z. FIG. 5R also illustrates the flat bottom 117C of the receptacle 117R as well as wall 117W which forms the lever receptacle 117R. The bottom surface 505X is illustrated in FIGS. 5R and 5S.

Figure 5S:
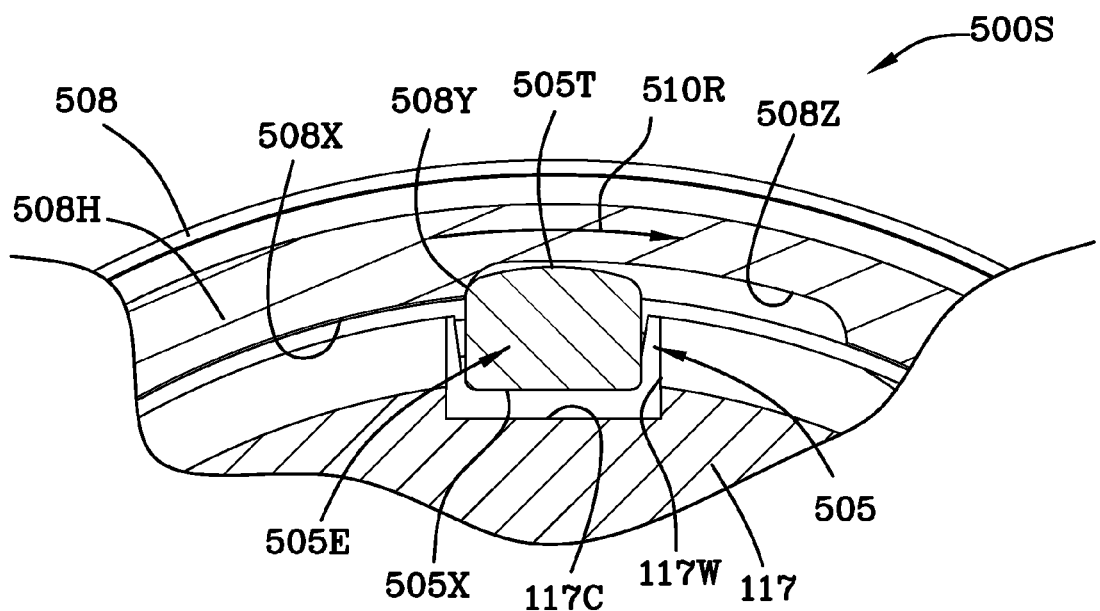
FIG. 5S is a cross-sectional view similar to FIG. 5R illustrating the second example of the locking lever engaging one of the recesses in the hook portion of the second example of the female sleeve.

FIG. 5S is a cross-sectional view 500S similar to FIG. 5R illustrating the blocking end portion 505E of the locking lever 505 engaging the recess 508Z in the hook portion 508H of the female sleeve 508. In FIG. 5S, unthreading of the female sleeve 508 from the male body 117 is not possible as the access window 199 is not aligned with the lever 505. Arrow 510R indicates the direction of rotation for unthreading female sleeve 508. If the female sleeve is rotated in the direction of arrow 510R, the coupling cannot be unthreaded. As viewed in FIG. 5S, unthreading of the female sleeve is blocked as indicated by reference numeral 508Y. Reference numeral 508Y is a point of contact between the blocking end portion 505E and the recess 508Z. Contact between the blocking end portion 505E and the recess 508Z is made in FIG. 5S and the raised hook portion 508X cannot ride up and over the blocking end portion 505E of the lever as the lever is blocked against downward rotation by the locking sleeve 105S.

Figure 6:
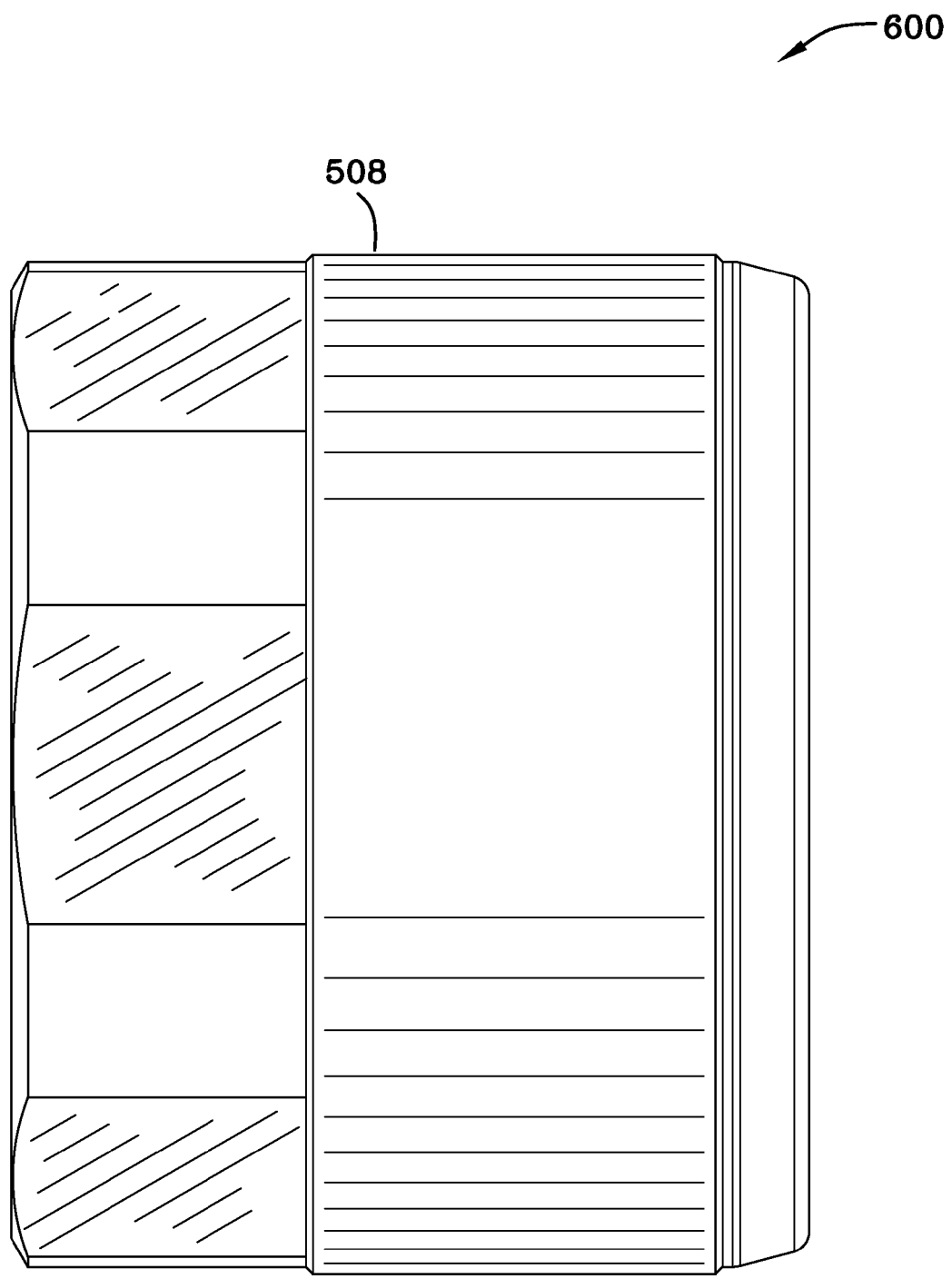
FIG. 6 illustrates a front schematic view of the second example of the female sleeve.
Figure 6A:
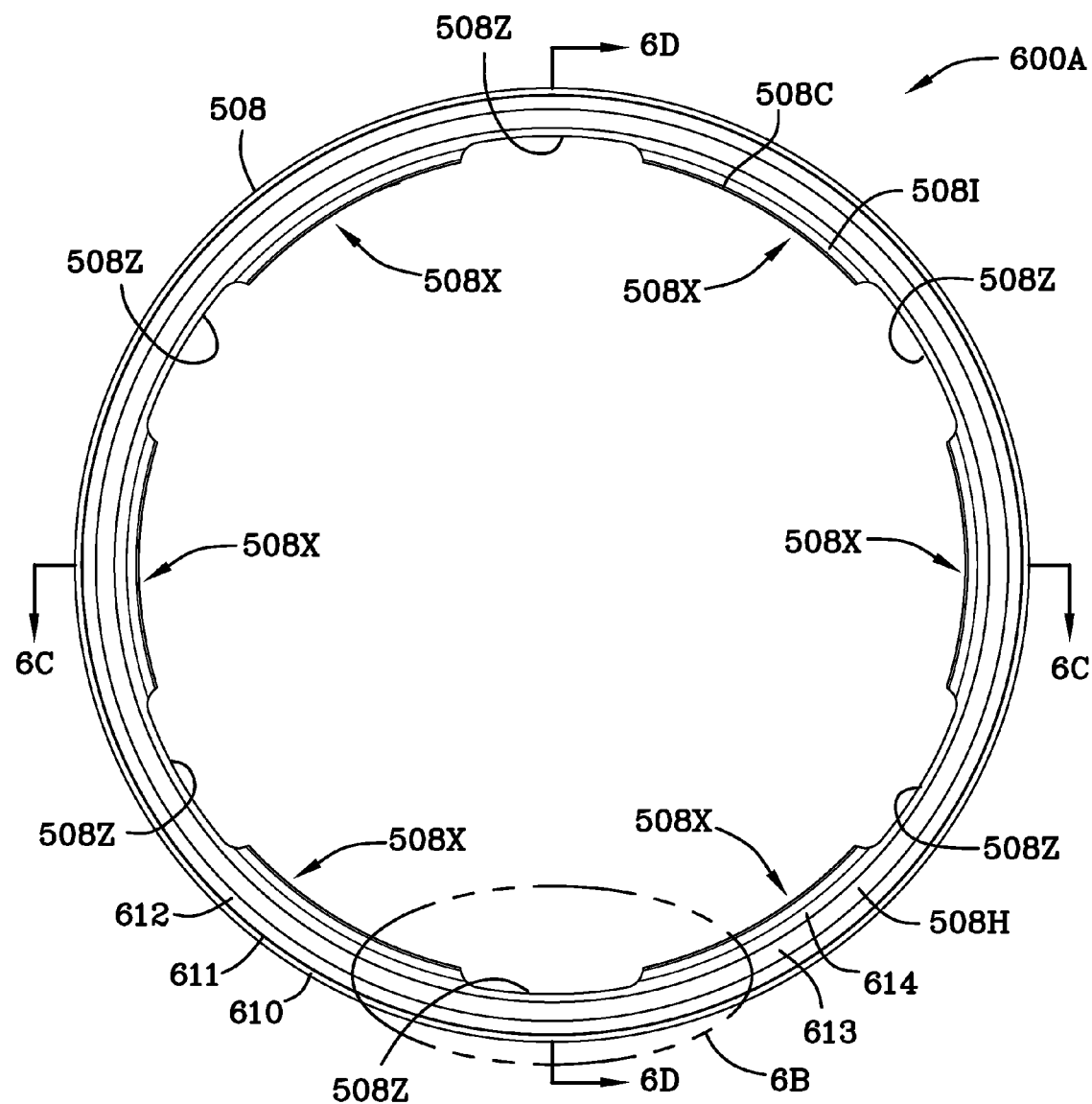
FIG. 6A illustrates a right end view of the female sleeve without the internal threads shown.

The female coupling half includes a second example of a female sleeve 508. The interior of the second example of the female sleeve includes internal threads. FIG. 6 illustrates a front schematic view 600 of the second example of the female sleeve 508. FIG. 6A illustrates a right end view 600A of the female sleeve 508 indicating a hook portion 508H which includes circumferentially spaced raised portions 508X and circumferentially spaced recesses 508Z. FIG. 6A does not illustrate the internal threads of the female sleeve which have been removed for clarity. Reference numerals 610, 611, 612, 613 and 614 illustrate the contour of the outer surface of the hook portion 508H in FIGS. 6A, 6B, 6C and 6D. Referring to FIG. 6A, the circumferentially spaced raised portions 508X are positioned between the circumferentially spaced recesses 508Z.

Figure 6B:
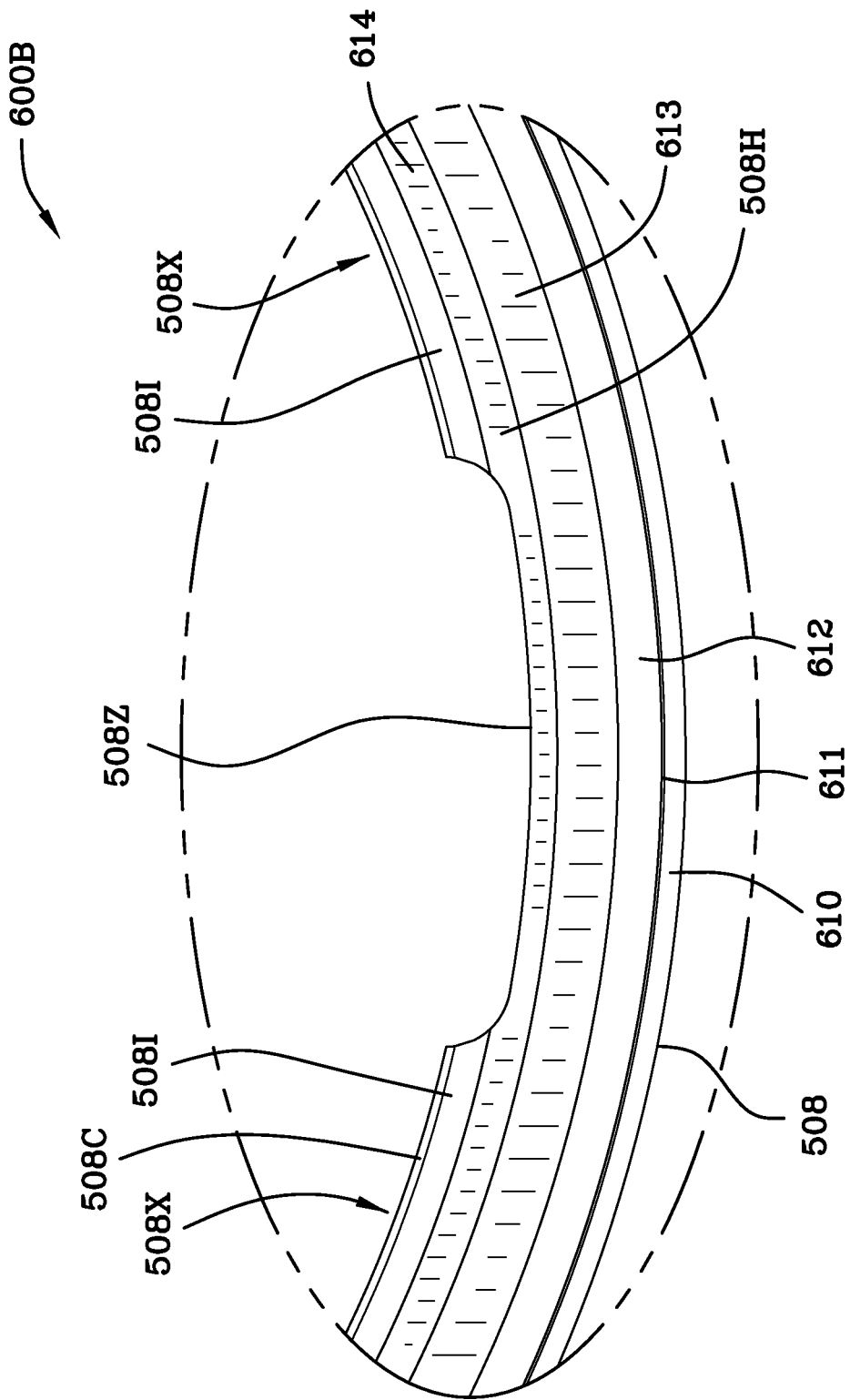
FIG. 6B is an enlargement of a portion of FIG. 6A.

FIG. 6B is an enlarged view 600B of a portion of FIG. 6A illustrating the generally cylindrically-shaped hook portion 508H thereof. The internal threads of sleeve 508 are not illustrated in FIG. 6B. Hook portion 508H includes circumferentially spaced raised portions 508X, rounded portions 508C and inclined portions 508I thereof. Outer surface counters 610, 611, 612, 613 and 614 are also illustrated in FIG. 6B. The circumferentially spaced raised portions 508X and circumferentially spaced recesses 508Z of the hook end 508H alternately engage the blocking end portion 505E of the locking lever 505 as the female sleeve is threaded onto the male body 117.

Figure 6C:
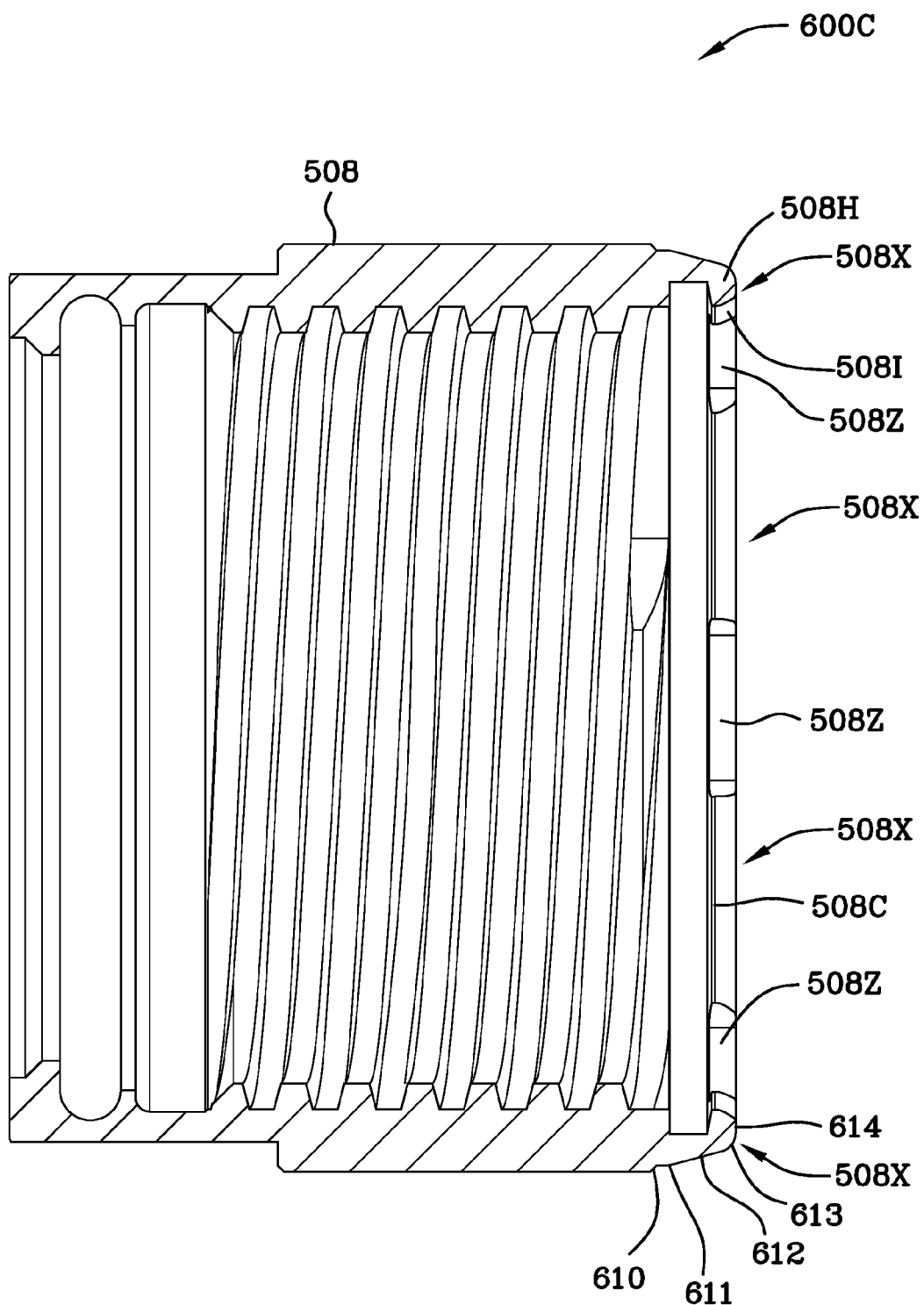
FIG. 6C is a cross-sectional view of the second example of the female sleeve taken along the lines 6C-6C of FIG. 6A illustrating recesses in the hook portion of the female sleeve.

FIG. 6C is a cross-sectional view 600C of the second example of the female sleeve 508 taken along the lines 6C-6C of FIG. 6A illustrating recesses 508Z in the hook portion 508H of the female sleeve 508. Outer surface counters 610, 611, 612, 613 and 614 are also illustrated in FIG. 6C.

Figure 6D:
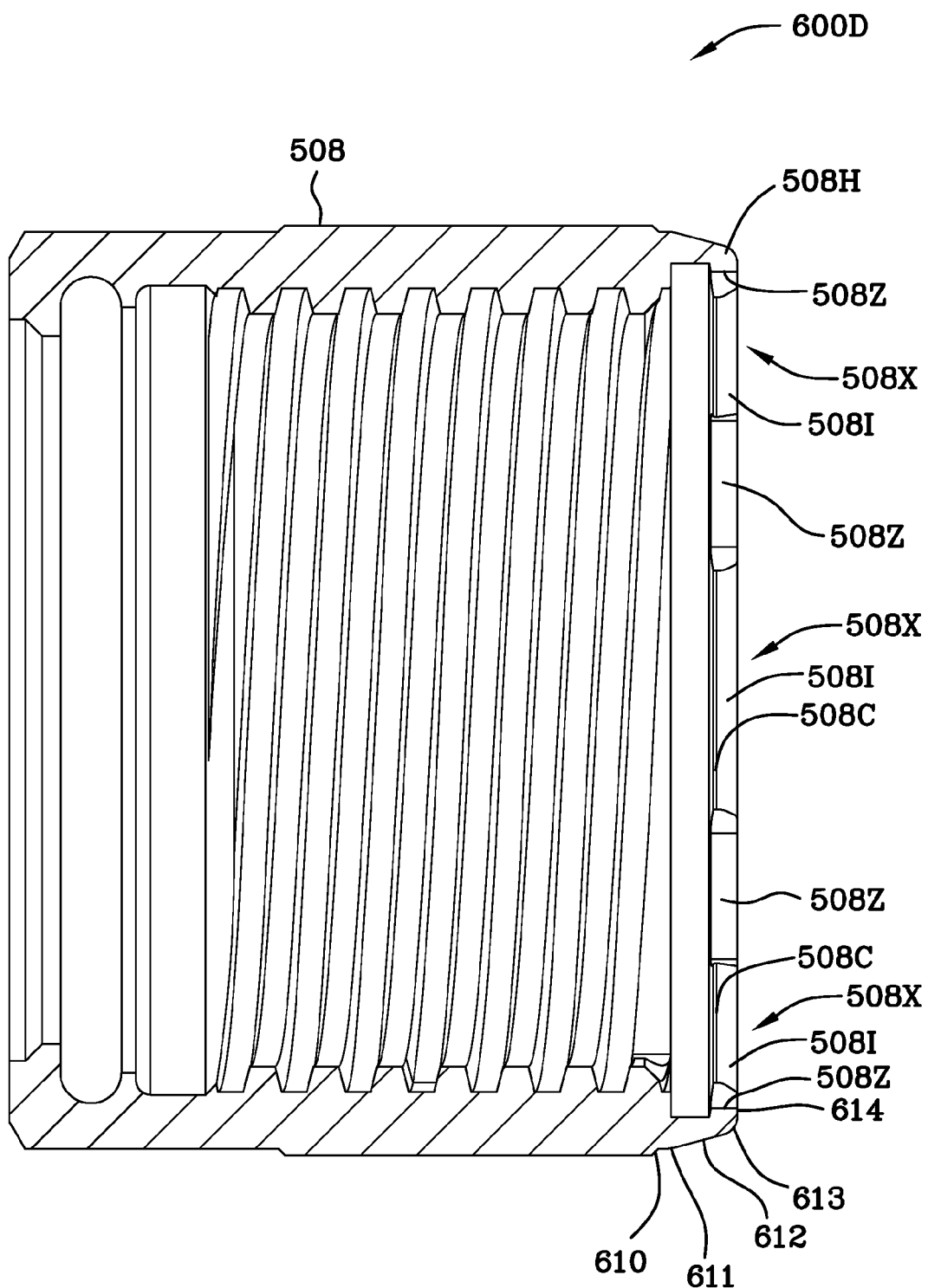
FIG. 6D is a cross-sectional view of the second example of the female sleeve taken along the lines 6D-6D of FIG. 6A illustrating recesses in the hook portion of the female sleeve.

FIG. 6D is a cross-sectional view 600D of the second example of the female sleeve 508 taken along the lines 6D-6D of FIG. 6A illustrating recesses 508Z in the hook portion 508H of the female sleeve. Outer surface counters 610, 611, 612, 613 and 614 are also illustrated in FIG. 6D.

As the female sleeve 508 is threaded onto the male body 117, engagement of the hook portion 508H engages the blocking end portion 505E of the locking lever 508 and the circumferentially spaced raised portions 508X and the circumferentially spaced recesses 508Z alternately engage the blocking end portion of the locking lever. Referring to FIG. 5I, a raised portion 508X is illustrated rotationally and longitudinally approaching blocking end portion 508E of the lever 508. Referring to FIG. 5J, as rotation and longitudinal translation of the female sleeve 508 continues a raised portion 508X is illustrated in engagement with the blocking end portion 505E of the lever. The inclined surface 508I of raised portion 508X is at approximately the same angle of inclination of the inclined surface 508I of the locking lever 505. At this point, shown in FIG. 5J, there is no rotation of locking lever 505. Referring to FIG. 5K, as rotation and longitudinal translation of the female sleeve 508 continues, a raised portion 508X is illustrated in engagement with locking lever 505 and rotation of blocking end portion 505E downwardly is shown. During the rotational progression of the generally cylindrically-shaped hook portion 508H between the positions illustrated in FIGS. 5I through 5J it is possible that the rotation has been large enough to pass through one of the circumferentially spaced recesses 508Z. The circumferential recesses 508Z include a flat bottom portion. The flat bottom portions of the circumferential recesses 508Z transition to the raised portions. A sloped transition section interconnects the flat bottom portions and the raised portions 508Z of the generally cylindrically-shaped hook portion 508H of the female sleeve 508. Referring to FIGS. 5M and 5N, rotation of the sleeve 508 has progressed to fully thread the female sleeve onto the male body 117 such that one of the recesses 508Z has the blocking end portion 505E residing therein. Reference numeral 511 indicates the engagement of the locking sleeve 105S with the hook portion 508H of the female sleeve 508. In the position as illustrated in FIGS. 5M and 5N, the coupling is not yet locked together because the locking sleeve 105S has not yet been rotated so as to misalign the access window 199 and the locking lever 505.

As the female sleeve 508 is threaded onto the male body 117 and as the female sleeve bottoms out against the locking sleeve 105S, a raised portion 508X may be positioned over the blocking end portion 505E and the locking lever 505 may be rotated downwardly which will then prevent the rotation of the locking sleeve 105S to lock the coupling together. In this event, the female sleeve may be rotated in the unthreading direction 510R a fraction of one turn so as to position the blocking end portion 505E in one of the recesses 508Z to enable locking of the coupling together by rotating the locking sleeve such that the access window 199 does not align with the locking lever.

The male body 117 includes a locking lever receptacle 117R recessed in the exterior of the male body 117, and the locking lever receptacle of the male body further includes first and second slots, 117P, 117Q therein. The second example of the locking lever 505 includes first and second pivot pins 505P, 505Q and a blocking end portion 505E. The locking lever 505 further includes the sloped end portion 505Z. The blocking end portion 505E of the second example of the locking lever 505 engages one of the recesses 508Z of the hook portion 508H of the second example of the female sleeve 508 when the coupling is locked together and when the locking sleeve 105S has been rotated to block the locking lever against rotation.

In the second example, the first and second pivot pins 505P, 505Q of the second example of the locking lever 505 reside in the first and second slots 117P, 117Q of the locking lever receptacle 117R of the male body enabling the second example of the locking lever to pivot about the pivot pins. The locking lever includes an O-ring slot 505G therein and the male body includes an O-ring slot 117G therein which extends circumferentially around the generally cylindrically shaped male body and is aligned with the O-ring slot 505G in the second example of the locking lever 505.

In the second example, the tensioning O-ring 105O extends circumferentially in the O-ring slot in the male body 117G and in the O-ring slot 505G in the second example of the locking lever 505 biasing the blocking end portion 505E of the locking lever to a raised position for engagement with the cylindrically-shaped hook portion 508H of the second example of the female sleeve 508 including the circumferentially spaced raised portions 508X and the circumferentially spaced recesses 508Z in the cylindrically-shaped hook portion of the female sleeve 508.

As in the first example of the invention, the tensioning O-ring secures the second example of the locking lever 505 in the locking lever receptacle 117R. During engagement of the male coupling half 599M and the female coupling half 599F, the external threads of the male body engage the internal threads of the second example of the female sleeve. The second example of the female sleeve of the female coupling half is rotated with respect to the male coupling half and the cylindrically-shaped hook portion of the female sleeve. The generally cylindrically-shaped hook portion 508H of the second example of the female sleeve includes circumferentially raised portions 508X and circumferentially spaced recesses 508Z which engage the blocking end portion 505E of the second example of the locking lever 505 alternately pivoting the blocking end portion 505E of the locking lever 505 about the first and second pivot pins between a position proximate the receptacle of the male body when one of the circumferentially spaced raised portions 508X of the generally cylindrically-shaped hook portion engages the blocking end portion 505E of the locking lever as shown, for example, in FIG. 5K and a position distal with respect to the receptacle of the male body when one of the circumferentially spaced recesses of the cylindrically-shaped hook portion engage the blocking end portion of the second example of the locking lever as shown, for example, in FIG. 5N.

As rotation of the second example of the female sleeve continues the female sleeve moves the female body toward the male body until threaded engagement of the female coupling half and the male coupling half is complete as illustrated in FIGS. 5M and 5N.

The blocking end portion 505E of the second example of the locking lever 505 is in the raised position when the cylindrically-shaped hook portion and one of the circumferentially spaced recesses 508Z thereof is fully engaged with the blocking end portion 505E of the second example of the locking lever. See FIG. 5R illustrating the blocking end 505E. When the raised blocking end portion of the locking lever is engaged with the recess 508Z of the hook portion, and with the locking sleeve rotated to block the pivoting of the locking lever 505, the coupling may not be unthreaded despite substantial load on the female sleeve.

The locking sleeve 105S is generally cylindrically shaped and engages the exterior of the male body 117 extending circumferentially thereabout. The locking sleeve 105S includes an access window 199 which, when rotated, prevents the female sleeve 508 and the male body 117 from being unthreaded as the access window 199 is not aligned with the locking lever 505.

A process for locking a threaded coupling using the second example of the female sleeve 508 and the second example of the locking lever 505 is also disclosed and claimed. The coupling includes a male coupling half 599M and a female coupling half 599F. The male coupling half 599M includes a male body 117 having external threads. The male body 117 includes a locking sleeve having an access window 199. The male body further includes an O-ring slot 117G therein. The male body further includes a locking lever receptacle 117R and a raised portion 117B having first and second slots, 117P, 117Q. A second example of the locking lever 505 includes a blocking end portion 505E, first and second pins, 505P, 505Q, an O-ring slot 505G and a sloped end 505Z.

The female coupling half includes a female body 103 and a female sleeve 508 having internal threads. The female sleeve 508 further includes an end portion which has a generally cylindrically-shaped hook portion 508H. The generally-cylindrically-shaped hook 508H includes circumferentially spaced raised portions 508X and circumferentially spaced recesses 508Z therein.

The steps of the process include: inserting the second example of the locking lever 505 into the receptacle of the male body and inserting the first and second pins of the second example of the locking lever into the first and second slots of the raised portion of the male member, the first and second pins of the second example of the locking lever permitting rotation of the lever about the pins; positioning the access window 199 of the locking sleeve 105S in alignment with the locking lever 505; positioning an O-ring 105O in the O-ring slot of the male body 117G and in the O-ring slot 505G of the locking lever 505 securing the locking lever with respect to the male body 117, the O-ring permitting rotation of the locking lever 505 about the pins with resistance to the rotation; progressively threading the second example of the female sleeve 508 having internal threads onto the male body 117 having external threads moving the generally cylindrically-shaped hook 508H toward the locking lever; engaging the generally cylindrically-shaped hook 508H of the second example of the female sleeve with the blocking end portion 505E of the locking lever 505, and as the progressive threading continues, the hook 505E including the raised portions 508X and the circumferentially spaced recesses 508Z are rotated with respect to the external threads of the male body moving and forcing the blocking end portion 505E of the locking lever to rotate the blocking end portion radially downwardly toward the male body when one of the raised portions 508X of the cylindrically-shaped hook engages the blocking end portion 505E and then the blocking end portion of the second example of the locking lever rotates radially upwardly away from the male body 117 when one of the circumferentially spaced recesses of the generally cylindrically-shaped hook 117 engages the blocking end portion 505E of the second example of the locking lever 505; continuing the rotation of the generally cylindrically-shaped hook portion 508H of the second example of the female sleeve until the female sleeve 508 engages the locking sleeve 105S of the male body; adjusting the rotational position of the locking hook portion 508H by rotating the female sleeve in the unthreaded direction, if necessary, to ensure that one of the circumferentially spaced recesses of the generally cylindrically-shaped hook engages the blocking end portion 505E of the second example of the locking lever; rotating the access window 199 of the locking sleeve 508 to a position not aligned with the second example of the locking lever 505 locking the male coupling half 599M and the female coupling half 599F together.

Figure 5T:
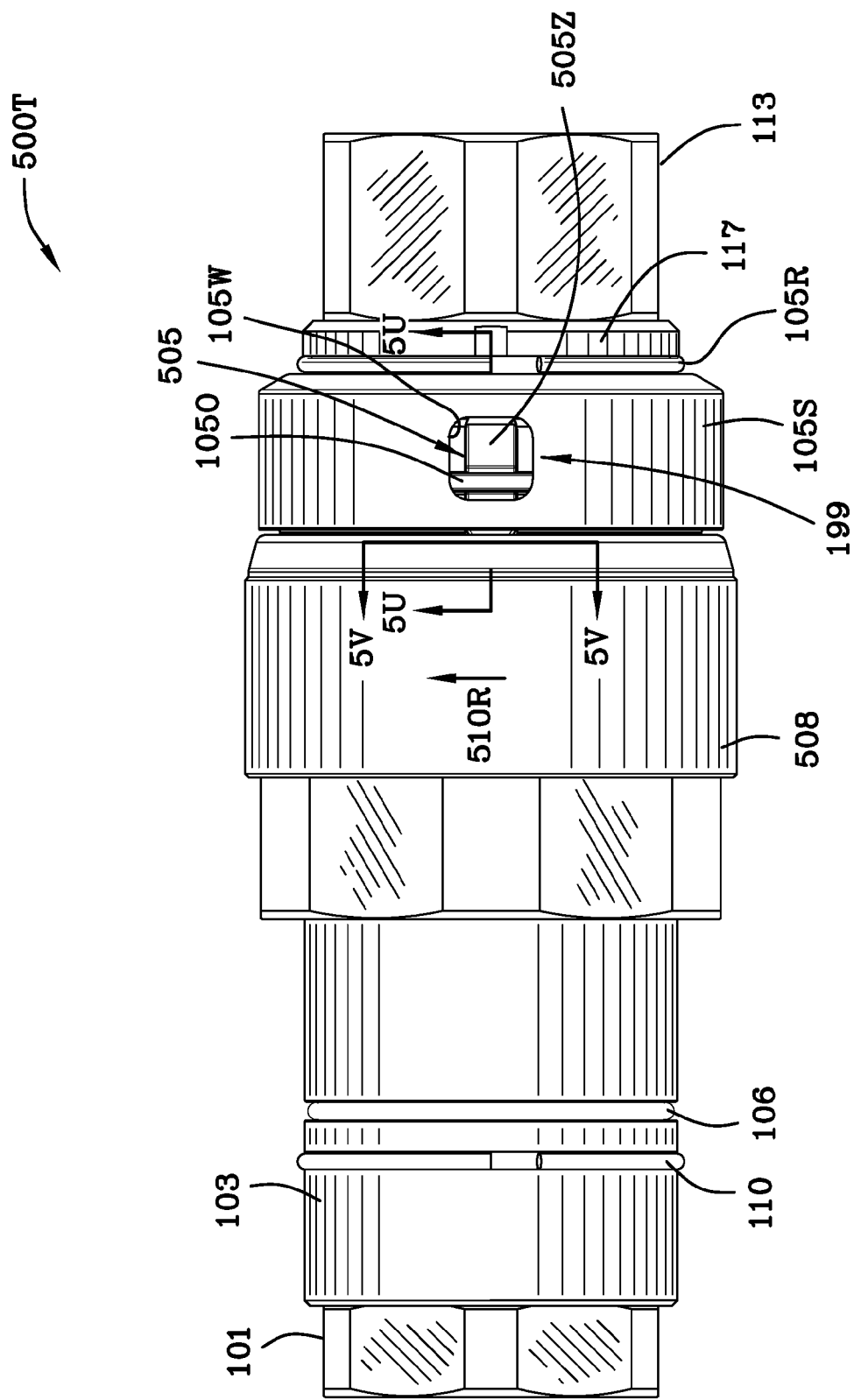
FIG. 5T is a top schematic view of the coupling in the early stage of being unthreaded with the access window aligned with the second example of the locking lever.
Figure 5U:
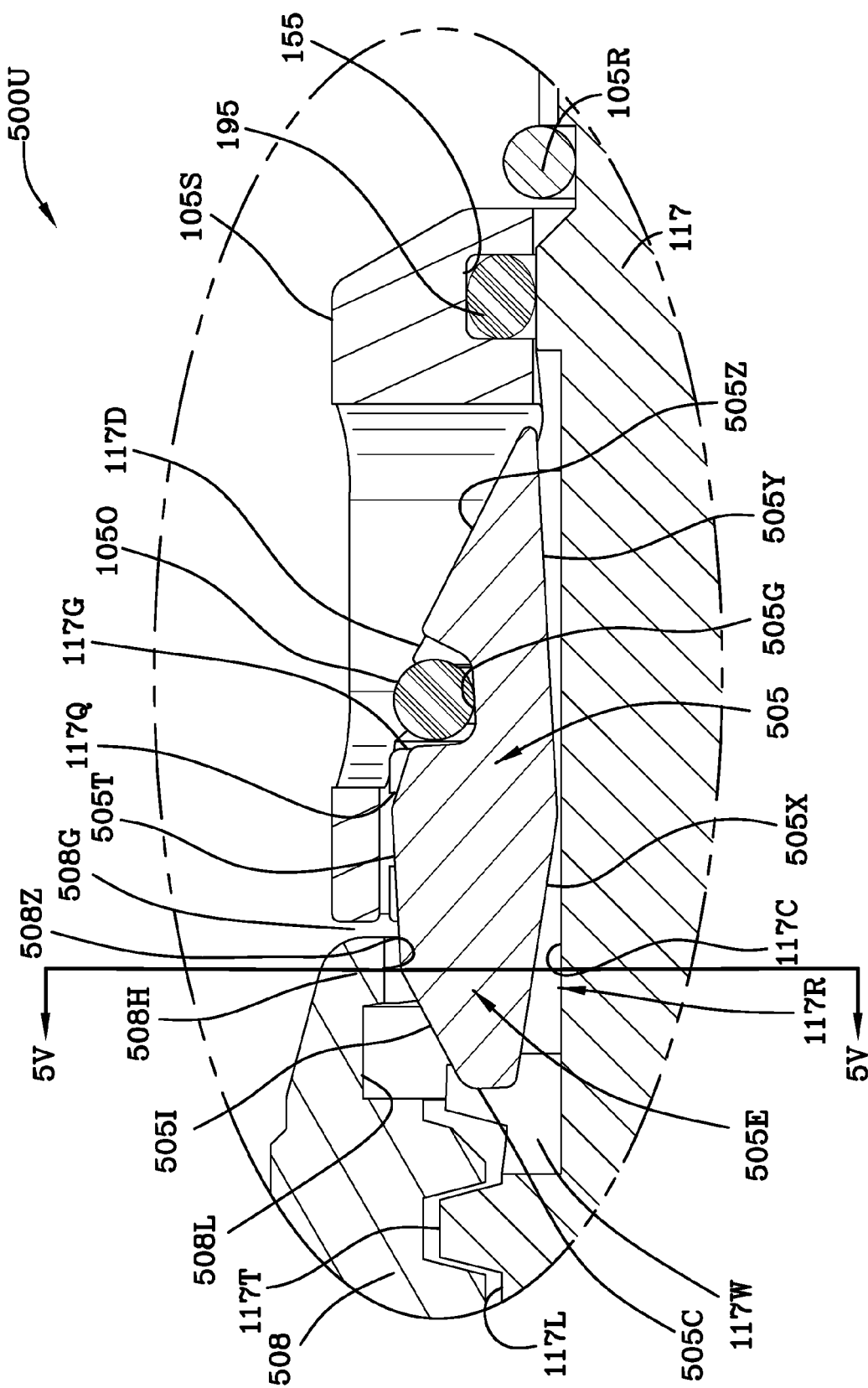
FIG. 5U is a cross-sectional schematic view taken along the lines 5U-5U of FIG. 5T illustrating the blocking end portion of the second example of the locking lever partially rotated downwardly and the hook portion of the second example of the female sleeve being retracted leftwardly.
Figure 5V:
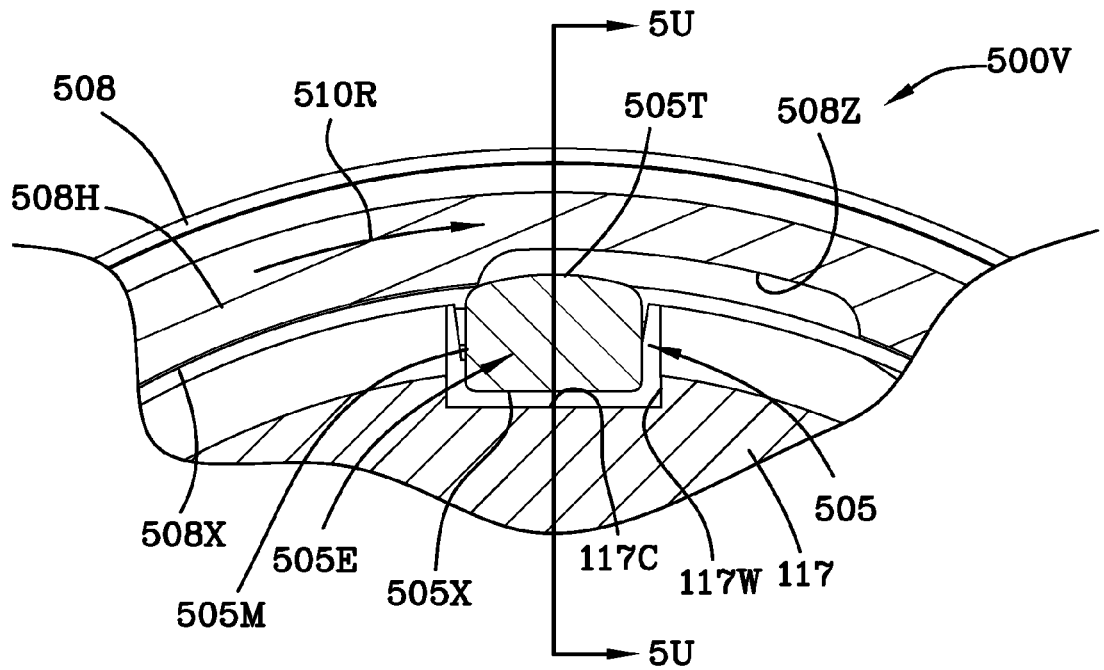
FIG. 5V is a cross-sectional view taken along the lines 5V-5V of FIGS. 5T and 5U illustrating the second example of the female sleeve being unthreaded from the male body and one of the raised portions of the hook portion beginning to ride up on top of the blocking end portion of the locking lever.

FIG. 5T is a top schematic view 500T of the coupling in the early stage of being unthreaded with the access window 199 aligned with the second example of the locking lever 505. FIG. 5T illustrates the coupling in the early stage of being unthreaded, that is, the female sleeve 508 is in the process of being unthreaded with respect to the threads of the male body 117. In FIG. 5T, access window 199 has been rotated to a position in alignment with the locking lever 505 to enable disconnection. FIG. 5U is a cross-sectional schematic view 500U of a portion of FIG. 5T illustrating the blocking end portion 505E of the locking lever 505 partially rotated downwardly. Gap 508G is the space between the hook portion 508H and the locking sleeve 105S. In FIG. 5U, female sleeve 508 has been partially unthreaded and one of the raised portions 508X is just beginning to engage the top 505T of the locking lever 505 as illustrated in FIG. 5V. The raised portion 508X causing locking end 505E to rotate is not viewable in FIG. 5U.

FIG. 5V is a cross-sectional view 500V taken along the lines 5V-5V of FIGS. 5T and 5U illustrating the second example of the female sleeve 508 being unthreaded from the male body and one of the raised portions 508X engaging the top 505T of locking lever 505. The position of lines 5U-5U in FIG. 5V illustrates why none of the raised portions 508X are illustrated in FIG. 5U.

Figure 5W:
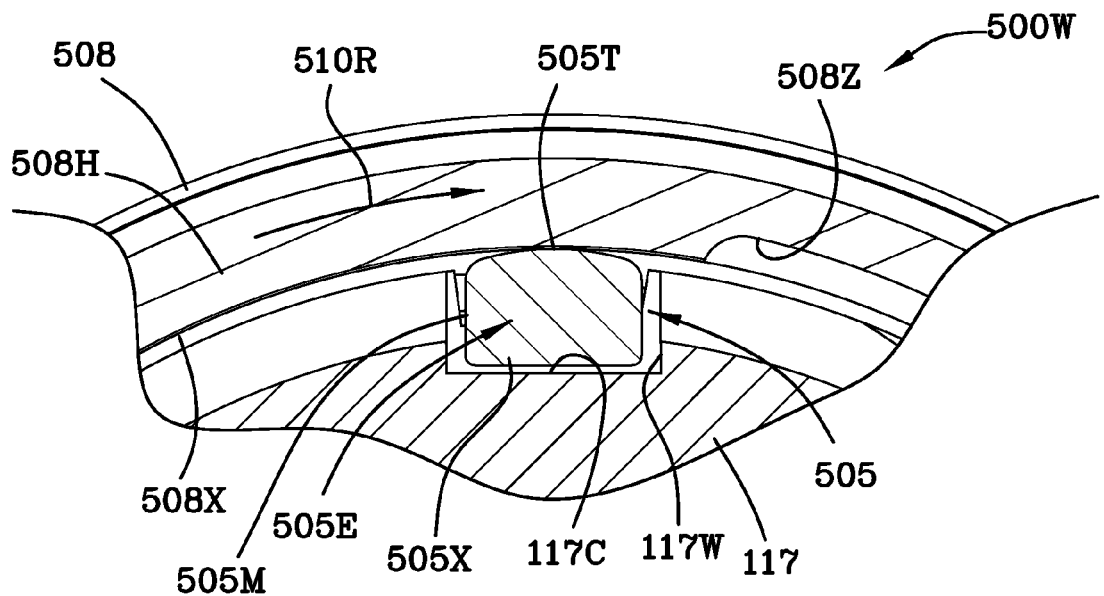
FIG. 5W is a cross-sectional view similar to FIG. 5V illustrating the one of the raised portions of the hook portion on top of the blocking end portion of the locking lever pushing it downwardly toward the locking lever receptacle.

FIG. 5W is a cross-sectional view 500W similar to FIG. 5V illustrating one of the raised portions of the hook portion 508H on top of the blocking end portion 505E of the locking lever pushing it downwardly toward the locking lever receptacle 117C. As hook portion 508H rotates with respect to the male body 117 during threading or unthreading the coupling, the blocking end portion 505E of the coupling alternately moves up and down with respect to the receptacle 117C.

REFERENCE NUMERALS

100—perspective view of coupling partially threaded together
100A—top view of the coupling partially threaded together
100B—cross-sectional view of the coupling partially threaded together taken along the lines 1B-1B
100C—perspective view of the locking lever
100D—top view of the locking lever
100E—left side view of the locking lever
100E—bottom side view of the locking lever
100G—perspective view of the male body with external threads and the locking lever mounted in locking lever receptacle for the locking lever and an O-ring groove therein
100H—right side view of the locking lever
100I—enlarged portion of FIG. 1B illustrating the female sleeve being threadingly engaged with the male body and with the interior hook of end portion of the female sleeve approaching the locking lever
100J—cross-sectional view of the interior hook of the female sleeve engaging the locking lever
100K—cross-sectional view of the interior hook of the female sleeve engaging the apex of the locking lever
100L—top view of the coupling fully threaded together with the locking sleeve and access window in the locking sleeve
100M—cross-section view of the coupling fully threaded together taken along the lines 1M-1M of FIG. 1L
100N—enlargement of a portion of FIG. 1M
100O—top view of the coupling fully threaded together with the locking sleeve rotated such that the access window is not viewed
100P—cross-sectional view of the coupling taken along the lines 1P-1P of FIG. 1O
100Q—enlarged portion of FIG. 1P
100R—top view of the coupling in the early stage of being unthreaded
100S—cross-sectional view of a portion of FIG. 1R illustrating the latch end of locking lever partially rotated downwardly and the hook portion of the female sleeve
100T—cross-sectional view illustrating the coupling being further along in the unthreading process with the locking lever and the hook portion of the female sleeve disengaged
101—female adaptor
103—female body threaded to female adaptor 101
105—locking lever
105A—apex of locking lever
105C—rounded portion of inclined latching end 105I
105E—latching end of locking lever
105F—latching recess
105G—groove for O-ring 105O
105I—inclined latching end of locking lever
105L—latching surface
105M—side wall of locking lever 105
105O—O-ring which biases the lever such that the latching end is raised when not engaged
105P, 105Q—pin
105R—snap ring preventing longitudinal movement of sleeve 105S
105S—rotating sleeve which ensures that the locking lever is kept in place
105T—top of locking lever 105
105W—side wall of locking sleeve forming the opening of the window
105X—latching end bottom surface
105Y—sloped end bottom surface
105Z—sloped end
106—seal
107—detents residing between threaded female sleeve 108 and female body 103
108—female sleeve with threaded interior and hook
108C—curved surface of hook
108H—hook on interior of female sleeve
108I—inclined surface of hook 108H
108L—recess of thread of female sleeve
108R—radially extending surface to recess 108L
110—snap ring
113—adaptor of male body 117

117—male body having exterior threads and a receptacle for the locking lever and O-ring which biases the latching end portion of the locking lever upwardly
117B—flat upper surface of male body 117
117C—flat bottom of locking lever receptacle 117R
117D—sloping surface of male body 117
117G—O-ring groove in the male body 117
117L—groove between thread 117T and thread 117Z
117N—thinner thread of the male body
117R—locking lever receptacle
117Q, 117P—receptacles in male body 117 for pins 105Q, 105P
117T, 117Z—thread of male
117W—wall in male body
155—groove in locking sleeve for second O-ring that is in compression
157—slope of the inner portion of the locking sleeve which is reciprocal to the slope of sloped portion 105Z of the locking lever;
195—second O-ring which provides friction for sleeve 105S
199—access window or port for permitting threading or unthreading
200—top view of female coupling sleeve
200A—cross-sectional view of FIG. 2 of female coupling sleeve taken along the lines 2A-2A
300—top view of male body
300A—cross-sectional view of FIG. 3 of the male body taken along the lines 3A-3A of FIG. 3
400—top view of locking sleeve with the access window or port illustrated
400A—cross-sectional view of FIG. 4 taken along the lines 4A-4A
500—a perspective schematic view of the second example of the coupling partially threaded together
500A—top schematic view of the second example of the coupling partially threaded together
500B—cross-sectional schematic view of the second example of the coupling partially threaded together taken along the lines 5B-5B of FIG. 5A
500C—perspective schematic view of the second example of the locking lever
500D—top schematic view of the second example of the locking lever
500E—left side schematic view of the second example of the locking lever
500F—bottom side schematic view of the second example of the locking lever
500G—perspective schematic view of the male body having external threads and a receptacle for the locking lever and the second example of the locking lever positioned in the receptacle
500H—right side schematic view of the second example of the locking lever
500I—enlargement of a portion of FIG. 5B
500J—cross-sectional schematic view of the interior hook of the second example of the female sleeve engaging the second example of the locking lever
500K—cross-sectional schematic view of the interior hook of the second example of the female sleeve approaching the top portion of the second example of the locking lever
500L—top schematic view of the coupling fully threaded together illustrating the locking sleeve and access window in the locking sleeve exposing the second example of the locking lever.
500M—cross-sectional schematic view of the coupling fully threaded together taken along the lines 5M-5M of FIG. 5L illustrating the second example of the locking lever
500N—enlargement of a portion of FIG. 5M
500O—schematic view of the coupling fully threaded together with the locking sleeve rotated such that the access window is not visible thus preventing the second example of the locking lever from pivoting
500P—cross-sectional schematic view of the coupling taken along the lines 5P-5P of FIG. 5"O"
500Q—enlarged portion of FIG. 5P
500R—cross-sectional view taken along the lines 5R-5R of FIG. 5"O" with the coupling fully threaded together.
500S—cross-sectional view similar to FIG. 5R illustrating the second example of the locking lever engaging the recess in the hook portion of the second example of the female sleeve
500T—top schematic view of the coupling in the early stage of being unthreaded with the window aligned with the second example of the locking lever
500U—cross-sectional schematic view taken along the lines 5U-5U of FIG. 5T illustrating the end of the second example of the locking lever partially rotated downwardly and the hook portion of the second example of the female sleeve being retracted leftwardly
500V—cross-sectional schematic view taken along the lines 5V-5V of FIG. 5T illustrating the second example of the female sleeve being unthreaded from the male and the recess engaging the second example of the locking lever
500W—view similar to FIG. 5V illustrating the second example of the female sleeve being unthreaded from the male and the second example of the lever pivoting downwardly
505—second example of the locking lever
505C—rounded portion of inclined latching end 505I
505E—blocking end portion of the second example of the locking lever 505
505G—groove for O-ring 105O
505I—inclined end of second example of locking lever 505
505M—side wall of locking lever 505
505P, 505Q—pins of second example of the locking lever
505T—top of second example of the locking lever 505
505X—bottom surface of second example of the locking lever 505
505Y—sloped end bottom surface
505Z—sloped end of second example of the locking lever 505
508—second example of female sleeve with threaded interior and hook having raised portions 508C and circumferentially spaced recesses 508Z
508C—rounded portion of raised portion 508X of generally cylindrically-shaped hook 508H of female sleeve 508
508G—gap between female sleeve 508 and locking sleeve 105S
508H—hook on interior of female sleeve 508
508I—inclined surface of hook 508H
508L—inner portion/recess of hook 508H of sleeve 508
508R—radially extending surface to recess 508L
508X—raised portions of hook 508H
508Y—point of contact between the blocking end portion 505E of the lever 505 and the recess 508Z of the hook 508H of the second example of sleeve 508
508Z—recesses in hook 508H of second example of sleeve 508
510—arrow in the tightening direction for the female sleeve 508
510R—arrow in the loosening direction for the female sleeve 508
511—engagement between hook portion 508H and locking sleeve 105S 599M—male coupling half
599f—female coupling half
600—front schematic view of the second example of the female sleeve
600A—right end view of the female sleeve
600B—enlargement of a portion of FIG. 6A illustrating a raised portion of the hook end 508H
600C—cross-sectional view of the second example of the female sleeve taken along the lines 6C-6C of FIG. 6A illustrating recesses in the hook portion of the female sleeve
600D—cross-sectional view of the second example of the female sleeve taken along the lines 6D-6D of FIG. 6A illustrating recesses in the hook portion of the female sleeve
610, 611, 612, 613, 614—contours of the outer surface of the hook portion 508H of the female sleeve 508

The invention has been set forth with particularity. Those skilled in the art will readily understand that changes may be made to the invention without departing from the spirit and scope of the claims set forth below.

The invention claimed is:

1. A threaded coupling, comprising:
a generally cylindrically shaped male coupling half;
a generally cylindrically shaped female coupling half;
said male coupling half includes a male body, said male body includes an exterior, and said exterior of said male body includes external threads thereon;
said female coupling half includes a female sleeve and a female body;
said interior of said female sleeve includes internal threads;
said female sleeve includes an end portion;
said end portion of said female sleeve includes a hook portion;
said hook portion of said female sleeve being generally cylindrically shaped;
said generally cylindrically-shaped hook portion includes raised portions and circumferentially spaced recesses therein;
said male body includes a locking lever receptacle recessed in said exterior of said male body, and said locking lever receptacle of said male body further includes first and second slots therein;
a locking lever;
said locking lever includes first and second pivot pins;
said locking lever includes a blocking end portion;
said first and second pivot pins of said locking lever reside in said first and second slots of said locking lever receptacle of said male body, said locking lever pivoting about said pivot pins;
said locking lever includes an O-ring slot therein;
said male body includes an O-ring slot therein which extends circumferentially around said generally cylindrically shaped male body and is aligned with said O-ring slot in said locking lever;
a tensioning O-ring, and said tensioning O-ring extending circumferentially in said O-ring slot in said male body and in said O-ring slot in said locking lever biasing said blocking end portion of said locking lever to a raised position for engagement with said cylindrically-shaped hook portion of said female sleeve including said circumferentially spaced recesses in said cylindrically-shaped hook portion of said female sleeve;
said tensioning O-ring securing said locking lever in said locking lever receptacle;
during engagement of said male coupling half and said female coupling half, said external threads of said male body engage said internal threads of said female sleeve, said female sleeve of said female coupling half is rotated with respect to said male coupling half and said cylindrically-shaped hook portion of said female sleeve including said raised portions and said circumferentially spaced recesses in said cylindrically-shaped hook portion of said female sleeve engage said blocking end portion of said locking lever alternately pivoting said blocking end portion of said locking lever about said first and second pivot pins between a position proximate said receptacle of said male body when said raised portions of said generally cylindrically-shaped hook portion engages said blocking end portion of said locking lever and a position distal with respect to said receptacle of said male body when said circumferentially spaced recesses of said cylindrically-shaped hook portion engage said blocking end portion of said locking lever, and as rotation of said female sleeve continues said female sleeve moves said female body toward said male body until threaded engagement of said female coupling half and said male coupling half is complete;
said blocking end portion of said locking lever is in said raised position when said cylindrically-shaped hook portion and one of said circumferentially spaced recesses thereof are fully engaged with said blocking end portion of said locking lever and threaded engagement of said female coupling half and said male coupling half is complete;
a locking sleeve;
said locking sleeve being generally cylindrically shaped, said locking sleeve engages said exterior of said male body and extends circumferentially thereabout; and,
said locking sleeve prevents said female sleeve and said male body from being unthreaded.

2. A threaded coupling as claimed in claim 1, wherein said locking sleeve includes an access window which allows said coupling to be unlocked and uncoupled when said access window is aligned with said locking lever.

3. A threaded coupling as claimed in claim 2, wherein said locking sleeve includes a groove which retains a second O-ring therein, said second O-ring in engagement with said exterior of said male coupling and gripping said exterior of said male coupling inhibiting unwanted rotation of said sleeve with respect to said male body thus preventing inadvertent alignment of said access window with said locking lever.

4. A threaded coupling as claimed in claim 3, wherein:
said generally cylindrically shaped hook portion of said female sleeve engages said locking sleeve when said male coupling half and said female coupling half are coupled together.

5. A threaded coupling as claimed in claim 1, wherein:
said locking sleeve includes an access window;
said access window allows said coupling to be unlocked and uncoupled when said access window is aligned with said locking lever; and,
when said access window of said locking sleeve is not aligned with said locking lever and said threaded coupling is locked together.

6. A threaded coupling as claimed in claim 1, further comprising:
a snap ring;
a snap ring receptacle in said male body; and,
said snap ring resides in said male body and secures said locking sleeve.

7. A threaded coupling as claimed in claim 1, further comprising:

said locking lever includes a bottom surface;
said bottom surface includes a locking end portion and a sloped end portion;
said locking end portion bottom surface being inclined with respect to said locking lever receptacle in said male body when said tensioning O-ring resides in said O-ring slot of said locking lever and said O-ring slot of said male body; and,
said sloped end portion of said bottom surface being parallel to and in proximity to said locking lever receptacle.

8. A threaded coupling as claimed in claim 1, wherein:
said locking lever includes a bottom surface;
said bottom portion of said locking lever being spaced apart from said locking lever receptacle; and,
said locking lever being rotatable about said first and second pivot pins without said locking lever engaging said locking lever receptacle of said male body.

9. A threaded coupling as claimed in claim 8, further comprising:
said bottom surface includes a locking end portion and a sloped end portion;
said locking end portion of said bottom surface inclined with respect to said locking lever receptacle in said male body when said tensioning O-ring resides in said O-ring slot of said locking lever and said O-ring slot of said male body; and,
said sloped end portion of said bottom surface being parallel to and in proximity to said locking lever receptacle.

10. A threaded coupling as claimed in claim 1, wherein:
said locking lever includes a bottom surface;
said bottom surface of said locking lever being spaced apart from said locking lever receptacle;
said bottom surface includes a locking end portion and a sloped end portion;
said locking end portion of said bottom surface being inclined with respect to said locking lever receptacle in said male body when said tensioning O-ring resides in said O-ring slot of said locking lever and said O-ring slot of said male body;
said sloped end portion of said bottom surface being parallel to and in proximity to said locking lever receptacle;
said locking end portion of said bottom surface being planar and sloped end portion of said bottom surface being planar and intersect each other along a line of intersection;
said first and second pins being coaxial with respect to one another, said coaxial pins sharing an axis;
a radius from said axis of said pins to said line of intersection; and,
said radius being smaller than said distance from said axis of said pins to said locking lever receptacle when said first and second pin reside in said first and second slots of said receptacle.

11. A threaded coupling as claimed in claim 1, wherein:
said locking lever receptacle of said male body includes a flat bottom surface;
said locking lever receptacle includes a first side wall, a second side wall, a first end wall and a second end wall;
said male body includes a raised portion; and,
said raised portion includes said first and second slots which receive said first and second pins of said locking lever.

12. A threaded coupling as claimed in claim 1, wherein:
said locking sleeve includes an interior portion, said interior portion includes a contour engaging said locking lever and which locks said locking lever against rotation when said contour of said locking sleeve is positioned adjacent said locking lever.

13. A threaded coupling, comprising:
a generally cylindrically shaped male coupling half;
a generally cylindrically shaped female coupling half;
said male coupling half includes a male body, said male body includes an exterior, and said exterior of said male body includes external threads thereon;
said female coupling half includes a female sleeve and a female body;
said interior of said female sleeve includes internal threads;
said female sleeve includes an end portion;
said end portion of said female sleeve includes a hook portion;
said hook portion of said female sleeve being generally cylindrically-shaped;
said generally cylindrically-shaped hook portion includes circumferentially spaced recesses therein;
a locking lever;
said locking lever pivotally recessed in said exterior of said male body;
said locking lever includes a blocking end portion pivotally biased to a first raised position for engagement with said cylindrically-shaped hook portion of said female sleeve including said circumferentially spaced recesses in said cylindrically-shaped hook portion of said female sleeve;
during engagement of said male coupling half and said female coupling half, said external threads of said male body engage said internal threads of said female sleeve, said female sleeve of said female coupling half fully engages said male coupling half and one of said circumferentially spaced recesses of said cylindrically-shaped hook portion engages said blocking end portion of said locking lever, and, said blocking end portion of said locking lever is pivotally biased to said raised position and resides in said one of said circumferentially spaced recesses of said generally cylindrically-shaped hook portion of said female sleeve;
a locking sleeve;
said locking sleeve being generally cylindrically shaped, said locking sleeve engages said exterior of said male body and extends circumferentially thereabout; and,
said locking sleeve prevents pivoting of said locking lever maintaining said pivotal biasing of said blocking end portion of said locking lever positioning said blocking end portion of said locking lever in said one of said circumferentially spaced recesses of said generally cylindrically-shaped hook portion of said female sleeve preventing said female sleeve and said male body from being unthreaded.

14. A threaded coupling as claimed in claim 13, further comprising:
said locking sleeve includes an access window which allows threading and unthreading of said male body and said female sleeve when said access window is aligned with said locking lever so as to permit pivoting of said locking lever; and,
said locking sleeve includes an interior portion, said interior portion includes a contour which engages said lever and which locks said locking lever against rotation when said contour of said locking sleeve is positioned adjacent said locking lever.

15. A threaded coupling as claimed in claim 13, further comprising:
said locking sleeve includes an interior portion, said interior portion includes a contour which engages said lever and locks said locking lever against rotation when said contour of said locking sleeve is positioned adjacent said locking lever.

16. A process for locking a threaded coupling, said coupling includes:
   a male coupling half, said male coupling half includes: a male body, said male body having external threads; said male body includes a locking sleeve, said locking sleeve includes an access window; said male body includes an O-ring slot therein; a locking lever receptacle; a raised portion, said raised portion includes first and second slots; a locking lever, said locking lever includes a blocking end portion, first and second pins, an O-ring slot and a sloped end;
   a female coupling half includes: a female body and a female sleeve having internal threads; said female sleeve further includes an end portion, said end portion includes a generally cylindrically-shaped hook, and said generally-cylindrically-shaped hook includes raised portions and circumferentially spaced recesses therein;
   comprising the steps of:
   inserting said locking lever into said receptacle of said male body and inserting said first and second pins of said locking lever into said first and second slots of said raised portion of said male member, said first and second pins of said locking lever permitting rotation of said lever about said pins;
   positioning said access window of said locking sleeve in alignment with said locking lever;
   positioning an O-ring in said O-ring slot of said male body and in said O-ring slot of said locking lever securing said locking lever with respect to said male body, said O-ring permitting rotation of said locking lever about said pins with resistance to said rotation;
   progressively threading said female sleeve having internal threads onto said male body having external threads moving said generally cylindrically-shaped hook toward said locking lever;
   engaging said generally cylindrically-shaped hook of said female sleeve with said blocking end portion of said locking lever, and as said progressive threading continues, said hook including said raised portions and said circumferentially spaced recesses are rotated with respect to said external threads of said male body moving and forcing said blocking end of said locking lever to rotate said blocking end portion radially downwardly toward said male body when one of said raised portions of said cylindrically-shaped hook engages said blocking end portion and then said blocking end portion of said locking lever rotates radially upwardly away from said male body when one of said circumferentially spaced recesses of said generally cylindrically-shaped hook engages said blocking end portion of said locking lever;
   continuing said rotation of said generally cylindrically-shaped hook portion of said female sleeve until said female sleeve engages said locking sleeve of said male body;
   adjusting the rotational position of said female sleeve to ensure that one of said circumferentially spaced recesses of said generally cylindrically-shaped hook engages said blocking end portion of said locking lever;
   rotating said access window of said locking sleeve to a position not aligned with said locking lever locking said male coupling half and said female coupling half together.

17. A process for locking a threaded coupling as claimed in claim 16, wherein:
   said locking sleeve includes an interior portion, said interior portion includes a contour which engages said lever and which locks said locking lever against rotation when said contour of said locking sleeve is positioned adjacent said locking lever; and, further comprising the steps of:
   rotating, forcefully, said locking sleeve between locked and unlocked positions; and,
   inhibiting rotation of said locking sleeve against unwanted rotation of said locking sleeve by vibration by interposing an O-ring between said male body and said sleeve such that force is required to rotate said locking sleeve with respect to said male body.

18. A process for locking a threaded coupling as claimed in claim 16, wherein:
   said locking lever includes a bottom portion and said lever receptacle includes a flat surface and said bottom portion of said locking lever is spaced apart from said flat surface of said receptacle thus enabling said locking lever to pivot without engagement with said flat surface of said receptacle.

* * * * *